United States Patent
Shao et al.

(10) Patent No.: US 12,526,515 B2
(45) Date of Patent: Jan. 13, 2026

(54) METHOD FOR IMAGE OR VIDEO SHOOTING AND RELATED DEVICE

(71) Applicant: Honor Device Co., Ltd., Shenzhen (CN)

(72) Inventors: Tao Shao, Shenzhen (CN); Congchao Zhu, Shenzhen (CN); Bin Xiao, Shenzhen (CN); Yu Wang, Shenzhen (CN); Gang Luo, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 612 days.

(21) Appl. No.: 17/923,147

(22) PCT Filed: May 6, 2022

(86) PCT No.: PCT/CN2022/091189
§ 371 (c)(1),
(2) Date: Nov. 3, 2022

(87) PCT Pub. No.: WO2023/015980
PCT Pub. Date: Feb. 16, 2023

(65) Prior Publication Data
US 2024/0259679 A1   Aug. 1, 2024

(30) Foreign Application Priority Data
Aug. 11, 2021   (CN) .......................... 202110921519.3

(51) Int. Cl.
*H04N 23/667* (2023.01)
*H04N 23/45* (2023.01)
(Continued)

(52) U.S. Cl.
CPC ........... *H04N 23/667* (2023.01); *H04N 23/45* (2023.01); *H04N 23/62* (2023.01); *H04N 23/632* (2023.01);
(Continued)

(58) Field of Classification Search
CPC ...... H04N 23/667; H04N 23/69; H04N 23/76; H04N 23/80; H04N 23/633; H04N 23/45; H04N 23/632
See application file for complete search history.

(56) References Cited

U.S. PATENT DOCUMENTS 9,716,825 B1   7/2017   Manzari et al.
10,944,915 B1   3/2021   Fang et al.
(Continued)

FOREIGN PATENT DOCUMENTS

CN   106791378 A   5/2017
CN   109068111 A   12/2018
(Continued)

*Primary Examiner* — Minh Q Phan
(74) *Attorney, Agent, or Firm* — Leydig, Voit & Mayer, Ltd.

(57) ABSTRACT

This application relates to the image processing field, and provides a method for image or video shooting and a related device. The method for image or video shooting includes: capturing images by using a first camera and a second camera based on the first zoom ratio and first lightness; processing the images captured, to obtain a shot image; and saving the shot image. In a photo mode in this application, by using a zoom ratio and lightness selected by a user, it is possible to determine to use the first camera and the second camera to capture images and perform processing. Therefore, different cameras can be used based on different lightness and zoom ratios to obtain images with different fields of view and different definition, and cooperative processing can be performed by using a plurality of cameras, to improve quality of a shot image obtained after the processing.

19 Claims, 40 Drawing Sheets

(51) Int. Cl.
*H04N 23/62* (2023.01)
*H04N 23/63* (2023.01)
*H04N 23/69* (2023.01)
*H04N 23/76* (2023.01)
*H04N 23/80* (2023.01)

(52) U.S. Cl.
CPC ........... *H04N 23/633* (2023.01); *H04N 23/69* (2023.01); *H04N 23/76* (2023.01); *H04N 23/80* (2023.01)

(56) References Cited

U.S. PATENT DOCUMENTS

| | | |
|---|---|---|
| 11,206,352 B2 | 12/2021 | Wang et al. |
| 2018/0096487 A1 | 4/2018 | Nash et al. |
| 2019/0034756 A1 | 1/2019 | Kim et al. |
| 2020/0358954 A1 | 11/2020 | Wang et al. |
| 2021/0168300 A1* | 6/2021 | Wang ................... H04N 23/698 |

FOREIGN PATENT DOCUMENTS

| | | | | |
|---|---|---|---|---|
| CN | 110198418 A | | 9/2019 | |
| CN | 110290325 A | | 9/2019 | |
| CN | 110572581 A | * 12/2019 | ............. H04N 23/10 |
| CN | 110868547 A | | 3/2020 | |
| CN | 111064895 A | | 4/2020 | |
| CN | 111432143 A | | 7/2020 | |
| CN | 111641777 A | | 9/2020 | |
| CN | 111641778 A | | 9/2020 | |
| CN | 111885295 A | | 11/2020 | |
| EP | 3713209 A1 | | 9/2020 | |
| EP | 3736676 A1 | | 11/2020 | |
| JP | 2006191411 A | | 7/2006 | |

\* cited by examiner (a)          (b)          (c)

METHOD FOR IMAGE OR VIDEO SHOOTING AND RELATED DEVICE

CROSS-REFERENCE TO RELATED APPLICATIONS

This application is a national stage of International Application No. PCT/CN2022/091189, filed on May 6, 2022, which claims priority to Chinese Patent Application No. 202110921519.3, filed on Aug. 11, 2021, both of which are hereby incorporated by reference their entireties.

TECHNICAL FIELD

This application relates to the image processing field, and in particular, to a method for image or video shooting and a related device.

BACKGROUND

As electronic devices are widely used, using electronic devices to shoot images and videos has become a way of daily behavior in people's life.

For example, the electronic devices are mobile phones, and it has been a trend to equip an electronic device with a plurality of cameras. Because an electronic device is equipped with a plurality of cameras, more image shooting and video shooting manners can be provided for users to choose and use.

SUMMARY

This application provides a method for image or video shooting and a related device, to implement cooperative processing by using a plurality of cameras, improve definition of obtained images, and implement full focal length coverage and multi-function shooting.

To achieve the foregoing objective, the following technical solutions are used in this application:

According to a first aspect, a method for image or video shooting is provided, where the method for image or video shooting is applied to an electronic device including a first camera and a second camera, and the method for image or video shooting includes: displaying, by the electronic device, a first screen, where the first screen includes a preview image, a first widget, and a second widget, and the second widget indicates a photo mode; detecting a first operation on the first widget; determining, by the electronic device, a first zoom ratio in response to the first operation, where the preview image is an image captured by the first camera in real time; detecting a second operation on the first screen; capturing, by the electronic device in response to the second operation, images by using the first camera and the second camera based on the first zoom ratio and first lightness, where the second camera is an auxiliary camera, the first camera captures one or more frames of images, and the second camera captures one or more frames of images; processing the one or more frames of images captured by the first camera and the one or more frames of images captured by the second camera, to obtain a shot image; and saving the shot image, where the first lightness is a lightness value determined by the electronic device based on the preview image.

For example, the first camera may be a main camera, and the second camera is a black and white camera; or the first camera may be a main camera, and the second camera is a long-focus camera.

For example, the first widget may be a zoom option for adjusting a zoom ratio. The second widget may be a shooting button 50 for indicating different shooting modes.

It should be understood that the auxiliary camera means that an image captured by the camera is used only for image processing to obtain a shot image and is not displayed as a preview image. In other words, the auxiliary camera is in a background running state.

In the method for image or video shooting provided in this embodiment of this application, when a shooting mode selected by a user is the photo mode, based on a zoom ratio and lightness selected by the user, for example, a corresponding target camera may be determined from a wide-angle camera, a main camera, a black and white camera, and a long-focus camera. For example, it may be determined that target cameras are the main camera and the black and white camera, or it may be determined that target cameras are the main camera and the long-focus camera, raw images are obtained by using the target cameras, and then the raw images are processed to obtain a shot image. The raw images include an image shot by the main camera and an image shot by the black and white camera, or include an image shot by the main camera and an image shot by the long-focus camera.

According to the method for image or video shooting provided in this application, during photographing, different cameras can be used based on different lightness and zoom ratios to obtain raw images. Therefore, different cameras can be used to obtain raw images with different fields of view and different definition, and cooperative processing can be performed by using a plurality of cameras, to improve quality of a shot image obtained after the raw images are processed.

In a possible implementation of the first aspect, the electronic device further includes a third camera, and the method further includes:

detecting a third operation on the first widget; determining, by the electronic device, a second zoom ratio in response to the third operation, where the preview image is an image captured by the third camera in real time; detecting a fourth operation on the first screen; capturing, by the electronic device in response to the fourth operation, images by using the first camera and the third camera based on the second zoom ratio and the first lightness, where the first camera is an auxiliary camera, the third camera is different from the second camera, and the third camera captures one or more frames of images; processing the one or more frames of images captured by the first camera and the one or more frames of images captured by the third camera, to obtain a shot image; and saving the shot image.

For example, the third camera may be a wide-angle camera.

In this implementation, by using the second zoom ratio and the first lightness, it can be determined that the target cameras are a main camera and a wide-angle camera, and the main camera and the wide-angle camera are used to capture images with different fields of view and different definition for processing, to obtain an image with higher definition and better quality.

In a possible implementation of the first aspect, the electronic device further includes a fourth camera, and the method further includes:

detecting a fifth operation on the first widget; determining, by the electronic device, a third zoom ratio in response to the fifth operation, where the preview image is an image captured by the fourth camera in real time; detecting a sixth operation on the first screen; capturing, by the electronic device in response to the sixth operation, images by using the fourth camera based on the third zoom ratio and the first lightness, where the fourth camera is different from the third camera, and the fourth camera captures two or more frames of images; processing the two or more frames of images captured by the fourth camera, to obtain a shot image; and saving the shot image.

For example, the fourth camera may be a long-focus camera.

In this implementation, by using the third zoom ratio and the first lightness, it can be determined that the target camera is a long-focus camera, and the long-focus camera is used to capture a plurality of frames of images for processing, to obtain a shot image with higher definition and better quality.

In a possible implementation of the first aspect, the method further includes:

detecting a seventh operation on the first screen; capturing, by the electronic device in response to the seventh operation, images by using the first camera based on the first zoom ratio and second lightness, where the first camera captures two or more frames of images; processing the two or more frames of images captured by the first camera, to obtain a shot image; and saving the shot image; or detecting an eighth operation on the first screen; capturing, by the electronic device in response to the eighth operation, images by using the third camera based on the second zoom ratio and the second lightness, where the third camera captures two or more frames of images; processing the two or more frames of images captured by the third camera, to obtain a shot image; and saving the shot image; or detecting a ninth operation on the first screen; capturing, by the electronic device in response to the ninth operation, images by using the fourth camera based on the third zoom ratio and the second lightness, where the fourth camera captures two or more frames of images; processing the two or more frames of images captured by the fourth camera, to obtain a shot image; and saving the shot image, where the second lightness is lightness determined by the electronic device based on the preview image, the second lightness is different from the first lightness, and a lightness value of the second lightness is lower than the lightness value of the first lightness.

If the first lightness is medium or high lightness, because the lightness value of the second lightness is lower than that of the first lightness, the second lightness may be referred to as low lightness.

In this implementation, in a case of low lightness, different cameras can be used based on different zoom ratios to obtain raw images, to implement cooperative processing by using a plurality of cameras, so that zoom ratio coverage of the electronic device is wider. In addition, each camera can capture a plurality of frames of images to improve quality of the shot image obtained by each camera.

In a possible implementation of the first aspect, the method further includes: detecting an eleventh operation on the first widget; switching from the first zoom ratio to the second zoom ratio in response to the eleventh operation; and in response to switching from the first zoom ratio to the second zoom ratio, switching, by the electronic device, from capturing images by using the first camera and the second camera to capturing images by using the first camera and the third camera, where in a case of the first zoom ratio, the second camera is an auxiliary camera, or in a case of the second zoom ratio, the first camera is an auxiliary camera; or detecting a twelfth operation on the first widget; switching from the first zoom ratio to the third zoom ratio in response to the twelfth operation; and in response to switching from the first zoom ratio to the third zoom ratio, switching, by the electronic device, from capturing images by using the first camera and the second camera to capturing images by using the fourth camera and the first camera, where in a case of the third zoom ratio, the first camera is an auxiliary camera.

For example, when switching from the first zoom ratio to the second zoom ratio, the electronic device switches from capturing images by using the main camera and the black and white camera to capturing images by using the main camera and the wide-angle camera. In the case of the first zoom ratio, an image captured by the main camera is displayed as a preview image, but an image captured by the black and white camera is not displayed. In the case of the second zoom ratio, an image captured by the wide-angle camera is displayed as a preview image, but an image captured by the main camera is not displayed.

For example, when switching from the first zoom ratio to the third zoom ratio, the electronic device switches from capturing images by using the main camera and the black and white camera to capturing images by using the long-focus camera and the main camera. In the case of the third zoom ratio, an image captured by the long-focus camera is displayed as a preview image, but an image captured by the main camera is not displayed.

In this implementation, when the electronic device allows two cameras to run at the same time, by switching the two cameras, it is possible to run in advance a camera required to capture images during photographing in an adjacent zoom range while implementing relay zooming, or to delay closing a camera that captures images in a previous zoom ratio range. Therefore, overall zoom ratio coverage of the electronic device is wider, and switching can be smoother.

In a possible implementation of the first aspect, the method further includes:

in response to switching from the first zoom ratio to the second zoom ratio, switching, by the electronic device, from capturing images by using the third camera, the first camera, and the second camera to capturing images by using the first camera and the third camera, where in the case of the first zoom ratio, both the third camera and the second camera are auxiliary cameras, or in the case of the second zoom ratio, the first camera is an auxiliary camera.

For example, when switching from the first zoom ratio to the second zoom ratio, the electronic device switches from capturing images by using the wide-angle camera, the main camera, and the black and white camera to capturing images by using the main camera and the wide-angle camera. In the case of the first zoom ratio, an image captured by the main camera is displayed as a preview image, but images captured by the wide-angle camera and the black and white camera are not displayed. In the case of the second zoom ratio, an image captured by the wide-angle camera is displayed as a preview image, but an image captured by the main camera is not displayed.

In this implementation, when the electronic device allows three cameras to run at the same time, by switching a plurality of cameras, it is possible to run in advance a camera required to capture images during photographing in an adjacent zoom ratio range and other cameras while implementing relay zooming, or to delay closing a camera that captures images in a previous zoom ratio range. Therefore, overall zoom ratio coverage of the electronic device is wider, and switching can be smoother.

In a possible implementation of the first aspect, a field of view of the second camera overlaps a field of view of the third camera.

The overlapping means that the third camera can shoot scene content shot by the second camera and surrounding scene content thereof.

In this implementation, during switching of a plurality of cameras, switching of the field of view is smoother and more natural.

In a possible implementation of the first aspect, the capturing, by the electronic device, images by using the first camera and the second camera based on the first zoom ratio and first lightness includes: when the first zoom ratio falls within a second zoom ratio range, obtaining, by the electronic device, a second image by using the first camera, and obtaining a third image by using the second camera, where the second image includes one or more frames, and the third image includes one or more frames; or when the first zoom ratio falls within a third zoom ratio range, obtaining, by the electronic device, a second image by using the first camera, and obtaining a fourth image by using the second camera, where the second image includes one or more frames, and the fourth image includes one or more frames.

In this implementation, in a case of medium or high lightness, different cameras can be used based on different zoom ratios to obtain raw images, to implement cooperative processing by using a plurality of cameras, so that zoom ratio coverage of the electronic device is wider.

In a possible implementation of the first aspect, after the obtaining, by the electronic device, a second image by using the first camera, and obtaining a third image by using the second camera, the method further includes:

performing first preprocessing on the second image to obtain a first preprocessed image located in a RAW region; performing fusion on the first preprocessed image by using a pre-fusion module, to obtain a corresponding pre-fused image; separately performing front-end processing on the third image and the pre-fused image corresponding to the second image, to obtain corresponding front-end processed images; performing fusion on the front-end processed image corresponding to the third image by using a front-end fusion module, to obtain a front-end fused image corresponding to the third image; performing back-end processing on both the front-end processed image corresponding to the second image and the front-end fused image corresponding to the third image, to obtain corresponding back-end processed images; and performing fusion on the back-end processed image corresponding to the second image and the back-end processed image corresponding to the third image by using a back-end fusion module, to obtain a back-end fused image, where the back-end fused image is the shot image.

In this implementation, in the case of medium or high lightness, after the foregoing series of processing based on the second image and the third image with different richness of details, a shot image with higher definition and better quality can be obtained through fusion.

Herein, processing on the RAW region can reserve more details and improve quality of subsequent images.

In a possible implementation of the first aspect, after the obtaining, by the electronic device, a second image by using the first camera, and obtaining a fourth image by using the second camera, the method further includes:

separately performing front-end processing on the second image and the fourth image to obtain a front-end processed image corresponding to the second image and a front-end processed image corresponding to the fourth image; separately performing fusion on the front-end processed image corresponding to the second image and the front-end processed image corresponding to the fourth image by using the front-end fusion module, to obtain a front-end fused image corresponding to the second image and a front-end fused image corresponding to the fourth image; performing back-end processing on both the front-end fused image corresponding to the second image and the front-end fused image corresponding to the fourth image, to obtain corresponding back-end processed images; and performing fusion on the back-end processed image corresponding to the second image and the back-end processed image corresponding to the fourth image by using the back-end fusion module, to obtain a back-end fused image, where the back-end fused image is the shot image.

In this implementation, in the case of medium or high lightness, after the foregoing series of processing based on the second image and the fourth image with different fields of view and different definition, a shot image with higher definition and better quality can be obtained through fusion.

In a possible implementation of the first aspect, the capturing, by the electronic device, images by using the first camera and the third camera based on the second zoom ratio and the first lightness includes: obtaining, by the electronic device, a first image by using the third camera, and obtaining a second image by using the first camera, where the first image includes one or more frames, the second image includes one or more frames, and the second zoom ratio falls within a first zoom ratio range.

In a possible implementation of the first aspect, the electronic device obtains the first image by using the third camera, and obtains the second image by using the first camera, and the method further includes:

separately performing front-end processing on the first image and the second image to obtain a front-end processed image corresponding to the first image and a front-end processed image corresponding to the second image; separately performing fusion on the front-end processed image corresponding to the first image and the front-end processed image corresponding to the second image by using a front-end fusion module, to obtain a front-end fused image corresponding to the first image and a front-end fused image corresponding to the second image; performing back-end processing on both the front-end fused image corresponding to the first image and the front-end fused image corresponding to the second image, to obtain corresponding back-end processed images; performing distortion correction on the back-end processed image corresponding to the first image, to obtain a corrected image; and performing fusion on the corrected image and the back-end processed image corresponding to the second image by using a back-end fusion module, to obtain a back-end fused image, where the back-end fused image is the shot image.

In this implementation, in the case of medium or high lightness, after the foregoing series of processing based on the first image and the second image with different fields of view and different definition, a shot image with higher definition and better quality can be obtained through fusion.

In a possible implementation of the first aspect, the capturing, by the electronic device, images by using the fourth camera based on the third zoom ratio and the first lightness includes: obtaining, by the electronic device, a fourth image by using the fourth camera, where the fourth image includes a plurality of frames, and the third zoom ratio falls within a fourth zoom ratio range.

In a possible implementation of the first aspect, after the obtaining, by the electronic device, a fourth image by using the fourth camera, the method further includes: performing front-end processing on the fourth image to obtain a corresponding front-end processed image; performing fusion on the front-end processed image corresponding to the fourth image by using a front-end fusion module, to obtain a front-end fused image corresponding to the fourth image; and performing back-end processing on the front-end fused image corresponding to the fourth image, to obtain a corresponding back-end processed image, where the back-end processed image is the shot image.

In this implementation, in the case of medium or high lightness, after the foregoing series of processing based on the fourth image with a plurality of frames, a shot image with higher definition and better quality can be obtained through fusion.

In a possible implementation of the first aspect, the capturing, by the electronic device, images by using the first camera based on the first zoom ratio and second lightness includes: obtaining, by the electronic device, a second image by using the first camera, where the second image includes a plurality of frames, and the first zoom ratio falls within a second zoom ratio range or a third zoom ratio range; and the capturing, by the electronic device, images by using the third camera based on the second zoom ratio and the second lightness includes: obtaining, by the electronic device, a first image by using the third camera, where the first image includes a plurality of frames, and the second zoom ratio falls within a first zoom ratio range; and the capturing, by the electronic device, images by using the fourth camera based on the third zoom ratio and the second lightness includes: obtaining, by the electronic device, a fourth image by using the fourth camera, where the fourth image includes a plurality of frames, and the third zoom ratio falls within a fourth zoom ratio range.

In this implementation, in a scenario of low lightness, different cameras can be used based on different zoom ratios to obtain a plurality of corresponding frames of raw images, to implement multi-camera cooperation and achieve wider zoom ratio coverage.

In a possible implementation of the first aspect, the method further includes: performing second preprocessing on the second image, the first image, or the fourth image to obtain a second preprocessed image located in a RAW region, where the second preprocessing is used to perform fusion on the second image, the first image, or the fourth image based on a network model; performing front-end processing on the second preprocessed image to obtain a corresponding front-end processed image; and performing back-end processing on the front-end processed image to obtain a corresponding back-end processed image, where the back-end processed image is the shot image.

In this implementation, in the scene of low lightness, multi-frame fusion processing and the foregoing other processing are performed based on a plurality of frames of first images, second images, or fourth images by using the network model, and a shot image with higher definition and better quality can be obtained through fusion.

In a possible implementation of the first aspect, the method further includes: detecting a thirteenth operation on the second widget; responding to the thirteenth operation, where the second widget indicates a video mode, a night mode, or an HDR mode; detecting a fourteenth operation on the first screen; and capturing, by the electronic device in response to the fourteenth operation, images by using the first camera based on the first zoom ratio; or detecting a fifteenth operation on the first screen; and capturing, by the electronic device in response to the fifteenth operation, images by using the third camera based on the second zoom ratio; or detecting a sixteenth operation on the first screen; and capturing, by the electronic device in response to the sixteenth operation, images by using the fourth camera based on the third zoom ratio.

In a possible implementation of the first aspect, the capturing, by the electronic device, images by using the first camera based on the first zoom ratio includes: obtaining, by the electronic device, the second image by using the first camera, where the second image includes a plurality of frames, and the first zoom ratio falls within the second zoom ratio range or the third zoom ratio range;

the capturing, by the electronic device, images by using the third camera based on the second zoom ratio includes: obtaining, by the electronic device, the first image by using the third camera, where the first image includes a plurality of frames, and the second zoom ratio falls within the first zoom ratio range; and the capturing, by the electronic device, images by using the fourth camera based on the third zoom ratio includes: obtaining, by the electronic device, the fourth image by using the fourth camera, where the fourth image includes a plurality of frames, and the third zoom ratio falls within the fourth zoom ratio range.

In this implementation, in the video mode, the night mode, or the HDR mode, different cameras can also be switched based on different zoom ratios to obtain a plurality of corresponding frames of raw images, to implement multi-camera cooperation and achieve wider zoom ratio coverage.

In a possible implementation of the first aspect, when the second widget indicates the night mode, the method further includes: performing second preprocessing on the second image, the first image, or the fourth image to obtain a second preprocessed image located in a RAW region, where the second preprocessing is used to perform fusion on the second image, the first image, or the fourth image based on a network model; performing front-end processing on the second preprocessed image to obtain a corresponding front-end processed image; and performing back-end processing on the front-end processed image to obtain a corresponding back-end processed image, where the back-end processed image is the shot image.

In this implementation, in the night mode, multi-frame fusion processing and the foregoing other processing are performed based on a plurality of frames of first images, second images, or fourth images by using the network model, and a shot image with higher definition and better quality can be obtained through fusion.

In a possible implementation of the first aspect, when the second widget indicates the video mode or the HDR mode, the method further includes: performing third preprocessing on the second image, the first image, or the fourth image to obtain a third preprocessed image located in a RAW region, where the second image includes a second image with a long exposure, a second image with a short exposure, and a second image with a moderate exposure, the first image includes a first image with a long exposure, a first image with a short exposure, and a first image with a moderate exposure, the fourth image includes a fourth image with a long exposure, a fourth image with a short exposure, and a fourth image with a moderate exposure, and the third preprocessing is used to perform fusion on the second images, first images, or fourth images with different exposures; performing front-end processing on the third preprocessed image to obtain a corresponding front-end processed image; and performing back-end processing on the front-end processed image to obtain a corresponding back-end processed image, where the back-end processed image is the shot image.

In this implementation, in the video mode or the HDR mode, fusion processing of a plurality of frames of images with different exposures and the foregoing front-end processing and back-end processing are performed based on a plurality of frames of first images, second images, or fourth images, and a shot image with higher definition and better quality can be obtained through fusion.

In a possible implementation of the first aspect, the method further includes: detecting a seventeenth operation on the second widget; responding to the seventeenth operation, where the second widget indicates a wide aperture mode or a portrait mode; detecting an eighteenth operation on the first screen; capturing, by the electronic device in response to the eighteenth operation, a second image by using the first camera, and capturing a third image by using the second camera; separately performing front-end processing on the second image and the third image to obtain a front-end processed image corresponding to the second image and a front-end processed image corresponding to the third image; separately performing fusion on the front-end processed image corresponding to the second image by using the front-end fusion module, to obtain a front-end fused image corresponding to the second image; performing back-end processing on both the front-end fused image corresponding to the second image and the front-end processed image corresponding to the third image, to obtain corresponding back-end processed images; performing depth estimation processing on the back-end processed image corresponding to the second image and the back-end processed image corresponding to the third image, to obtain a depth map; and performing blurring processing on the back-end processed image corresponding to the second image by using the depth map, to obtain a corresponding blurring-processed image, where the blurring-processed image is the shot image.

In this implementation, in the wide aperture mode or the portrait mode, after the foregoing series of processing based on the second image and the third image with different fields of view and different richness of details, a shot image with higher foreground definition and better quality can be obtained through fusion.

In a possible implementation of the first aspect, the electronic device further includes a TOF camera, and the method further includes: detecting a nineteenth operation on the first screen; capturing, by the electronic device in response to the nineteenth operation, a second image by using the first camera, obtaining depth information by using the TOF camera, and generating a depth map by using the depth information; performing front-end processing on the second image to obtain a corresponding front-end processed image; performing fusion on the front-end processed image corresponding to the second image by using the front-end fusion module, to obtain a front-end fused image corresponding to the second image; performing back-end processing on the front-end fused image to obtain a corresponding back-end processed image; and performing blurring processing on the back-end processed image corresponding to the second image by using the depth map, to obtain a corresponding blurring-processed image, where the blurring-processed image is the shot image.

In this implementation, in the wide aperture mode or the portrait mode, after the foregoing series of processing based on the second image and the depth map representing the depth information, a shot image with higher foreground definition and better quality can be obtained through fusion.

In a possible implementation of the first aspect, the method further includes: when the second widget indicates the portrait mode, performing beautification processing on the blurring-processed image to obtain a beautification-processed image, where the beautification-processed image is the shot image. In this implementation, in the portrait mode, beautification processing can be used to beautify a face region to improve a visual effect of the image.

In a possible implementation of the first aspect, the first preprocessing includes at least one of registration, default pixel correction, RAW region noise reduction, black level correction, lens shading correction, and automatic white balance. In this implementation, the visual effect of the image can be improved by performing a plurality of steps in the first preprocessing of the image.

In a possible implementation of the first aspect, the front-end processing includes at least one of registration, default pixel correction, RAW region noise reduction, black level correction, lens shading correction, automatic white balance, color correction, dynamic range compression, and Gamma correction. In this implementation, the visual effect of the image can be improved by performing a plurality of steps in the front-end processing of the image.

In a possible implementation of the first aspect, the back-end processing includes at least one of video stabilization, color enhancement, style transformation, and super-resolution reconstruction. In this implementation, the detail richness and quality of the image can be improved by performing a plurality of steps in the back-end processing.

In a possible implementation of the first aspect, when the second widget indicates the video mode, the method further includes: detecting a twentieth operation on the first widget; switching from the first zoom ratio to the second zoom ratio in response to the twentieth operation; and in response to switching from the first zoom ratio to the second zoom ratio, switching, by the electronic device, from capturing images by using the first camera to capturing images by using the third camera, where the first camera is an auxiliary camera; or detecting a twenty-first operation on the first control; switching from the first zoom ratio to the third zoom ratio in response to the twenty-first operation; and in response to switching from the first zoom ratio to the third zoom ratio, switching, by the electronic device, from capturing images by using the first camera to capturing images by using the fourth camera, where the first camera is an auxiliary camera.

In this implementation, by switching a plurality of cameras, it is possible to run in advance a camera for capturing images in an adjacent zoom ratio range while implementing relay zooming, or to delay closing a camera that captures images in a previous zoom ratio range. Therefore, overall zoom ratio coverage of the electronic device is wider, and switching can be smoother.

According to a second aspect, an electronic device is provided and includes a camera module, a processor, and a memory, where the camera module is configured to obtain raw images;
the memory is configured to store a computer program capable of running on the processor; and
the processor is configured to perform the method for image or video shooting provided by the first aspect or any possible implementation of the first aspect.

In a possible implementation of the second aspect, the camera module includes a plurality of cameras, and the plurality of cameras include a wide-angle camera, a main camera, a black and white camera, and a long-focus camera; the plurality of cameras are configured to shoot a same to-be-shot scene; the wide-angle camera is configured to obtain a first image after the processor obtains a photographing instruction; the main camera is configured to obtain a second image after the processor obtains the photographing instruction; the black and white camera is configured to obtain a third image after the processor obtains the photographing instruction; and the long-focus camera is configured to obtain a fourth image after the processor obtains the photographing instruction.

According to a third aspect, a chip is provided and includes a processor, configured to invoke a computer program from a memory and run the computer program, so that a device equipped with the chip performs the method for image or video shooting provided by the first aspect or any possible implementation of the first aspect.

According to a fourth aspect, a computer-readable storage medium is provided, where the computer-readable storage medium stores a computer program, the computer program includes program instructions, and when the program instructions are executed by a processor, the processor is enabled to perform the method for image or video shooting provided by the first aspect or any possible implementation of the first aspect.

According to a fifth aspect, a computer program product is provided, where the computer program product includes a computer-readable storage medium storing a computer program, and the computer program enables a computer to perform the method for image or video shooting provided by the first aspect or any possible implementation of the first aspect.

For beneficial effects of the third, fourth, and fifth aspects, refer to the beneficial effects of the first aspect. Details are not described herein again.

Figure 1:
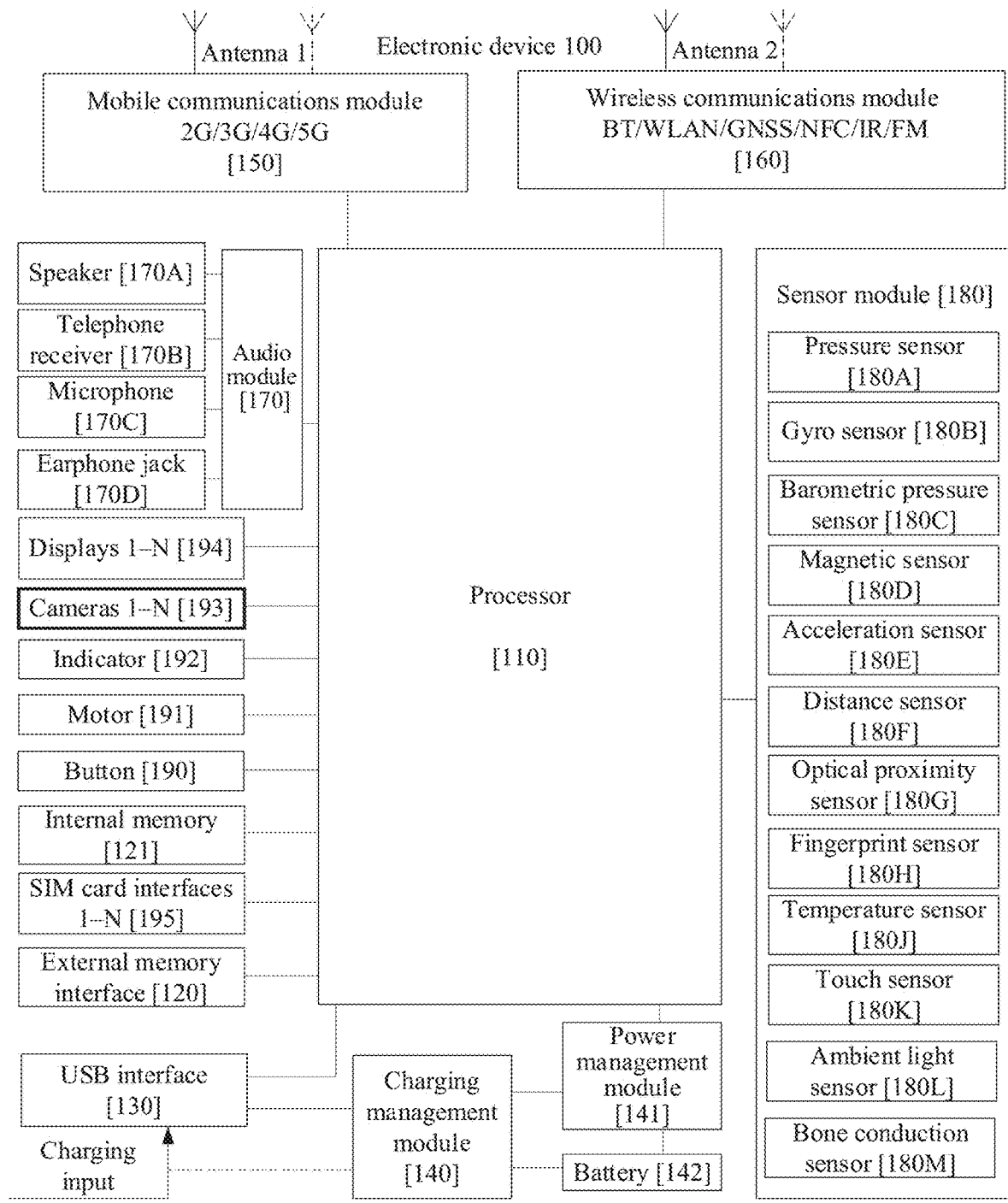
FIG. 1 is a schematic diagram of a structure of an electronic device, according to an embodiment of this application.

REFERENCE NUMERALS 41. wide aperture mode; 42. night mode; 43. portrait mode; 44. photo mode; 45. video mode; 50. shooting button; 60. viewfinder window; 61. zoom option; 100. electronic device; 193. camera; 1931. main camera; 1932. black and white camera; 1933. wide-angle camera; 1934. long-focus camera; 1935. TOF camera; 210. application layer; 220. application framework layer; 230. hardware abstraction layer; 240. driver layer; and 250. hardware layer.

DESCRIPTION OF EMBODIMENTS

The following describes the technical solutions in this application with reference to the accompanying drawings.

In the description of the embodiments of this application, unless otherwise specified, "/" indicates an "or" relationship. For example, the term "A/B" may represent A or B. The term "and/or" in this specification is only an association relationship for describing associated objects and represents that three relationships may exist. For example, "A and/or B" may represent the following three cases: only A, both A and B, and only B. In addition, in the description of the embodiments of this application, the term "a plurality of" indicates two or more.

Hereinafter, the terms "first" and "second" are intended only for description, and shall not be understood as an indication or implication of relative importance or an implicit indication of a quantity of indicated technical features. Therefore, a feature defined by "first" or "second" may explicitly or implicitly include one or more features. In the description of the embodiments, unless otherwise specified, the term "a plurality of" means two or more.

In addition, each aspect or feature of this application may be implemented as a method, an apparatus, or an article of manufacture using standard programming and/or engineering technologies. The term "article of manufacture" used in this application is intended to encompass a computer program accessible from any computer-readable device, carrier, or medium. For example, the computer-readable medium may include but is not limited to a magnetic storage device (for example, a hard disk, a floppy disk, or a magnetic tape), an optical disk (for example, a compact disc (CD), or a digital versatile disc (DVD)), a smart card, and a flash memory device (for example, an erasable programmable read-only memory (EPROM), a card, a stick, or a key drive). In addition, various storage media described in this specification may represent one or more devices and/or other machine-readable media for storing information. The term "machine-readable medium" may include but is not limited to radio channels and various other media capable of storing, containing, and/or carrying instructions and/or data.

Each aspect or feature of this application may be implemented as a method, an apparatus, or an article of manufacture using standard programming and/or engineering technologies. The term "article of manufacture" used in this application is intended to encompass a computer program accessible from any computer-readable device, carrier, or medium. For example, the computer-readable medium may include but is not limited to a magnetic storage device (for example, a hard disk, a floppy disk, or a magnetic tape), an optical disk (for example, a compact disc (CD), or a digital versatile disc (DVD)), a smart card, and a flash memory device (for example, an erasable programmable read-only memory (EPROM), a card, a stick, or a key drive). In addition, various storage media described in this specification may represent one or more devices and/or other machine-readable media for storing information. The term "machine-readable medium" may include but is not limited to radio channels and various other media capable of storing, containing, and/or carrying instructions and/or data.

First, some terms in the embodiments of this application are described for ease of understanding by a person skilled in the art.

1. Focal length: A value of the focal length indicates a value of refractive power. The shorter the focal length, the greater the refractive power. A focal length of an optical lens assembly determines a size of an image generated on an imaging plane for an object photographed by the optical lens assembly. Assuming that a same object is photographed at a same distance, the longer the focal length of the optical lens assembly, the greater a magnification of an image generated for the photographed object on a charge-coupled device (CCD).

2. Optical zoom: It is mainly a contrast ratio and switching of different focal lengths in a camera module. An optical zoom capability may be expressed as an optical zoom ratio. The greater the optical zoom ratio, the farther the object can be photographed. A value of the optical zoom ratio is related to a physical focal length of the optical lens assembly. Usually, an equivalent focal length of the camera module is 28 mm, which corresponds to 1× (that is, 1 time) optical zoom.

3. RGB (red, green, blue) color space: It refers to a color model related to a structure of a human visual system. Depending on a structure of a human eye, all colors are considered as different combinations of red, green, and blue.

4. YUV color space: It refers to a color coding method, where Y represents luminance, and U and V represent chrominance. The RGB color space focuses on the human eye's sensitivity to color. The YUV color space focuses on visual sensitivity to luminance. The RGB color space and the YUV color space can be converted to each other.
5. Pixel value: It refers to a group of color components corresponding to each pixel in a color image located in the RGB color space. For example, each pixel corresponds to a group of three primary color components, where the three primary color components are a red component R, a green component G, and a blue component B respectively.
6. Bayer pattern color filter array (CFA): When an image is converted from an actual object into image data, an image sensor usually receives a red channel signal, a green channel signal, and a blue channel signal, and information of the three channel signals separately, and then combines the information of the three channel signals into a color image. However, in this solution, three filters are correspondingly required at each pixel position. The filters are expensive and difficult to manufacture. Therefore, a surface of the image sensor may be covered with a color filter array layer to obtain the information of the three channel signals. The Bayer pattern color filter array means that filters are arranged in a checkerboard pattern. For example, a minimum repeating unit in the Bayer pattern color filter array is: one filter for obtaining a red channel signal, two filters for obtaining a green channel signal, and one filter for obtaining a blue channel signal are arranged in a 2×2 manner.
7. Bayer pattern image: It is an image output by the image sensor based on the Bayer pattern color filter array. Pixels of a plurality of colors in the image are arranged in a Bayer pattern. Each pixel in the Bayer pattern image corresponds to a channel signal of only one color. For example, because human vision is sensitive to green, it can be specified that a green pixel (a pixel corresponding to a green channel signal) accounts for 50% of all pixels, and each of a blue pixel (a pixel corresponding to a blue channel signal) and a red pixel (a pixel corresponding to a red channel signal) accounts for 25% of all the pixels. A minimum repeating unit of the Bayer pattern image is: one red pixel, two green pixels, and one blue pixel are arranged in the 2×2 manner.
8. Gray image: The gray image is a single channel image used to represent different degrees of luminance, with the brightest being full white and the darkest being full black. In other words, each pixel in the gray image corresponds to a different degree of luminance between black and white. Generally, to describe a luminance variation between the brightest and the darkest, luminance is divided, for example, into 256 parts, that is, representing 256 levels of luminance, and referred to as 256 gray scales (gray scale 0 to gray scale 255).

The foregoing is a brief description of the terms used in the embodiments of this application. The terms are not described again hereinafter.

The method for image or video shooting provided in the embodiments of this application may be applied to various electronic devices, or may be a separate application program. The application program can implement a method of switching different cameras in different shooting modes to perform photographing and fusion to obtain an image with higher definition in this application.

In some embodiments of this application, the electronic device may be various shooting apparatuses such as a motion camera (GoPro) and a digital camera, a mobile phone, a tablet computer, a wearable device, an in-vehicle device, an augmented reality (AR) or virtual reality (VR) device, a notebook computer, an ultra-mobile personal computer (UMPC), a netbook, a personal digital assistant (PDA), or the like, or may be other devices or apparatuses capable of image processing. A specific type of the electronic device is not limited in the embodiments of this application.

The following uses an example in which an electronic device is a mobile phone. FIG. 1 is a schematic diagram of a structure of an electronic device 100 according to an embodiment of this application.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural network processing unit (NPU). Different processing units may be independent components, or may be integrated into one or more processors.

The controller may be a nerve center and a command center of the electronic device 100. The controller may generate an operation control signal based on instruction operation code and a timing signal, and implement control over instruction fetching and instruction execution.

A memory may be further disposed in the processor 110, and is configured to store an instruction and data. In some embodiments, the memory in the processor 110 is a cache memory. The memory may store an instruction or data that has just been used or cyclically used by the processor 110. If the processor 110 needs to use the instruction or data again, the processor 110 may invoke the instruction or data directly from the memory. Therefore, repeated access is avoided, a waiting time of the processor 110 is reduced, and efficiency of the system is improved.

The processor 110 may execute software code of a method for image or video shooting provided in an embodiment of this application to shoot an image with high definition.

In some embodiments, the processor 110 may include one or more interfaces. The interface may include an integrated circuit (inter-integrated circuit, I2C) interface, an integrated circuit built-in audio (inter-integrated circuit sound, I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, and/or a universal serial bus (USB) interface, or the like.

It may be understood that an interface connection relationship between the modules illustrated in this embodiment of this application is only a schematic illustration, and does not constitute a limitation on the structure of the electronic device 100. In other embodiments of this application, the electronic device 100 may alternatively use interface connection manners different from those in the foregoing embodiments, or a combination of a plurality of interface connection manners.

The charging management module 140 is configured to receive a charging input from a charger. The charger may be a wireless charger, or may be a wired charger.

The power management module 141 is configured to connect the battery 142, the charging management module 140, and the processor 110. The power management module 141 receives an input from the battery 142 and/or the charging management module 140, and supplies power to the processor 110, the internal memory 121, the display 194, the camera 193, the wireless communications module 160, and the like. The power management module 141 is further configured to monitor parameters such as a battery capacity, a quantity of battery cycles, and a battery health status (electric leakage and impedance).

The electronic device 100 implements a display function by using the GPU, the display 194, the application processor, and the like. The GPU is a microprocessor used for image processing, and is connected to the display 194 and the application processor. The GPU is configured to perform mathematical and geometric computation for graphic rendering. The processor 110 may include one or more GPUs, and the GPU executes a program instruction to generate or change display information.

The display 194 is configured to display an image, a video, and the like. The display 194 includes a display panel. The display panel may use a liquid crystal display (LCD), an organic light-emitting diode (OLED), an active-matrix organic light emitting diode or an active matrix organic light emitting diode (AMOLED), a flex light-emitting diode (FLED), a mini light-emitting diode (LED), micro LED, micro OLED, a quantum dot light emitting diode (QLED), or the like. In some embodiments, the electronic device 100 may include one or N displays 194, where N is a positive integer greater than 1.

The electronic device 100 may implement a shooting function by using the ISP, the camera 193, the video codec, the GPU, the display 194, the application processor, or the like.

The ISP is configured to process data fed back by the camera 193. For example, during photographing, a shutter is opened, light is transmitted to a photosensitive element of a camera through a lens, an optical signal is converted into an electrical signal, and the photosensitive element of the camera transmits the electrical signal to the ISP for processing, so that the electrical signal is converted into an image visible to a naked eye. The ISP can also optimize noise, luminance, and a skin color of the image. The ISP can also optimize parameters such as an exposure and a color temperature of a shot scene. In some embodiments, the ISP may be disposed in the camera 193.

The camera 193 is configured to capture still images or videos. Startup of the camera may be triggered by using an application program instruction, to implement the photographing function, such as shooting to obtain an image of any scene. The camera may include components such as an imaging lens, a filter, and an image sensor. Light emitted or reflected by an object enters the imaging lens, passes through the filter, and finally converges on the image sensor. The imaging lens is mainly used for convergence and imaging of light emitted or reflected by all objects (also referred to as a to-be-shot scene or a target scene, which may also be understood as a scene image that a user expects to shoot) in a photographing angle. The filter is mainly configured to filter out redundant light waves in the light (for example, light waves other than visible light, such as infrared). The image sensor may be a charge-coupled device (CCD) or a complementary metal-oxide-semiconductor (CMOS) phototransistor. The image sensor is mainly configured to perform photoelectric conversion on a received optical signal, convert the optical signal into an electrical signal, and then transmit the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The camera 193 may be located on a front side of the electronic device 100 or on a back side of the electronic device 100, and a specific quantity and arrangement of cameras may be set based on a requirement, which is not limited in this application.

For example, the electronic device 100 includes a front-facing camera and a rear-facing camera. For example, the front-facing camera or the rear-facing camera may include one or more cameras. For example, the electronic device 100 has four rear-facing cameras. When the electronic device 100 starts the four rear-facing cameras for shooting, the method for image or video shooting provided in this embodiment of this application can be used. Alternatively, the camera is disposed on an external accessory of the electronic device 100. The external accessory is rotatably connected to a frame of the electronic device 100, and an angle formed between the external accessory and the display 194 of the electronic device 100 is any angle between 0 degrees and 360 degrees. For example, when the electronic device 100 is self-shooting, the external accessory drives the camera to rotate to a position facing the user. Certainly, when the electronic device 100 has a plurality of cameras, only a part of the cameras may be disposed on the external accessory, and the remaining cameras may be disposed on a body of the electronic device 100. This is not limited in this embodiment of this application.

The digital signal processor is configured to process a digital signal. In addition to processing a digital image signal, the digital signal processor can also process other digital signals. For example, when the electronic device 100 selects a frequency, the digital signal processor is configured to perform a Fourier transform or the like on energy of the frequency.

The internal memory 121 may be configured to store computer-executable program code, where the computer-executable program code includes an instruction. The internal memory 121 may include a program storage area and a data storage area. The program storage area may store an operating system, an application program (for example, a sound playback function or an image playback function) required by at least one function, and the like. The data storage area may store data (such as audio data and a phone book) created in use of the electronic device 100. In addition, the internal memory 121 may include a high-speed random access memory, and may further include a non-volatile memory, for example, at least one magnetic disk storage device, a flash memory, or a universal flash storage (UFS). The processor 110 executes various functional applications of the electronic device 100 and data processing by executing instructions stored in the internal memory 121 and/or instructions stored in the memory disposed in the processor.

The internal memory 121 may also store software code of the method for image or video shooting provided in this embodiment of this application. When running the software code, the processor 110 performs steps of the method for image or video shooting, to obtain an image with higher definition.

The internal memory 121 may further store a shot image.

The external memory interface 120 may be configured to connect an external storage card, for example, a micro-SD card, to expand a storage capacity of the electronic device 100. The external storage card communicates with the processor 110 by using the external memory interface 120, to implement a data storage function. For example, files such as music are stored in the external storage card.

Certainly, the software code of the method for image or video shooting provided in this embodiment of this application may alternatively be stored in an external memory. The processor 110 may execute the software code by using the external memory interface 120, to perform the steps of the method for image or video shooting, and obtain an image with higher definition. The image shot by the electronic device 100 may alternatively be stored in the external memory.

It should be understood that the user may specify whether the image is to be stored in internal memory 121 or the external memory. For example, when the electronic device 100 is connected to the external memory, if the electronic device 100 shoots one frame of image, prompt information may be displayed to prompt the user to store the image in the external memory or the internal memory. Certainly, another manner may be used to specify the storage, and this is not limited in this embodiment of this application. Alternatively, the electronic device 100 may automatically store the image in the external memory when detecting that an amount of memory in the internal memory 121 is less than a preset amount.

The electronic device 100 may implement an audio function by using the audio module 170, the speaker 170A, the receiver 170B, the microphone 170C, the headset jack 170D, the application processor, or the like, for example, music playback, or recording.

The pressure sensor 180A is configured to sense a pressure signal, and may convert the pressure signal into an electrical signal. In some embodiments, the pressure sensor 180A may be disposed on the display 194.

The gyro sensor 180B may be configured to determine a motion posture of the electronic device 100. In some embodiments, an angular velocity of the electronic device 100 around three axes (x, y, and z axes) may be determined by using the gyro sensor 180B. The gyro sensor 180B may be used for shooting stabilization.

The barometric pressure sensor 180C is configured to measure barometric pressure. In some embodiments, the electronic device 100 calculates an altitude for assisted positioning and navigation by using a barometric pressure value measured by the barometric pressure sensor 180C.

The magnetic sensor 180D includes a Hall effect sensor. The electronic device 100 may detect opening and closing of a flip smart cover by using the magnetic sensor 180D. In some embodiments, when the electronic device 100 is a flip phone, the electronic device 100 may detect opening and closing of a flip cover based on the magnetic sensor 180D. Further, based on a detected opening/closing state of the smart cover or an opening/closing state of the flip cover, a feature such as automatic unlocking of the flip cover is set.

The acceleration sensor 180E may detect magnitudes of accelerations of the electronic device 100 in various directions (generally three axes). A magnitude and direction of gravity can be detected when the electronic device 100 is stationary. The acceleration sensor 180E may be further configured to recognize a posture of the electronic device, and applied to applications such as screen switching between portrait and landscape and a pedometer.

The distance sensor 180F is configured to measure a distance. The electronic device 100 may measure a distance by using infrared or a laser. In some embodiments, in the shot scene, the electronic device 100 may measure the distance by using the distance sensor 180F, to implement fast focusing.

The optical proximity sensor 180G may include, for example, a light emitting diode (LED) and a light detector, for example, a photodiode. The light emitting diode may be an infrared light emitting diode. The electronic device 100 emits infrared light outward by using the light emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off the screen and save power. The optical proximity sensor 180G can also be used for a smart cover mode, a pocket mode, and automatic screen unlocking and locking.

The ambient light sensor 180L is configured to sense ambient light luminance. The electronic device 100 may adaptively adjust luminance of the display 194 based on the sensed ambient light luminance. The ambient light sensor 180L may also be configured to automatically adjust white balance during photographing. The ambient light sensor 180L may further cooperate with the optical proximity sensor 180G to detect whether the electronic device 100 is in a pocket, to avoid an unintentional touch.

The fingerprint sensor 180H is configured to capture a fingerprint. The electronic device 100 may implement fingerprint unlocking, application lock accessing, fingerprint photographing, fingerprint call receive, and the like by using features of the captured fingerprint.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 reduces performance of a processor located near the temperature sensor 180J, to reduce power consumption and implement heat protection. In other embodiments, when the temperature is less than another threshold, the electronic device 100 heats the battery 142, to avoid abnormal shutdown of the electronic device 100 due to a low temperature. In other embodiments, when the temperature is less than still another threshold, the electronic device 100 boosts an output voltage of the battery 142, to avoid abnormal shutdown due to a low temperature.

The touch sensor 180K is also known as a "touch device". The touch sensor 180K may be disposed on the display 194, and the touch sensor 180K and the display 194 form a touchscreen, which is also referred to as a "touch screen".

The touch sensor 180K is configured to detect a touch operation that acts on or near the touch sensor 180K. The touch sensor may transmit the detected touch operation to the application processor to determine a touch event type. A visual output related to the touch operation may be provided by using the display 194. In other embodiments, the touch sensor 180K may alternatively be disposed on a surface of the electronic device 100, or disposed in a position different from the display 194.

The bone conduction sensor 180M can obtain a vibration signal. In some embodiments, the bone conduction sensor 180M can obtain a vibration signal of a voice part vibration bone block of a human body. The bone conduction sensor 180M can also sense a human pulse and receive a heartbeat signal. In some embodiments, the bone conduction sensor 180M may alternatively be disposed in an earphone and combined with the earphone into a bone conduction earphone. The audio module 170 can parse a voice signal based on the vibration signal of the voice part vibration bone block that is obtained by the bone conduction sensor 180M, to implement a voice function. The application processor can parse heart rate information based on the heartbeat signal obtained by the bone conduction sensor 180M, to implement a heart rate detection function.

The button 190 includes a power on/off button, a volume button, or the like. The button 190 may be a mechanical button or a touch button. The electronic device 100 may receive a button-based input, and generate a button signal input related to user setting or function control of the electronic device 100.

The motor 191 may generate a vibration alert. The motor 191 may be configured to generate a vibration alert for an incoming call, and may also be configured to feed back a touch vibration. For example, touch operations acting on different applications (for example, photographing and audio playback) may correspond to different vibration feedback effects.

The indicator 192 may be an indicator light, and may be configured to indicate a state of charge or a change of power level, and may also be configured to indicate a message, a missed call, a notification, or the like.

The SIM card interface 195 is configured to connect a SIM card. The SIM card may be inserted into the SIM card interface 195 or pulled out of the SIM card interface 195, so that the SIM card is in contact with or detached from the electronic device 100.

It may be understood that the structure illustrated in this embodiment of this application does not constitute a specific limitation on the electronic device 100. In other embodiments of this application, the electronic device 100 may include more or fewer components than those shown in the figure, or some components are combined, or some components are split, or component arrangements are different. The illustrated components may be implemented by hardware, software, or a combination of software and hardware.

A hardware system of the apparatus 100 is described in detail above. The following describes a software system of the apparatus 100. The software system of the electronic device 100 may use a hierarchical architecture, an event driven architecture, a microkernel architecture, a microservice architecture, or a cloud architecture. It should be noted that, in this embodiment of this application, the operating system of the electronic device may include but is not limited to an operating system such as Symbian® (Symbian), Android® (Android), Windows®, Apple® (iOS), Blackberry® (Blackberry), or Harmony (HarmonyOS). This is not limited in this application.

Figure 2:
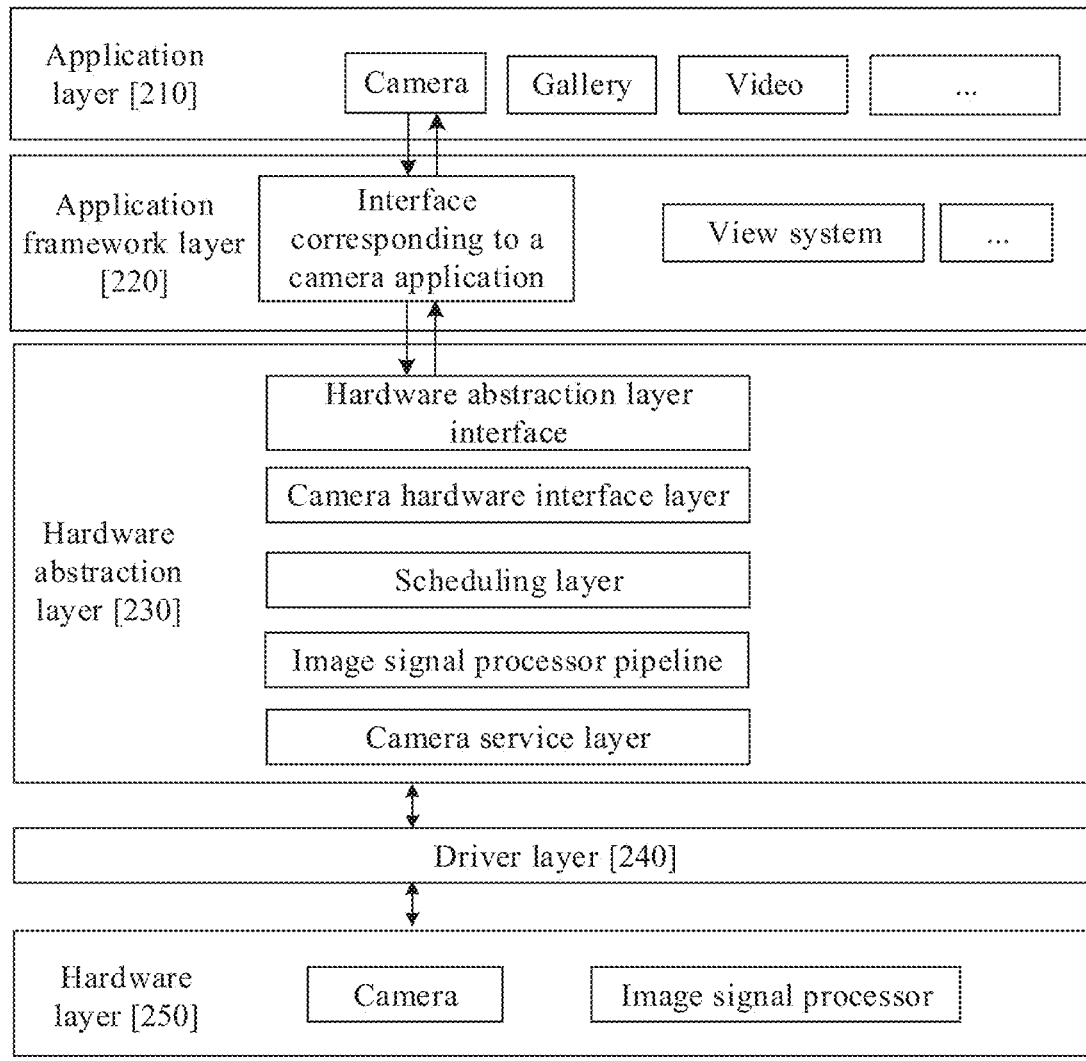
FIG. 2 is a block diagram of a software structure of an electronic device, according to an embodiment of this application.

A software structure of the electronic device 100 is illustrated in this embodiment of this application by using a hierarchical Android system as an example. FIG. 2 is a block diagram of the software structure of the electronic device 100 according to an embodiment of this application.

In the hierarchical architecture, software is divided into several layers, each with a clear role and function. Communication is performed between the layers through a software interface. In some embodiments, the Android system is divided into five layers from top to bottom: an application program layer 210, an application program framework layer 220, a hardware abstraction layer 230, a driver layer 240, and a hardware layer 250.

The application program layer 210 may include a series of application packages.

As shown in FIG. 2, the application program package may include application programs such as camera, gallery, calendar, call, map, navigation, WLAN, Bluetooth, music, video, and messaging.

The application program framework layer 220 provides an application programming interface (API) and a programming framework for application programs at the application program layer. The application program framework layer 220 includes some predefined functions.

As shown in FIG. 2, the application program framework layer 220 may include an interface corresponding to a camera application, a view system, and the like.

The view system includes visual controls such as a control for text displaying and a control for picture displaying. The view system may be configured to construct an application program. A display interface includes one or more view systems. For example, a display interface including a messaging notification icon may include a view for text displaying and a view for picture displaying.

As shown in FIG. 2, the hardware abstraction layer (HAL) 230 is configured to abstract hardware. For example, the hardware abstraction layer 30 includes a hardware abstraction layer interface (HAL interface), a camera hardware interface layer (hardware interface), a scheduling layer, an image signal processor pipeline (ISP pipeline), a camera service layer, and the like.

The driver layer 240 is configured to provide drivers for different hardware devices. For example, the driver layer 240 may include a camera driver, a digital signal processor driver, and a graphics processing unit driver.

The hardware layer 250 may include an image sensor (sensor), an image processor, a digital signal processor, a graphics processing unit, and other hardware devices.

In this application, by invoking the hardware abstraction layer interface in the hardware abstraction layer 230, connections between the application program layer 210 and application program framework layer 220 above the hardware abstraction layer 230 and the driver layer 240 and hardware layer 250 below the hardware abstraction layer 230 can be implemented to implement camera data transmission and function control.

In the camera hardware interface layer in the hardware abstraction layer 230, a vendor can customize functions herein based on a requirement. Compared with the hardware abstraction layer interface, the camera hardware interface layer is more efficient and flexible, has a lower latency, and can also invoke the ISP and GPU in richer ways to implement image processing. An image input into the hardware abstraction layer 230 may an image coming from an image sensor or a memory.

The scheduling layer in the hardware abstraction layer 230 includes generic functional interfaces for implementing management and control.

The camera service layer in the hardware abstraction layer 230 is configured to access the ISP and interfaces of other hardware.

The following describes work processes of the software and hardware of the electronic device 100 by using an example with reference to a scene of capturing a photo.

The camera application in the application program layer may be displayed on the screen of the electronic device 100 in a form of an icon. When the icon of the camera application is tapped by the user for triggering, the electronic device 100 starts running the camera application. When the camera application runs on the electronic device 100, the camera application invokes an interface corresponding to the camera application in the application program framework layer 210, then starts the camera driver by invoking the hardware abstraction layer 230, starts the camera 193 on the electronic device 100, and captures an image by using the camera 193. In this case, the camera 193 may perform capture based on a working frequency, and save and/or transmit the captured image to the display for displaying.

For ease of understanding, assuming that the electronic device 100 is a mobile phone having the foregoing hardware structure and software structure, the following first describes in detail a camera and a screen on the electronic device 100 to which the method for image or video shooting provided in this embodiment of this application is applicable.

The electronic device to which the method for image or video shooting provided in this embodiment of this application is applicable has at least a plurality of cameras 193, for example, four cameras 193. The four cameras are a wide-angle camera 1933, a main camera 1931, a black and white camera 1932, and a long-focus camera 1934. The four cameras are configured to shoot a same to-be-shot scene.

Certainly, the electronic device 100 may also have other cameras 193. Types of the cameras 193 and a quantity of cameras 193 of each type may be set based on a requirement. This is not limited in this embodiment of this application. For example, the electronic device 100 has four cameras 193. The four cameras 193 may be an ultra-wide-angle camera, a wide-angle camera 1933, a black and white camera 1932, and a long-focus camera 1934.

It should be understood that during shooting of the four cameras 193, generally, a field of view corresponding to the main camera 1931 and a field of view corresponding to the black and white camera 1932 are basically the same in size, but a field of view corresponding to the wide-angle camera 1933 is greater than the field of view corresponding to the main camera 1931 and the field of view corresponding to the black and white camera 1932; and the field of view of the wide-angle camera 1933 overlaps the field of view of the main camera 1931 or the field of view of the black and white camera 1932, that is, the wide-angle camera 1933 can shoot scene content shot by the main camera 1931 and surrounding scene content thereof or scene content shot by the black and white camera 1932 and surrounding scene content thereof.

The field of view corresponding to the long-focus camera 1934 is smaller than the field of view corresponding to the main camera 1931, and the field of view of the main camera 1931 overlaps the field of view of the long-focus camera 1934, that is, the main camera 1931 can shoot scene content shot by the long-focus camera 1934 and surrounding scene content thereof.

The field of view of the wide-angle camera 1933 also overlaps the field of view of the long-focus camera 1934, that is, the wide-angle camera 1933 can shoot the scene content shot by the long-focus camera 1934 and surrounding scene content thereof.

Because a focusing distance of the wide-angle camera 1933 is relatively short, the wide-angle camera 1933 is suitable for shooting a near scene, and as the name implies, the wide-angle camera 1933 is suitable for shooting a scene with a relatively large field of view. The main camera 1931 is more suitable for shooting a portrait due to high definition, while the long-focus camera 1934 is more suitable for shooting a close-up view of a distant scene.

It should be understood that, generally, if the field of view corresponding to the camera 193 is smaller, an image is obtained with richer details and higher definition. Therefore, definition of an image obtained by the main camera 1931 is basically consistent with that of an image obtained by the black and white camera 1932, but definition of an image obtained by the wide-angle camera 1933 is lower than that of the image obtained by the main camera 1931, and definition of an image obtained by the long-focus camera 1934 is higher than that of the image obtained by the main camera 1931.

It should be understood that, generally, zoom ratio ranges of the main camera 1931 and the black and white camera 1932 are basically consistent, but a zoom ratio corresponding to the wide-angle camera 1933 is smaller than the zoom ratio of the main camera 1931, and a zoom ratio of the long-focus camera 1934 is larger than the zoom ratio of the main camera 1931.

For example, the zoom ratio range corresponding to the wide-angle camera 1933 is [0.1, 1), where 0.1 indicates a 0.1× zoom ratio and 1 indicates a 1× zoom ratio. The zoom ratio range corresponding to the main camera 1931 is [1, 3.9), the zoom ratio range corresponding to the black and white camera 1932 is [1, 2), and the zoom ratio range corresponding to the long-focus camera 1934 is [3.9, 100).

Features of each camera are described above. The following describes locations of the plurality of cameras on the electronic device.

Figure 3:
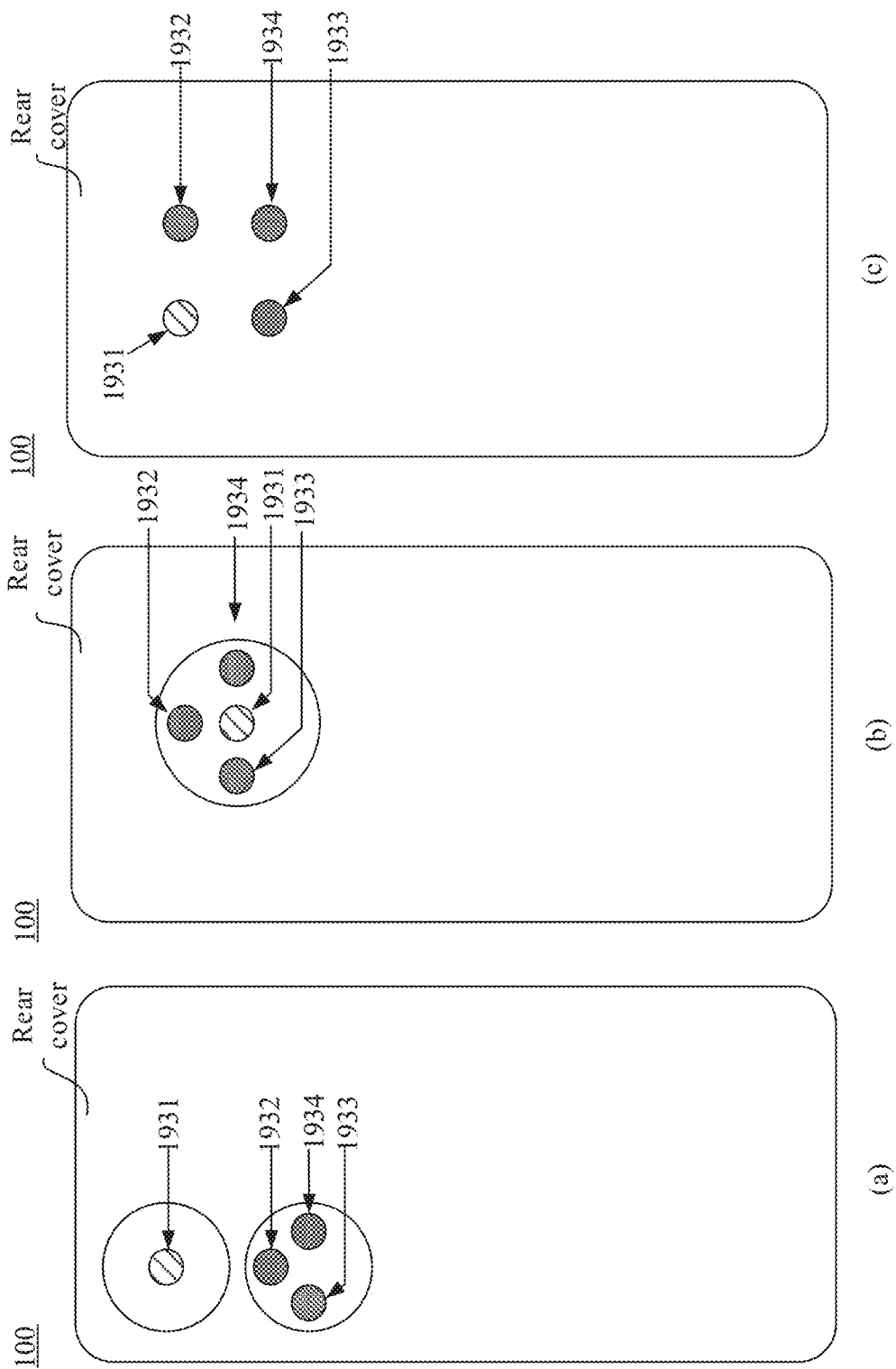
FIG. 3 is a schematic diagram of an arrangement of a plurality of cameras on an electronic device, according to an embodiment of this application.

FIG. 3 is a schematic diagram of three arrangements of the four cameras on a rear cover of the electronic device 100.

As shown in FIG. 3(*a*), the four cameras are arranged in an upper left corner of the rear cover of the electronic device 100. The main camera 1931, as a camera frequently used by the user, is separately distributed in a first circular area near an upper part of the rear cover. Three cameras, that is, the black and white camera 1932, the wide-angle camera 1933, and the long-focus camera 1934, are distributed in a second circular area near a lower part of the rear cover. In addition, a flashlight may also be disposed in the second circular area near the lower part of the rear cover.

As shown in FIG. 3(*b*), the four cameras are arranged in a circular area in the middle of the rear cover of the electronic device 100. The main camera 1931, as a camera frequently used by the user, is disposed at a central position of the circular area. Three cameras, that is, the black and white camera 1932, the wide-angle camera 1933, and the long-focus camera 1934, are distributed around the main camera 1931. In addition, in this circular area, a flashlight may also be disposed.

As shown in FIG. 3(*c*), the four cameras may alternatively be arranged in a form of a 2×2 array in an upper half of the rear cover of the electronic device 100. The main camera 1931, as a camera frequently used by the user, is disposed at the upper left corner of the rear cover. In addition, a flashlight may also be disposed at a center of the four cameras.

It should be understood that the foregoing three arrangements are only examples. Alternatively, the arrangements may be other arrangements. A specific arrangement may be designed and changed based on a requirement. This is not limited in this embodiment of this application.

It should also be understood that if the electronic device 100 has four cameras, where the four cameras are respectively the ultra-wide-angle camera, the wide-angle camera 1933, the black and white camera 1932, and the long-focus camera 1934, the four cameras may be arranged based on the three arrangements shown in FIG. 3, where the location of the wide-angle camera 1933 is equivalent to the location of the main camera 1931, the location of the ultra-wide-angle camera is equivalent to the location of the wide-angle camera 1933, and the corresponding locations of the black and white camera 1932 and the long-focus camera 1934 are unchanged.

Figure 4:
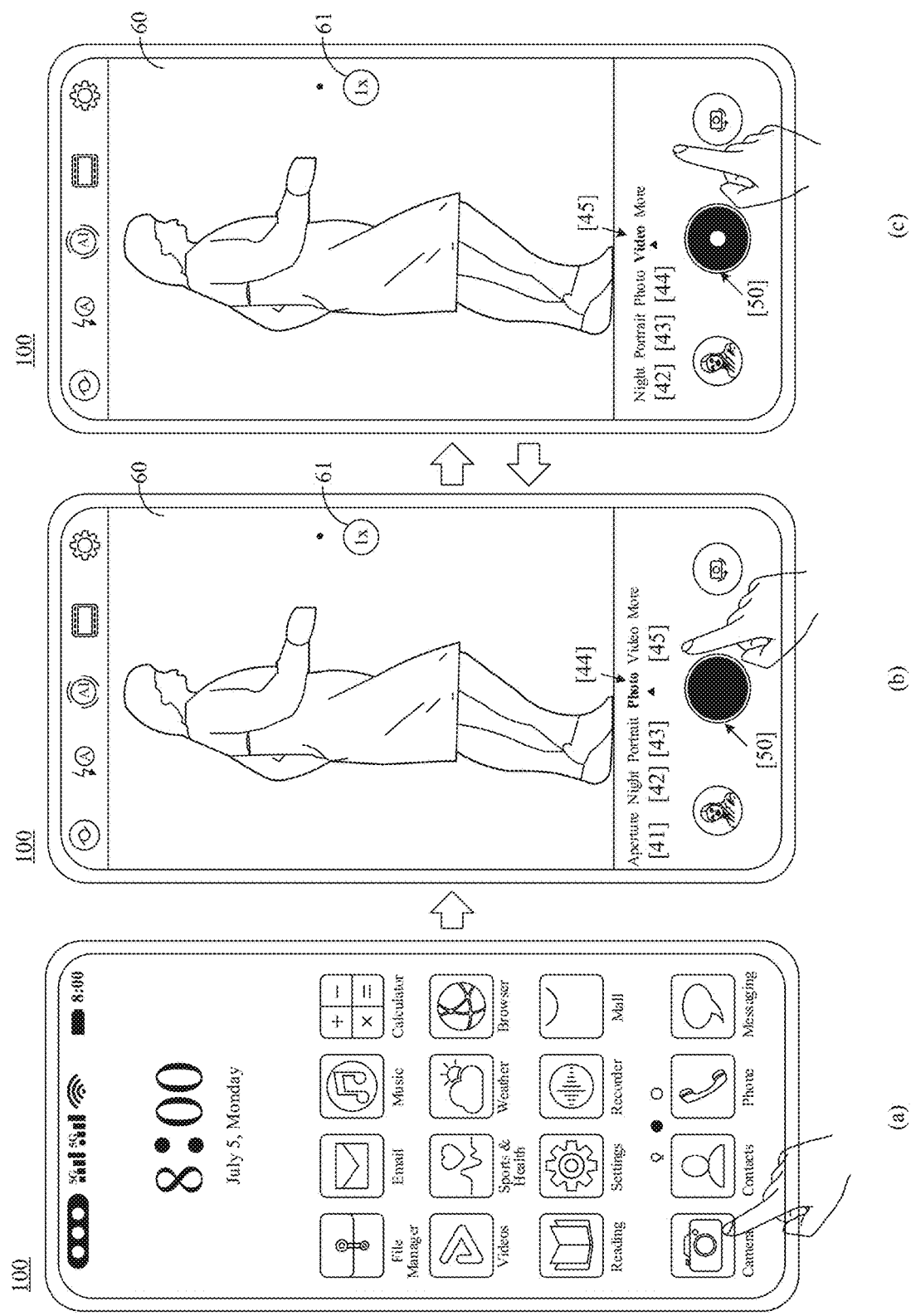
FIG. 4 is a schematic diagram of a screen of an electronic device, according to an embodiment of this application.

FIG. 4 is a schematic diagram of a screen of the electronic device according to an embodiment of this application.

As shown in FIG. 4(a), a camera application is installed on the electronic device 100. In addition, a plurality of applications are installed. This is not limited in this embodiment of this application. For example, in response to a touch operation of the user, when the electronic device 100 runs the camera application, the electronic device 100 displays a shooting screen shown in FIG. 4(b).

The shooting screen includes a plurality of shooting modes of the camera application, such as a wide aperture mode 41, a night mode 42, a portrait mode 43, a photo mode 44, and a video mode 45. The shooting screen further includes a second control. The second control is a shooting button 50, and the shooting button 50 indicates a current shooting mode. As shown in FIG. 4(b), the shooting button 50 indicates that the current shooting mode is the photo mode 44.

For example, in response to a touch operation of the user, when the electronic device 100 runs the camera application, the electronic device 100 displays a shooting screen shown in FIG. 4(c). Alternatively, on a basis that the electronic device 100 first displays the shooting screen shown in FIG. 4(b), in response to a slide operation of the user, the electronic device 100 displays the shooting screen shown in FIG. 4(c). Herein, the shooting button 50 indicates that the current shooting mode is the video mode 45.

In addition, in response to the slide operation of the user, the shooting button 50 may also indicate that the current shooting mode is the wide aperture mode 41, the night mode 42, the portrait mode 43, or the like. Each mode is used in a corresponding scene. For example, at night or in a dimly lit area, the night mode 42 may be used to obtain an image with high definition; or when a person is shot, facial features of the person in an image obtained by using the portrait mode 43 are apparent. It should be understood that the specific shooting mode may be switched based on the user's operation, and an arrangement order of the plurality of shooting modes on the screen of the electronic device may be set and changed based on a requirement. This is not limited in this embodiment of this application.

As shown in FIG. 4(b) and FIG. 4(c), the shooting screen further includes a viewfinder window 60, where the viewfinder window 60 may be used to display a preview image in real time before photographing or before video shooting. In addition, a first control is also displayed on the shooting screen, and the first control is a zoom option 61. The user may select a currently required zoom ratio in the zoom option 61, for example, a 0.5×, 2×, or 50× zoom ratio.

It should be understood that the zoom ratio refers to an optical zoom capability of the camera. The user can continuously zoom in a photographed object in the viewfinder window 60 by increasing the zoom ratio, and can continuously zoom out the photographed object in the viewfinder window 60 by decreasing the zoom ratio. Therefore, the user can select the zoom ratio by using the zoom option 61 on the electronic device 100; or may enter a gesture command on the display of the electronic device 100 to select the zoom ratio, to adjust a preview image displayed by the viewfinder window 60.

Figure 5:
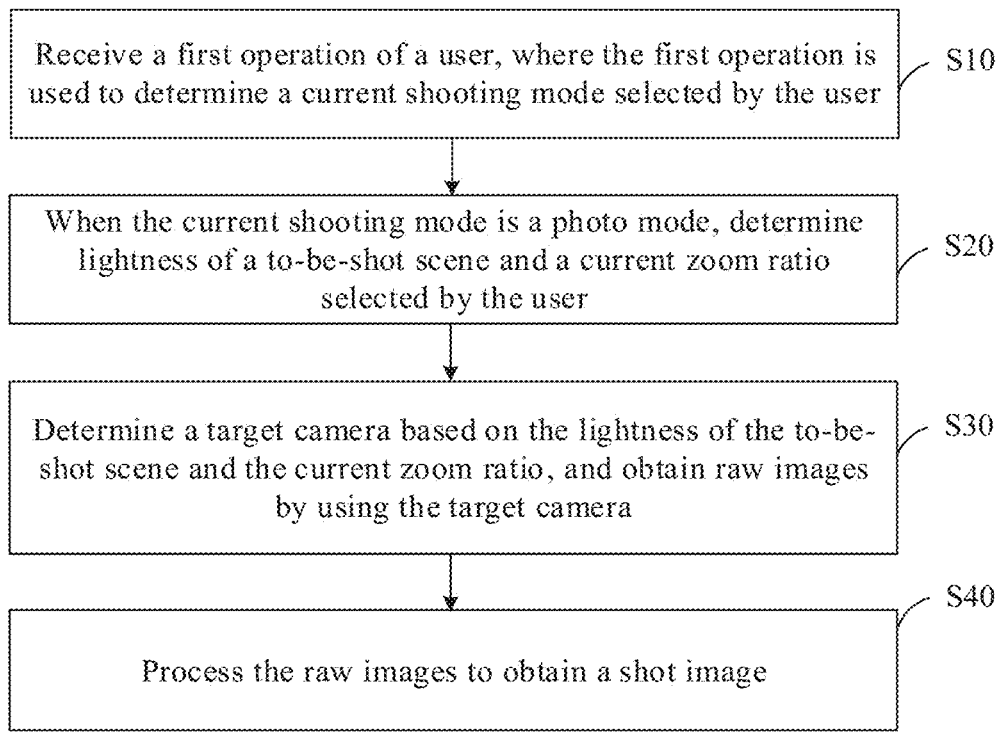
FIG. 5 is a schematic flowchart of a method for image or video shooting in a photo mode, according to an embodiment of this application.

Based on this, FIG. 5 is a schematic flowchart of a method for image or video shooting according to an embodiment of this application.

As shown in FIG. 5, the method includes the following S10 to S40.

S10. Receive a first operation of a user, where the first operation is used to determine a current shooting mode selected by the user, and the shooting mode includes a photo mode.

For example, with reference to FIG. 4(a), the first operation of the user such as a touch operation on the camera application is received, and then after the camera application is started, with reference to FIG. 4(b), the shooting button 50 indicates by default that the current shooting mode is the photo mode 44.

Alternatively, with reference to FIG. 4(c), the first operation of the user such as a slide operation is received, and then, with reference to FIG. 4(b), the shooting button 50 is changed from indicating that the current shooting mode is the video mode 45 to indicating that the current shooting mode is the photo mode 44.

It should be understood that the first operation may alternatively be another operation as long as the current shooting mode selected by the user can be determined. Optionally, this is also applicable when the shooting mode is a preview mode (including a preview mode in the photo mode, or a preview mode in the video mode) or a video mode. In this way, the first operation may be a corresponding related operation. This is not limited in this embodiment of this application.

S20. When the current shooting mode is the photo mode, determine lightness (lightness value) of a to-be-shot scene and a current zoom ratio selected by the user.

It should be understood that the lightness refers to a degree to which an object is illuminated, and specifically refers to energy of visible light received per unit area of the object. Generally, there is low lightness in a dark street, a dimly lit room, or the like. In contrast, lightness on a sunny playground, a spotlight stage, or the like may be referred to as medium or high lightness. If the lightness of the to-be-shot scene is relatively low, when the electronic device is used to shoot the to-be-shot scene, the scene is blurred with relatively poor effects. If the lightness of the to-be-shot scene is relatively high, when the electronic device is used to shoot the to-be-shot scene, the scene is clear and a shooting effect is relatively good.

It may be understood that the to-be-shot scene is a scene within a shooting range of a current camera.

Herein, for example, a photoelectric sensor in the electronic device 100 may be used to detect lightness of the to-be-shot scene.

Alternatively, the lightness may be further calculated by using a formula based on exposure parameters of the camera, such as an exposure time, sensitivity, and an aperture, and a received response value. In a case that the exposure parameters are the same, a higher response value indicates that the lightness of the to-be-shot scene is also higher, and therefore, the calculated value of the lightness is also larger.

Herein, before the current zoom ratio selected by the user is determined, the operation of the user needs to be received first. For example, the operation is a slide operation. In this case, accordingly, in response to the slide operation of the user on the zoom option 61, a zoom ratio indicated when the user stops sliding may be determined as a zoom ratio that the user expects to implement, that is, as the current zoom ratio selected by the user. The operation may alternatively be a pinchout operation, or may be a tap operation, or the like. This is not limited in this embodiment of this application.

S30. Determine a target camera based on the lightness of the to-be-shot scene and the current zoom ratio, and obtain raw images by using the target camera.

It should be understood that the target camera is one or more of a wide-angle camera 1933, a main camera 1931, a black and white camera 1932, and a long-focus camera 1934. With a preset correspondence between a plurality of cameras, lightness of the to-be-shot scene and the zoom ratio, a corresponding type and quantity of cameras can be determined based on the lightness of the to-be-shot scene and the current zoom ratio.

It should be understood that the raw image may also be referred to as a RAW image, and may refer to an image located in a RAW region. The image located in the RAW region includes a lot of detail information, with higher definition and a large amount of data. A quantity of raw images may be obtained based on a requirement. This is not limited in this embodiment of this application. When the target camera includes a plurality of cameras and/or a plurality of types of cameras, the raw image is a collective term for images obtained by the plurality of cameras and/or the plurality of types of cameras respectively.

It should be understood that when raw images are obtained by using a plurality of cameras among the wide-angle camera 1933, the main camera 1931, the black and white camera 1932, and the long-focus camera 1934, the raw images include a plurality of images with different fields of view or different definition.

S40. Process the raw images to obtain a shot image.

The processing of the raw images may be set and changed based on a requirement. This is not limited in this embodiment of this application.

In the method for image or video shooting provided in this embodiment of this application, when the shooting mode selected by the user is the photo mode, based on the lightness of the to-be-shot scene and the current zoom ratio selected by the user, the corresponding target camera is determined from the wide-angle camera, the main camera, the black and white camera, and the long-focus camera, the raw images are obtained by using the target camera, and then the raw images are processed to obtain the shot image. According to the method for image or video shooting provided in this application, during photographing, different cameras can be used based on different lightness and zoom ratios to obtain raw images. Therefore, different cameras can be used to obtain raw images with different fields of view and different definition, and cooperative processing can be performed by using a plurality of cameras, to improve quality of a shot image obtained after the raw images are processed.

Figure 6:
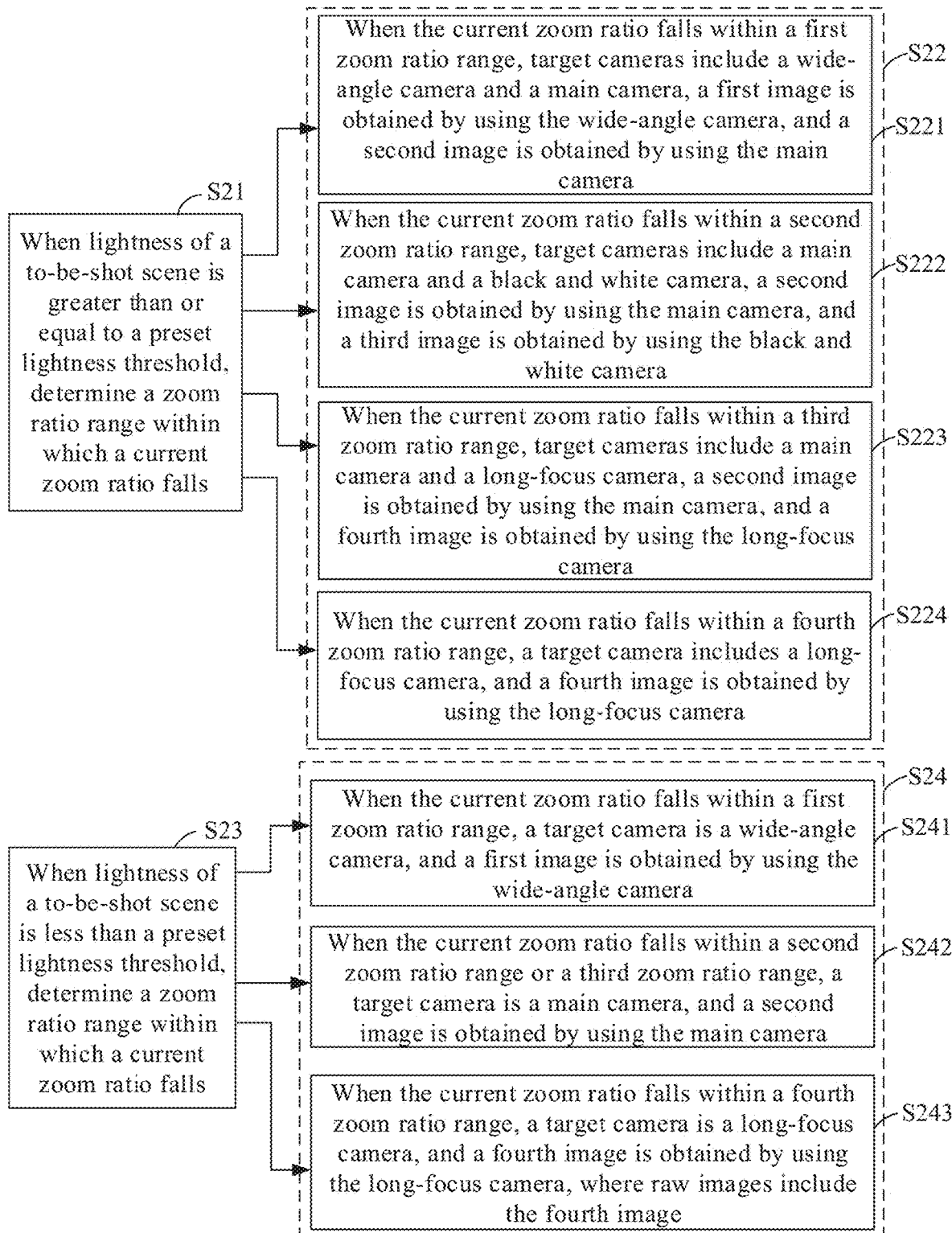
FIG. 6 is another schematic flowchart of a method for image or video shooting in a photo mode, according to an embodiment of this application.

Optionally, FIG. 6 is another schematic flowchart of a method for image or video shooting in a photo mode according to an embodiment of this application. As shown in FIG. 6, the foregoing S20 includes S21 to S24.

S21. When the lightness of the to-be-shot scene is greater than or equal to a preset lightness threshold, determine a zoom ratio range within which the current zoom ratio falls.

It should be understood that the preset lightness threshold may be set and changed based on a requirement. This is not limited in this embodiment of this application.

S22. Determine the target camera based on the zoom ratio range within which the current zoom ratio falls, and use the target camera to obtain the raw images. The target camera includes one or more cameras. Different zoom ratio ranges correspond to different cameras.

The target camera includes one or more cameras. Therefore, it can be learned that the zoom ratio range corresponds to one or more cameras, and only the one or more cameras can be determined as the target camera.

Based on this, when a plurality of zoom ratio ranges are included, each zoom ratio range may be preset to correspond to one camera, and the one camera is a target camera corresponding to the zoom ratio range; or each zoom ratio range may be preset to correspond to a plurality of cameras, and the plurality of cameras are target cameras corresponding to the zoom ratio range; or each zoom ratio range in a part of the zoom ratio ranges may be preset to correspond to one camera, and each zoom ratio range in another part of the zoom ratio ranges is preset to correspond to a plurality of cameras. This may be specifically set based on a requirement, and is not limited in this embodiment of this application.

It should be understood that, that a zoom ratio range corresponds to a plurality of different cameras means that the zoom ratio range corresponds to a plurality of different types of cameras. For example, target cameras corresponding to a zoom ratio range include the long-focus camera 1934 and the main camera 1931.

It should be understood that when the zoom ratio range within which the current zoom ratio falls corresponds to one camera, a raw image is obtained by using the one camera, and the raw image includes one or more frames of images obtained by the one camera. When a plurality of frames of images are obtained, the shot image obtained by subsequently processing the raw images is a fusion of the plurality of frames of images.

When the zoom ratio range within which the current zoom ratio falls corresponds to a plurality of different cameras, raw images are obtained by using the plurality of different cameras, and the raw images include a plurality of frames of images obtained by the plurality of different cameras. Based on this, the shot image obtained by processing the raw images is a fusion of the plurality of frames of images obtained by the plurality of different cameras.

It should be understood that the zoom ratio range may be divided and changed based on a requirement, and a type and a quantity of target cameras corresponding to each zoom ratio range may be set and changed based on a requirement. This is not limited in this embodiment of this application.

S23. When the lightness of the to-be-shot scene is less than the preset lightness threshold, determine the zoom ratio range within which the current zoom ratio falls.

S24. Determine the target camera based on the zoom ratio range within which the current zoom ratio falls, and use the target camera to obtain the raw images. The target camera includes one camera.

It should be understood that the target camera includes one camera. Therefore, it can be learned that the zoom ratio range corresponds to one camera, and only the one camera can be determined as the target camera.

Cameras corresponding to different zoom ratio ranges may be the same or different, and may be specifically set and changed based on a requirement. This is not limited in this embodiment of this application. For example, different zoom ratio ranges correspond to different cameras. For example, one zoom ratio range corresponds to the wide-angle camera 1933, and another zoom ratio range corresponds to the main camera 1931.

It should be understood that one camera can be determined based on the zoom ratio range within which the current zoom ratio falls, as the target camera, and the raw images are obtained by using the camera. The raw images include one or more frames of images obtained by the camera. Based on this, when a plurality of frames of images are obtained, the shot image obtained by processing the raw images is a fusion of the plurality of frames of images.

Optionally, when the lightness of the to-be-shot scene is greater than or equal to the preset lightness threshold, as shown in FIG. 6, the foregoing S22 includes the following S221 to S224.

S221. When the current zoom ratio falls within a first zoom ratio range, the target cameras include the wide-angle camera 1933 and the main camera 1931, a first image is obtained by using the wide-angle camera 1933, and a second image is obtained by using the main camera 1931. The main camera 1931 is an auxiliary camera.

It should be understood that the image obtained by the auxiliary camera is only used for image processing to obtain a shot image and not for preview display.

In this case, the raw images include the first image and the second image. The first image may be one or more frames, and the second image may be one or more frames. Specific quantities may be obtained based on a requirement. This is not limited in this embodiment of this application.

It should be understood that the first image and the second image are both located in the RAW region and are both Bayer pattern images. A field of view corresponding to the first image is greater than a field of view corresponding to the second image, and definition of the first image is lower than definition of the second image.

S222. When the current zoom ratio falls within a second zoom ratio range, the target cameras include the main camera 1931 and the black and white camera 1932, a second image is obtained by using the main camera 1931, and a third image is obtained by using the black and white camera 1932. The black and white camera 1932 is an auxiliary camera.

In this case, the raw images include the second image and the third image. The second image may be one or more frames, and the third image may be one or more frames, Specific quantities may be obtained based on a requirement. This is not limited in this embodiment of this application.

It should be understood that the second image and the third image are both located in the RAW region, where the second image is a Bayer pattern image, and the third image obtained by the black and white camera 1932 is a gray image. A field of view corresponding to the second image is basically consistent with a field of view corresponding to the third image, and details of the third image are richer than details of the second image.

S223. When the current zoom ratio falls within a third zoom ratio range, the target cameras include the main camera 1931 and the long-focus camera, a second image is obtained by using the main camera 1931, and a fourth image is obtained by using the long-focus camera 1934. The long-focus camera 1934 is an auxiliary camera.

In this case, the raw images include the second image and the fourth image. The second image may be one or more frames, and the fourth image may be one or more frames. Specific quantities may be obtained based on a requirement. This is not limited in this embodiment of this application.

It should be understood that the second image and the fourth image are both located in the RAW region and are both Bayer pattern images. A field of view corresponding to the second image is greater than a field of view corresponding to the fourth image.

S224. When the current zoom ratio falls within a fourth zoom ratio range, the target camera includes the long-focus camera, and a fourth image is obtained by using the long-focus camera.

In this case, the raw images include the fourth image. There are a plurality of frames of fourth images. A specific quantity may be obtained based on a requirement. This is not limited in the embodiments of this application.

For example, in the foregoing S221 to S224, zoom ratios included in the first zoom ratio range, the second zoom ratio range, the third zoom ratio range, and the fourth zoom ratio range are in ascending order.

In other words, a maximum zoom ratio within the first zoom ratio range is smaller than a minimum zoom ratio within the second zoom ratio range, a maximum zoom ratio within the second zoom ratio range is smaller than a minimum zoom ratio within the third zoom ratio range, and a maximum zoom ratio within the third zoom ratio range is smaller than a minimum zoom ratio within the fourth zoom ratio range.

Optionally, the first zoom ratio range is set to [f, p), the second zoom ratio range is set to [p, q), the third zoom ratio range is set to [q, r), and the fourth zoom ratio range is set to [r, t], where $f<p<q<r<t$; f, p, q, r, and t are all positive numbers.

For example, the zoom ratio range of the electronic device 100 is set to [0.5, 100], that is, f=0.5, and t=100. If p=1, q=2, and r=3.x, the first zoom ratio range is [0.5, 1), the second zoom ratio range is [1, 2), and the third zoom ratio range is [2,3.x), where a value range of x is [0, 9], and x is an integer; and the fourth zoom ratio range is [3.x, 100]. For example, f may also be 0.1, 0.2, or 0.3; and r=3.5, 3.9, or 3.8.

It should be understood that, in a case that the lightness of the to-be-shot scene is greater than or equal to the preset lightness threshold, that is, in a case that the lightness of the to-be-shot scene is medium or high lightness, in this application, the wide-angle camera 1933 and the main camera 1931 are selected within a range of small zoom ratios to obtain raw images; the main camera 1931 and the black and white camera 1932 are selected within a range of moderate zoom ratios to obtain raw images; and the long-focus camera and the main camera 1931 are selected within a range of large zoom ratios to obtain raw images. Therefore, in subsequent processing, it is possible to process images with different field of view ranges and different definition that are obtained by two different cameras within different zoom ratio ranges and process the images into a shot image, so that quality of the obtained shot image can be improved.

It should be understood that the long-focus camera within a range of larger zoom ratios can be used to shoot a raw image with rich details and high definition. Therefore, in subsequent processing, it is no longer necessary to process the image with low-definition images obtained by other cameras. Certainly, if the electronic device further includes an ultra-long-focus camera, and the ultra-long-focus camera can obtain an image with richer details and higher definition than the long-focus camera, in this application, the long-focus camera and the ultra-long-focus camera may be selected within a range of larger zoom ratios to obtain raw images, to improve quality of a subsequently obtained shot image.

Optionally, when the lightness of the to-be-shot scene is less than the preset lightness threshold, as shown in FIG. 6, the foregoing S24 includes the following S241 to S243.

S241. When the current zoom ratio falls within the first zoom ratio range, the target camera is the wide-angle camera 1933, and a first image is obtained by using the wide-angle camera 1933.

In this case, the raw images include the first image, and the first image includes a plurality of frames. A specific quantity may be obtained based on a requirement. This is not limited in this embodiment of this application.

The first image is located in the RAW region, and is a Bayer pattern image.

S242. When the current zoom ratio falls within the second zoom ratio range or the third zoom ratio range, the target camera is the main camera 1931, and a second image is obtained by using the main camera 1931.

In this case, the raw images include the second image, and the second image includes a plurality of frames. A specific quantity may be obtained based on a requirement. This is not limited in this embodiment of this application.

The second image is located in the RAW region, and is a Bayer pattern image.

S243. When the current zoom ratio falls within the fourth zoom ratio range, the target camera is the long-focus camera 1934, and a fourth image is obtained by using the long-focus camera 1934.

In this case, the raw images include the fourth image, and the fourth image includes a plurality of frames. A specific quantity may be obtained based on a requirement. This is not limited in this embodiment of this application.

The fourth image is located in the RAW region, and is a Bayer pattern image.

For example, the first zoom ratio range, the second zoom ratio range, the third zoom ratio range, and the fourth zoom ratio range have the same zoom ratios as in S221 to S224. Details are not described herein again.

It should be understood that, in a case that the lightness of the to-be-shot scene is less than the preset lightness threshold, that is, in a case that the lightness of the to-be-shot scene is low lightness, in this application, the wide-angle camera 1933 is selected within a range of small zoom ratios to obtain raw images; the main camera 1931 is selected within a range of moderate zoom ratios to obtain raw images; and the long-focus camera 1934 is selected within a range of large zoom ratios to obtain raw images. Therefore, in subsequent processing, it is possible to process a plurality of frames of images obtained by corresponding cameras within different zoom ratio ranges and process the images into one frame of shot image, so that quality of the obtained shot image can be improved.

Figure 7:
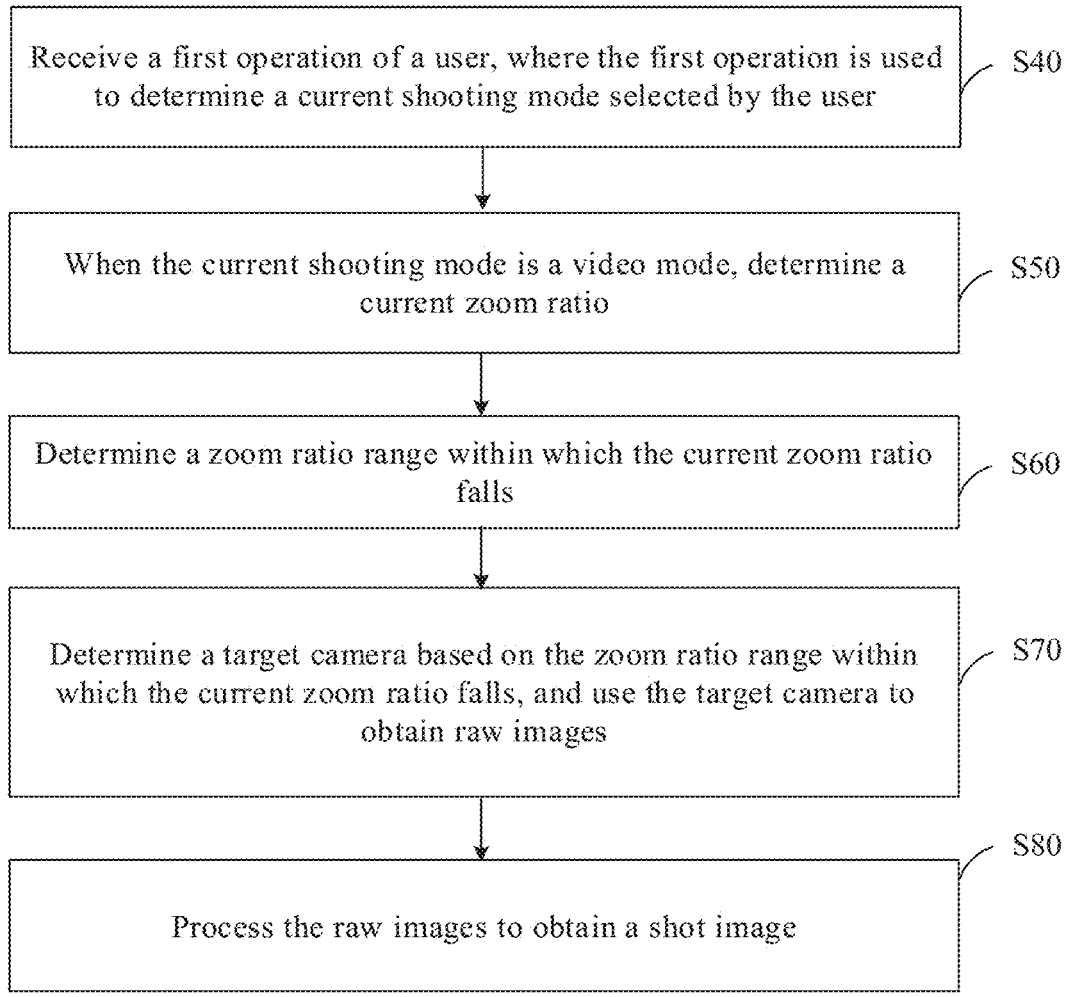
FIG. 7 is a schematic flowchart of a method for image or video shooting in a video mode, according to an embodiment of this application.

FIG. 7 is a schematic flowchart of another method for image or video shooting according to an embodiment of this application.

As shown in FIG. 7, the method includes the following S40 to S80.

S40. Receive a first operation of a user, where the first operation is used to determine a current shooting mode selected by the user, and the shooting mode further includes a video mode.

For example, with reference to FIG. 4(*a*), the first operation of the user such as a touch operation on the camera application is received, and then after the camera application is started, with reference to FIG. 4(*c*), the shooting button 50 indicates by default that the current shooting mode is the video mode 45.

Alternatively, with reference to FIG. 4(*b*), the first operation of the user such as a slide operation is received, and then with reference to FIG. 4(*c*), the shooting button 50 is changed from indicating that the current shooting mode is the photo mode to indicating that the current shooting mode is the video mode 45.

It should be understood that the first operation may alternatively be another operation as long as the current shooting mode selected by the user can be determined. This is not limited in this embodiment of this application.

S50. When the current shooting mode is the video mode, determine a current zoom ratio.

For example, in response to a touch operation of the user, a zoom ratio indicated when the user stops tapping or sliding may be determined as a zoom ratio the user expects to implement, that is, the current zoom ratio.

S60. Determine a zoom ratio range within which the current zoom ratio falls.

It should be understood that the zoom ratio range may be divided and changed based on a requirement, and a type and a quantity of cameras corresponding to each zoom ratio range may be set and changed based on a requirement. This is not limited in this embodiment of this application.

The zoom ratio range in the video mode may be the same as or different from the zoom ratio range in the foregoing photo mode. For ease of description, in this application, zoom ratio ranges obtained through division in the same division manner are described.

S70. Determine a target camera based on the zoom ratio range within which the current zoom ratio falls, and use the target camera to obtain raw images. The target camera includes one camera.

It should be understood that the target camera is one of a wide-angle camera 1933, a main camera 1931, a black and white camera 1932, and a long-focus camera 1934. Cameras corresponding to different zoom ratio ranges may be the same or different, and may be specifically set and changed based on a requirement. This is not limited in this embodiment of this application.

Therefore, one corresponding camera can be determined based on the zoom ratio range within which the current zoom ratio falls, and the raw images are obtained by using the one camera. The raw images include a plurality of frames of images obtained by the one camera. When the plurality of frames of images are obtained, a shot image obtained by subsequently processing the raw images is a fusion of the plurality of frames of images.

For example, assuming that a correspondence between different zoom ratio ranges and a plurality of cameras in the video mode is the same as a correspondence between a specified zoom ratio range and a plurality of cameras when lightness of a to-be-shot scene is less than a preset lightness threshold in the photo mode, for specific steps of S60, refer to the foregoing description of S241 to S243. Details are not described herein again.

S80. Process the raw images to obtain a shot image.

The processing of the raw images may be set and changed based on a requirement. This is not limited in this embodiment of this application.

In the method for image or video shooting provided in this embodiment of this application, when the shooting mode selected by the user is the video mode, based on the zoom ratio range within which the current zoom ratio falls, the corresponding target camera may be determined from the wide-angle camera, the main camera, the black and white camera, and the long-focus camera, the raw images are obtained by using the target camera, and then the raw images are processed to obtain the shot image. According to the method for image or video shooting provided in this application, during video shooting, different cameras can be used based on different zoom ratios to obtain raw images. Therefore, different cameras can be used to obtain a plurality of frames of images with different fields of view and different definition, and cooperative processing can be performed by using a plurality of cameras, to improve quality of a shot image obtained after the raw images are processed.

Optionally, in the video mode, it is also possible to merely use fusion of a plurality of frames (that is, a method for fusing a plurality of frames that are output by the cameras) instead of using a method of cooperative processing among the plurality of cameras. This may be adjusted based on a requirement.

With reference to the foregoing description, for the methods for image or video shooting in the photo mode and the video mode, this application provides the following embodiments:

The first zoom ratio range is set to [f, p), the second zoom ratio range is set to [p, q), the third zoom ratio range is set to [q, r), and the fourth zoom ratio range is set to [r, t], where $f<p<q<r<t$; f, p, q, r, and t are all positive numbers.

For example, the zoom ratio range of the electronic device 100 is set to [0.5, 100], that is, f=0.5, and t=100. If p=1, q=2, and r=3.x, the first zoom ratio range is [0.5, 1), the second zoom ratio range is [1, 2), and the third zoom ratio range is [2,3.x), where a value range of x is [0, 9], and x is an integer; and the fourth zoom ratio range is [3.x, 100]. For example, f may also be 0.1, 0.2, or 0.3; and r=3.5, 3.9, or 3.8.

It should be understood that herein each number is only an example, and may be set and changed based on a requirement. This is not limited in this embodiment of this application. The shooting mode may be the photo mode, the video mode, or other modes. For ease of description, the following embodiments are described by using the photo mode or the video mode as an example.

Figure 8:
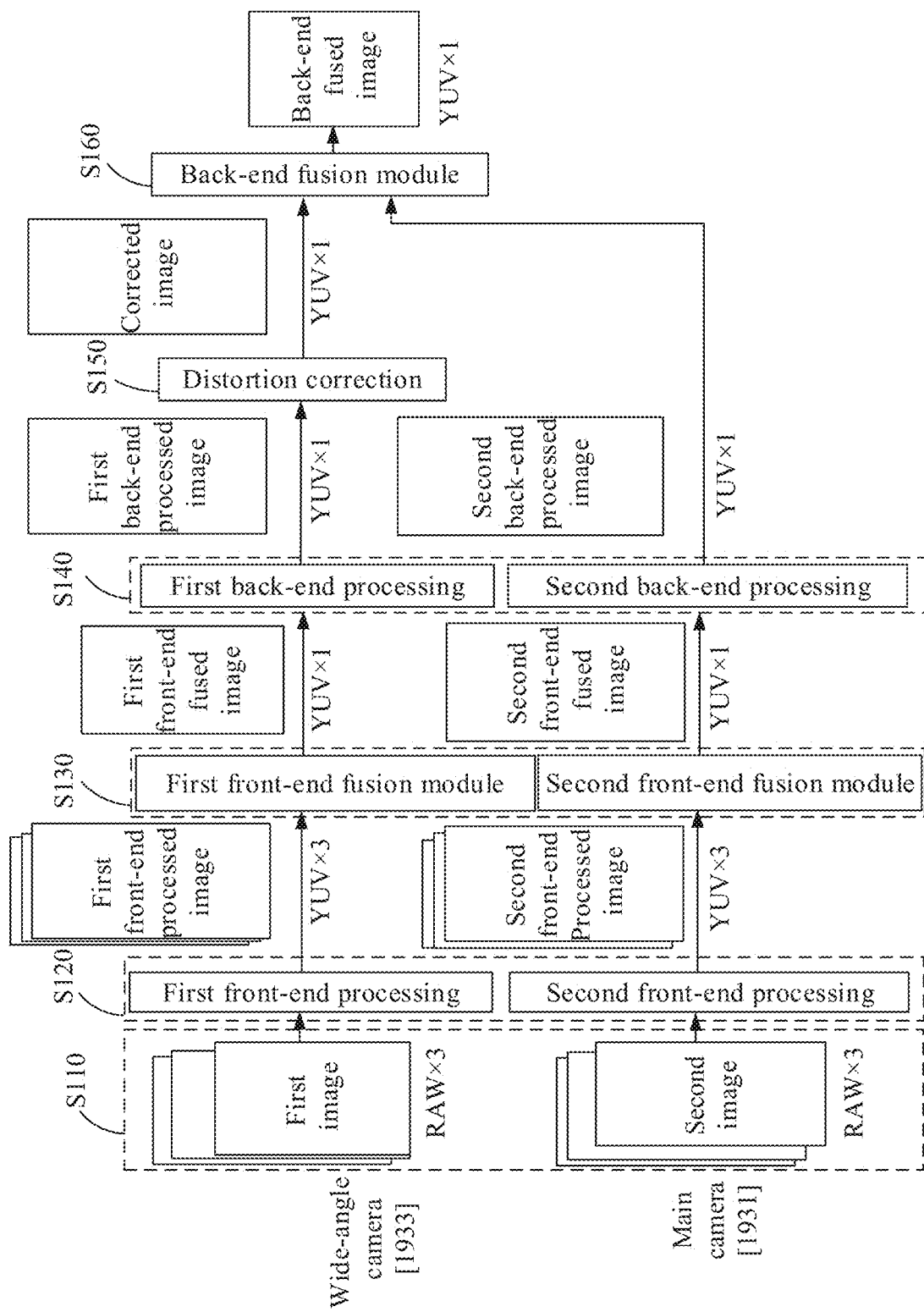
FIG. 8 is still another schematic flowchart of a method for image or video shooting in a photo mode, according to an embodiment of this application.

Embodiment 1: As shown in FIG. 8, a method for image or video shooting is provided, and the method includes the following S110 to S160.

A first operation of a user is received, and it is determined that a current shooting mode is a photo mode. In addition, lightness of a to-be-shot scene is greater than or equal to a preset lightness threshold, that is, the to-be-shot scene has medium or high lightness.

S110. Determine that a current zoom ratio falls within a first zoom ratio range, and determine a target camera.

For example, assuming that the current zoom ratio is 0.5×, the current zoom ratio falls within the first zoom ratio range [0.5, 1). Therefore, it can be determined that target cameras are a wide-angle camera 1933 and a main camera 1931, where the main camera 1931 is an auxiliary camera. For example, three frames of first images are obtained by using the wide-angle camera 1933, and three frames of second images are obtained by using the main camera 1931.

Herein, quantities of first images and second images are only examples. Specific quantities may be obtained based on a requirement. This is not limited in this embodiment of this application.

The first image and the second image are both located in a RAW region, and the first image and the second image are both Bayer pattern images.

It should be understood that because a field of view corresponding to the wide-angle camera 1933 is greater than a field of view corresponding to the main camera 1931, accordingly, a field of view corresponding to the first image is greater than a field of view corresponding to the second image, and the first image includes content of the second image, that is, the second image is a part of the first image. Definition of the first image is lower than that of the second image.

S120. Perform first front-end processing on the three frames of first images to obtain corresponding first front-end processed images; and perform second front-end processing on the three frames of second images to obtain corresponding second front-end processed images.

The first front-end processing and the second front-end processing may respectively include: at least one of registration, default pixel correction (DPC), raw noise reduction (raw noise filter, RAWNF), black level correction (BLC), lens shading correction (LSC), auto white balance (AWB), color correction matrix (CCM), dynamic range compression (DRC), and gamma correction (Gamma).

Registration refers to matching of geographical coordinates of different images obtained by different imaging means in a same region, including processing in three aspects: geometric correction, projection transformation, and a uniform scale.

Default pixel correction: A bad point is a white point in an output image in a full black environment, and a black point in an output image in a highlight environment. Generally, signals of three primary color channels should have a linear response relationship with ambient luminance; however, because a signal output by an image sensor is poor, a white or black point may appear. In view of this, a bad point can be automatically detected and automatically repaired, or a bad point pixel chain table is established to repair a bad pixel at a fixed position. A point refers to a pixel.

Noise reduction refers to a process of reducing noise in an image. General methods include mean filtering, Gaussian filtering, bilateral filtering, and the like. RAW region noise reduction refers to a process of reducing noise in a RAW region image.

Black level correction: Because a dark current exists in the image sensor, when there is no light radiation, a pixel also corresponds to an output voltage, and pixels at different positions may correspond to different output voltages. Therefore, it is necessary to correct the output voltage corresponding to the pixel when there is no light (that is, black).

Lens shading correction can resolve a problem that shading appears around the lens due to uneven refraction of light by the lens.

Automatic white balance is to eliminate adverse impact of a light source on imaging of the image sensor, simulate color constancy of human vision, and ensure that white seen in any scene is real white. Therefore, it is necessary to correct a color temperature, and automatically adjust the white balance to an appropriate position.

Color correction: Because an image obtained by a camera is somewhat different from a color that a person expects, the color needs to be corrected. In addition, because the automatic white balance has calibrated white, other colors than white can be calibrated by color correction.

Dynamic range compression: Because there is a very large dynamic range of luminance values presented by a natural real scene, when obtaining an image, a camera cannot obtain all luminance values presented by the natural real scene. However, to make the obtained image closer to the natural real scene as much as possible, a wide pixel value range (such as 0 to 4095) of the captured image needs to be adjusted to a narrow pixel value range (such as 0 to 255). This process is dynamic range compression.

Gamma correction means editing a gamma curve of an image, and by performing nonlinear tone editing on the image, detecting a dark part and a light part in the image, and scaling up the two to improve an image contrast effect.

It should be understood that the first front-end processing may include one or more of the foregoing processing steps, and when the first front-end processing includes a plurality of processing steps, an order of the plurality of processing steps may be adjusted based on a requirement. This is not limited in this embodiment of this application. In addition, the first front-end processing may further include other steps, and the steps may be added based on a requirement. This is not limited in this embodiment of this application.

For example, the first front-end processing may further include demosaic (demosaic) and color space conversion.

It should be understood that, with respect to demosaic, because each pixel in a Bayer pattern image corresponds to color information of only one channel, other colors can be estimated by using surrounding pixel information. For example, through linear interpolation, color information of the other two channels missing in each pixel can be determined, so that all channel information of all the pixels in the image is recovered. The demosaic process is equivalent to converting the image from the RAW region to an RGB region.

Herein, color space conversion refers to conversion from the RGB region into a YUV region. Therefore, a demosaiced image can be converted from the RGB region into the YUV region to reduce an amount of data to be subsequently stored and transmitted and save bandwidth.

It should also be understood that the second front-end processing may be the same as or different from the first front-end processing, and may be specifically set and changed based on a requirement. This is not limited in this embodiment of this application.

S130. Perform fusion on the first front-end processed images corresponding to the three frames of first images by using a first front-end fusion module, to obtain a corresponding first front-end fused image; and perform fusion on the second front-end processed images corresponding to the three frames of second images by using a second front-end fusion module, to obtain a corresponding second front-end fused image. Front-end fusion modules include the first front-end fusion module and the second front-end fusion module.

It should be understood that when both the first front-end processing and the second front-end processing include demosaic and color space conversion, after the first front-end processing is performed on the first image, the corresponding first front-end processed image is located in the YUV region. After the second front-end processing is performed on the second image, the corresponding second front-end processed image is located in the YUV region. In this case, the first front-end fusion module and the second front-end fusion module both include a YUV region multi-frame fusion module to implement a YUV region multi-frame fusion function. Therefore, the first front-end fused image obtained through processing by the first front-end fusion module and the second front-end fused image obtained through processing by the second front-end fusion module are both located in the YUV region.

When neither the first front-end processing nor the second front-end processing includes demosaic and color space conversion, after the first front-end processing is performed on the first image, the corresponding first front-end processed image is still located in the RAW region. After the second front-end processing is performed on the second image, the corresponding second front-end processed image is still located in the RAW region. In this case, the first front-end fusion module correspondingly includes a RAW region multi-frame fusion module to implement a RAW region multi-frame fusion function. Therefore, the first front-end fused image obtained through processing by the first front-end fusion module is also located in the RAW region.

Optionally, the first front-end fusion module and the second front-end fusion module further include a high dynamic range module.

Because raw images are exposed at a specific exposure, there is a problem that details of a dark part or a bright part are displayed insufficiently, and the problem still exists in the first front-end processed image and the second front-end processed image. Therefore, the first front-end processed image and the second front-end processed image can be processed by using the high dynamic range module, so that a dark region in a to-be-shot scene can be bright in the image, and that a bright region in the image can be dark. In this way, the processed image can present more details in the dark region and the bright region.

Optionally, the first front-end fusion module and the second front-end fusion module further include a super resolution (SR) module.

After being processed by the super resolution module, a plurality of low-resolution images can be fused into a frame of high-resolution image, or a high-resolution image can be obtained from a single low-resolution image. Therefore, after the first front-end processed image and the second front-end processed image are transmitted to the super resolution module, resolutions of the front-end processed images can be improved, and a higher-resolution first front-end fused image and/or second front-end fused image can be obtained.

It should be understood that the first front-end fusion module and the second front-end fusion module may be the same or different, and may be specifically set and changed based on a requirement. This is not limited in this embodiment of this application.

When the front-end fusion module includes YUV region multi-frame fusion or RAW region multi-frame fusion, and at least one of an HDR module and an SR module, an order thereof may be adjusted based on a requirement. Certainly, the front-end fusion module may further include other functional modules, which may be set and changed based on a requirement. This is not limited in this embodiment of this application.

Based on this, the plurality of frames of first images may include a first image with a long exposure, a first image with a short exposure, and a first image with a moderate exposure; and the plurality of frames of second images may include a second image with a long exposure, a second image with a short exposure, and a second image with a moderate exposure.

When the plurality of frames of first images include first images with different exposure, and the plurality of frames of second images include second images with different exposure, accordingly, the first front-end processed images corresponding to the plurality of frames of first images include first front-end processed images with different exposure, and the second front-end processed images corresponding to the plurality of frames of second images include second front-end processed images with different exposure. Based on this, after the first front-end fusion module performs fusion on the plurality of frames of first front-end processed images with different exposure, details of a dark region and an over-exposure region in the image can be increased, and a dynamic range can be improved, so that definition of the corresponding first front-end fused image can be improved. Likewise, after the second front-end fusion module performs fusion on the plurality of frames of second front-end processed images with different exposure, details of a dark region and an over-exposure region in the image can be increased, and a dynamic range can be improved, so that definition of the corresponding second front-end fused image can be improved.

It should be understood that an image with a long exposure refers to an image obtained through a long-time exposure during shooting, and an image with a short exposure refers to an image obtained through a short-time exposure during shooting, where both the long exposure and the short exposure are relative to the time of a moderate exposure. The exposure time is the time used for photoelectric conversion when the image sensor captures an image.

For example, the time of the moderate exposure is 5 milliseconds, the time of the short exposure is ⅕₀ millisecond, and the time of the long exposure is 100 milliseconds.

S140. Perform first back-end processing on the first front-end fused image corresponding to the three frames of first images to obtain a corresponding first back-end processed image; and perform second back-end processing on the second front-end fused image corresponding to the three frames of second images to obtain a corresponding second back-end processed image.

The first back-end processing and the second back-end processing may respectively include at least one of video stabilization, color enhancement (CE), a 2D lookup table, that is, style transformation (2-dimensional look up table, 2DLUT), and super-resolution reconstruction.

Video stabilization means removing image blurs caused by slight shaking in a shooting process, for example, by using a block matching method.

Color enhancement enables original unsaturated color information to become saturated and rich.

Style transformation refers to color style transformation, that is, a color filter, which changes a raw image style into another image style, where common styles are, for example, a movie style, a Japanese style, and a spooky style.

It should be understood that the first back-end processing may include one or more of the foregoing processing steps, and when the first back-end processing includes a plurality of processing steps, an order of the plurality of processing steps may be adjusted based on a requirement. This is not limited in this embodiment of this application. In addition, the first back-end processing may further include other steps. This is not limited in this embodiment of this application.

For example, when the first front-end processing includes demosaic and color space conversion, because the first front-end fused image is located in the YUV region, accordingly, the first back-end processing may further include YUV region noise reduction, to perform noise reduction processing on the image located in the YUV region.

When the first front-end processing does not include demosaic and color space conversion, because the first front-end fused image is located in the RAW region, accordingly, the first back-end processing may further include demosaic, color space conversion, and YUV region noise reduction, to convert the image located in the RAW region into an image located in the YUV region, reduce an amount of data in subsequent processing, and save bandwidth.

It should be understood that the first back-end processed image and the second back-end processed image are located in the YUV region.

It should also be understood that the second back-end processing may be the same as or different from the first back-end processing, and may be specifically set based on a requirement. This is not limited in this embodiment of this application.

S150. Perform distortion correction on the first back-end processed image corresponding to the three frames of first images, to obtain a corrected image.

It should be understood that when the first image is obtained by using the wide-angle camera 1933, because a capability of a lens in the wide-angle camera 1933 for bending colored light varies, a distance between an imaging point and an optical axis varies, and a lateral magnification varies accordingly. Consequently, actual imaging distortion is caused, and distortion is generated. Therefore, it is necessary to perform distortion correction on the first back-end processed image corresponding to the first image, to recover the image to normal.

For example, distortion correction may be performed by using perspective projection. Perspective projection is also known as perspective transformation. For example, when the back-end processed images include a book, coordinates of points corresponding to four corners of the book in the first back-end processed image corresponding to the three frames of first images and coordinates of points corresponding to the four corners of the book in the second back-end processed image corresponding to the three frames of second images can be determined first, a transformation matrix of perspective transformation is calculated by using the two groups of coordinates, and then transformation of the transformation matrix is performed on the book in the first back-end processed image corresponding to the three frames of first images, thereby implementing correction.

It should be understood that the corrected image is located in the YUV region.

S160. Perform fusion on the corrected image and the second back-end processed image corresponding to the second image by using a back-end fusion module, to obtain a second fused image, where the second fused image is a shot image.

Because the field of view corresponding to the first image is different from the field of view corresponding to the second image, there is still a problem that the field of view is different between the corrected image after the processing and the back-end processed image corresponding to the second image. Therefore, a second fusion module can be used for fusion processing. In other words, the second fusion module may include a field of view fusion module for implementing fusion of images corresponding to different field of view ranges.

Based on this, when the corrected image corresponding to the first image and the second back-end processed image corresponding to the second image are fused, field of view ranges corresponding to the corrected image and the first image are the same, field of view ranges corresponding to the second back-end processed image and the second image are the same, and the field of view corresponding to the fused second image is the same as the field of view corresponding to the first image. Assuming that central points in the field of view of the wide-angle camera 1933 and the field of view of the main camera 1931 are consistent, because definition of the second image is relatively high, definition of the second back-end processed image is correspondingly relatively high. Therefore, after the corrected image is fused with the second back-end processed image corresponding to the second image, definition in a region of the corrected image corresponding to the field of view of the second image is improved, so that definition of the shot image is improved.

Certainly, the back-end fusion module may further include other functional modules, which may be set and changed based on a requirement. This is not limited in this embodiment of this application. In addition, the back-end fusion module in this embodiment may also be the same as the first front-end fusion module and the second front-end fusion module, all being configured to perform fusion on images located in the YUV region.

It should be understood that the back-end fused image is located in the YUV region. The back-end fused image is to be displayed as a shot image on a screen of the electronic device 100, or is merely stored, and may be specifically transmitted based on a requirement. This is not limited in this embodiment of this application.

In this embodiment, after the foregoing series of processing based on the first image and the second image with different fields of view and different definition, a shot image with higher definition and better quality can be obtained through fusion.

It should also be understood that the foregoing process is only an example, and that a specific order may be adjusted based on a requirement. Certainly, steps may be added or removed. This is not limited in this embodiment of this application.

Figure 9:
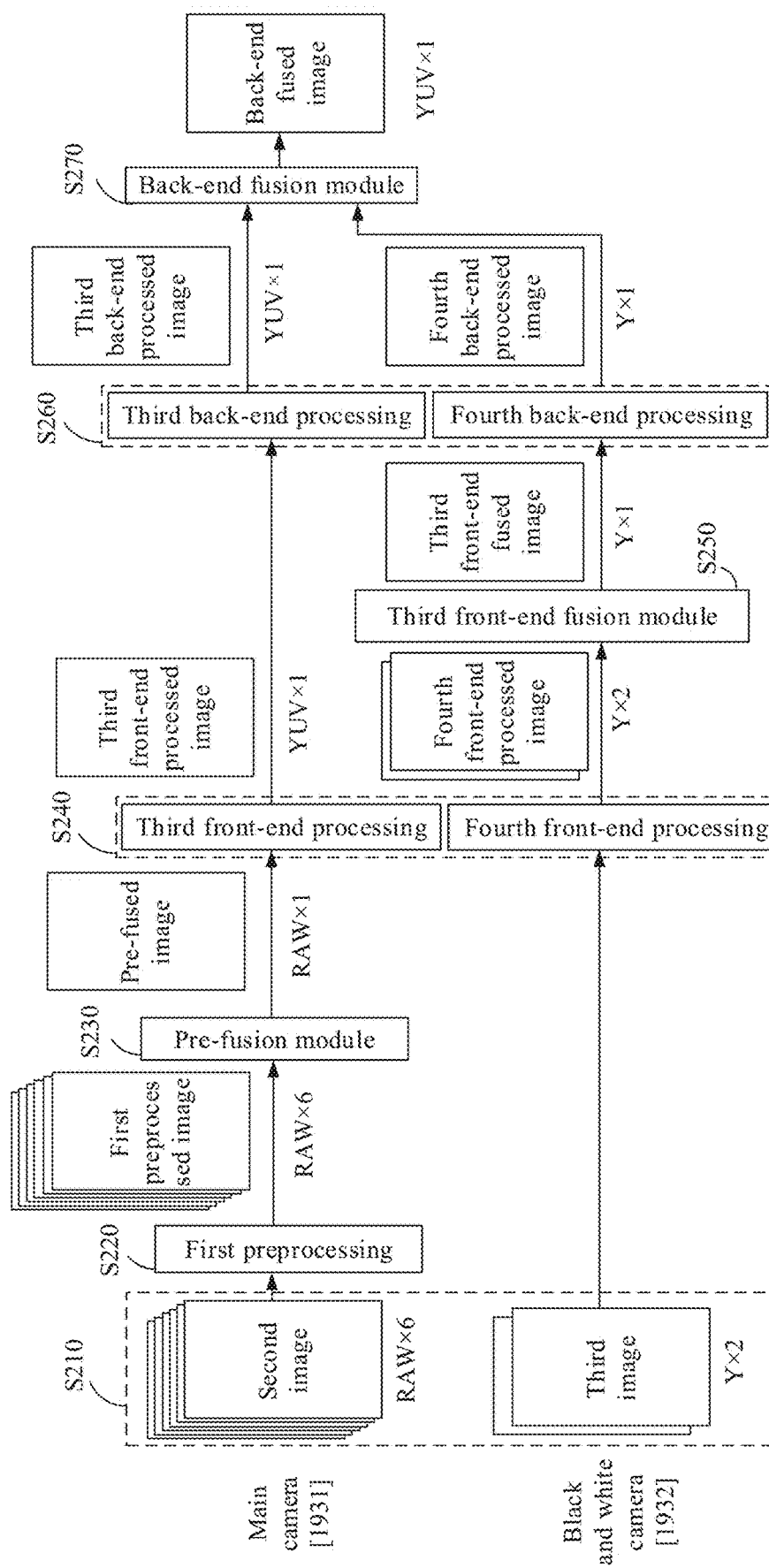
FIG. 9 is still another schematic flowchart of a method for image or video shooting in a photo mode, according to an embodiment of this application.
Figure 9:
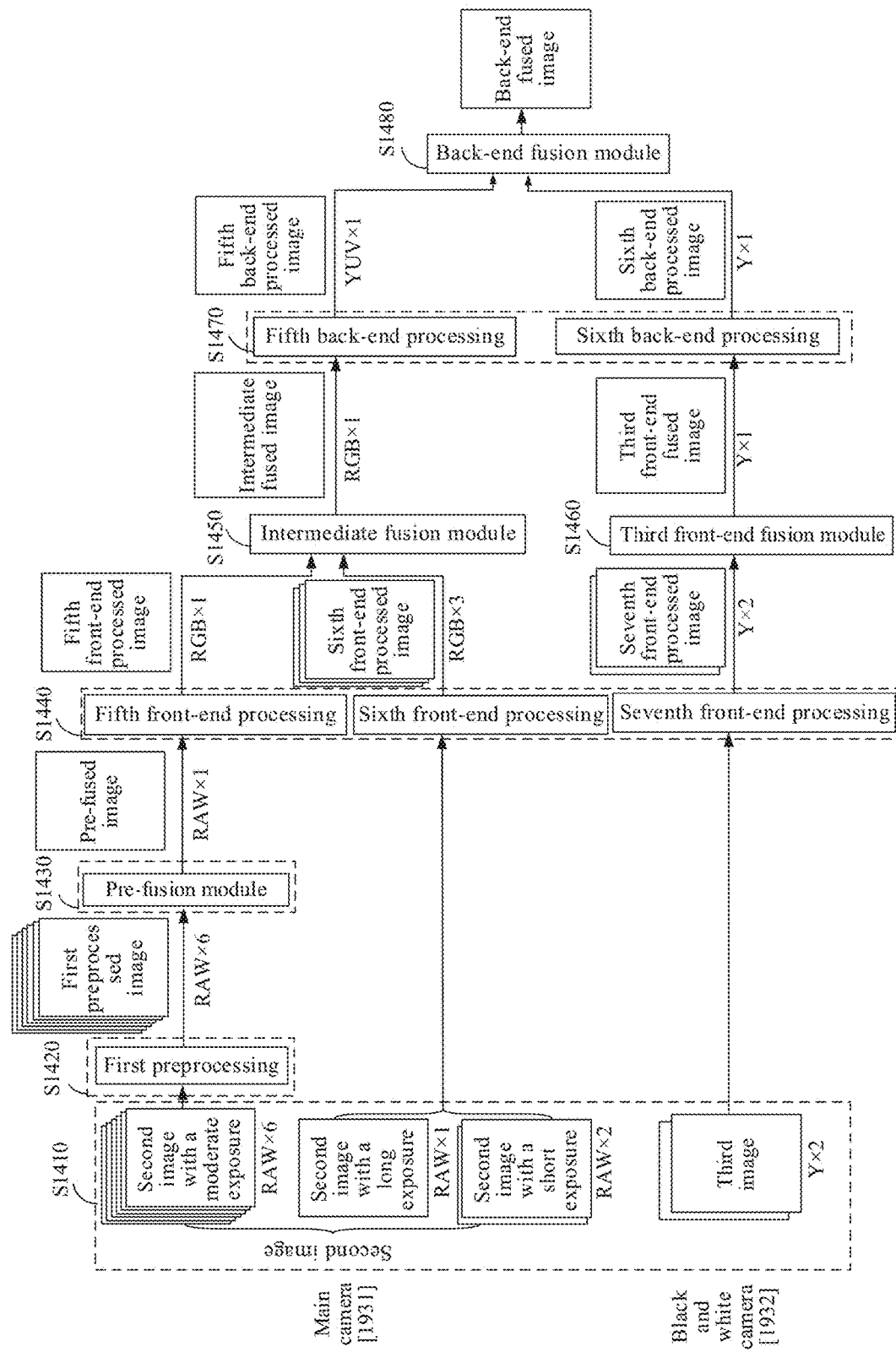

Embodiment 2a: As shown in FIG. 9(a), a method for image or video shooting is provided, and the method includes the following S210 to S270.

A first operation of a user is received, it is determined that a current shooting mode is a photo mode, and a to-be-shot scene has medium or high lightness.

S210. Determine that a current zoom ratio falls within a second zoom ratio range, and determine a target camera.

For example, assuming that the current zoom ratio is 1.5, the current zoom ratio falls within the second zoom ratio range [1, 2). Therefore, it can be determined that target cameras are a main camera 1931 and a black and white camera 1932, where the black and white camera 1932 is an auxiliary camera. For example, six frames of second images are obtained by using the main camera 1931 and two frames of third images are obtained by using the black and white camera 1932.

Herein, quantities of second images and third images are only examples. Specific quantities may be obtained based on a requirement. This is not limited in this embodiment of this application.

The second image is located in a RAW region, the second image is a Bayer pattern image, and the third image obtained by the black and white camera 1932 is a gray image.

It should be understood that a field of view corresponding to the second image is basically consistent with a field of view corresponding to the third image, and details of the third image are richer than details of the second image.

S220. Perform first preprocessing on the six frames of second images to obtain six frames of first preprocessed images located in the RAW region.

The first preprocessing may include at least one of registration, default pixel correction, RAW region noise reduction, black level correction, lens shading correction, and automatic white balance.

For the description of registration, default pixel correction, RAW region noise reduction, black level correction, lens shading correction, and automatic white balance, refer to the foregoing content in S120. Details are not described herein again.

It should be understood that the first preprocessing includes one or more of the foregoing processing steps, and when the first preprocessing includes a plurality of processing steps, an order of the plurality of processing steps may be adjusted based on a requirement. This is not limited in this embodiment of this application. In addition, the first preprocessing may further include other steps, which may be added based on a requirement. This is not limited in this embodiment of this application.

S230. Perform fusion on the first preprocessed images corresponding to the six frames of second images by using a pre-fusion module, to obtain one frame of pre-fused image corresponding to the six frames of second images.

It should be understood that the six frames of first preprocessed images corresponding to the six frames of second images are all located in the RAW region. In this case, the corresponding pre-fusion module correspondingly includes a RAW region multi-frame fusion module to implement a RAW region multi-frame fusion function. Therefore, the pre-fused image obtained through processing by the pre-fusion module is still located in the RAW region.

When the user uses a camera application, the main camera 1931 and the second zoom ratio range corresponding to the main camera 1931 are used with a higher frequency and higher probability. Therefore, to improve image quality and user experience, the second image obtained by the main camera 1931 needs to be processed in the RAW region to retain more details.

S240. Perform third front-end processing on the one frame of pre-fused image corresponding to the six frames of second images to obtain a corresponding third front-end processed image; and perform fourth front-end processing on the two frames of third images to obtain corresponding fourth front-end processed images.

For the description of the third front-end processing and the fourth front-end processing, refer to the foregoing content in S120. Details are not described herein again. The third front-end processing and the fourth front-end processing may be the same or different. This is not limited in this embodiment of this application.

It should be understood that when the third front-end processing includes demosaic and color space conversion, after the third front-end processing is performed on the pre-fused image corresponding to the second image, the corresponding third front-end processed image is located in a YUV region. When the third front-end processing does not include demosaic and color space conversion, after the third front-end processing is performed on the pre-fused image corresponding to the second image, the corresponding third front-end processed image is still located in the RAW region.

For example, in this embodiment, the pre-fused image corresponding to the second image is located in the RAW region. To reduce an amount of data, save bandwidth, and increase a speed of subsequent processing, the third front-end processing performed on the pre-fused image includes demosaic and color space conversion, so that after the front-end processing is performed on the pre-fused image, the corresponding third front-end processed image is located in the YUV region.

It should be understood that for the third image, because the third image is a gray image (shown as a Y diagram in the figure), the fourth front-end processing performed on the third image does not include demosaic and color space conversion. In this way, after the front-end processing is performed on the third image, the corresponding fourth front-end processed image is still a gray image.

It should also be understood that the third front-end processing and the fourth front-end processing in this embodiment may be the same as or different from the front-end processing in the foregoing embodiment, and may be specifically set and changed based on a requirement. This is not limited in this embodiment of this application.

S250. Perform fusion on the fourth front-end processed images corresponding to the two frames of third images by using a third front-end fusion module, to obtain a third front-end fused image corresponding to the two frames of third images. The front-end fusion module further includes the third front-end fusion module.

It should be understood that because the third image is a gray image, demosaic and color space conversion are not performed when the fourth front-end processing is performed. In this case, after the fourth front-end processing is performed on the third image, the corresponding fourth front-end processed image is still a gray image. In this case, the corresponding third front-end fusion module correspondingly includes a YUV region multi-frame fusion module to implement a multi-frame fusion function for the gray image. Therefore, the third front-end fused image obtained through processing by the third front-end fusion module is also a gray image.

It should be understood that the third front-end fusion module may be the same as or different from the first front-end fusion module and the second front-end fusion module, and may be specifically set and changed based on a requirement. This is not limited in this embodiment of this application.

Certainly, the third front-end fusion module may further include other functional modules. For details, refer to the foregoing description of the first front-end fusion module or the second front-end fusion module in S130. Details are not described herein again.

Based on this, when there are a plurality of frames of third images, the plurality of frames of third images may include a third image with a long exposure, a third image with a short exposure, and a third image with a moderate exposure.

When the plurality of frames of third images include third images with different exposure, accordingly, fourth front-end processed images corresponding to the plurality of frames of third images include fourth front-end processed images with different exposure. Based on this, after the third front-end fusion module performs fusion on the plurality of frames of fourth front-end processed images with different exposure, details of a dark region and an over-exposure region in the image can be increased, and a dynamic range can be improved, so that definition of the corresponding third front-end fused image can be improved.

S260. Perform third back-end processing on the third front-end processed image corresponding to the six frames of second images to obtain a corresponding third back-end processed image; and perform fourth back-end processing on the third front-end fused image corresponding to the two frames of third images to obtain a corresponding fourth back-end processed image.

For the description of the third back-end processing and the fourth back-end processing, refer to the foregoing content in S140. Details are not described herein again.

It should be understood that the back-end processed image corresponding to the second image is located in the YUV region, and the back-end processed image corresponding to the third image is a gray image.

It should also be understood that in this embodiment, the third back-end processing may be the same as or different from the fourth back-end processing. In addition, the third back-end processing and the fourth back-end processing in this embodiment may be the same as or different from the back-end processing in the foregoing embodiment, and may be specifically set based on a requirement. This is not limited in this embodiment of this application.

S270. Perform fusion on the third back-end processed image corresponding to the second image and the fourth back-end processed image corresponding to the third image by using a back-end fusion module, to obtain a back-end fused image, where the back-end fused image is a shot image.

Because the second image is a Bayer pattern image, and the third image is a grey image, and colors of the two images are different, after the foregoing processing, there is still a problem that colors of the third back-end processed image corresponding to the second image and the fourth back-end processed image corresponding to the third image are different. Therefore, the back-end fusion module can be used for fusion processing. In other words, the back-end fusion module may include a black and white color fusion module for implementing fusion of images of different colors.

Based on this, black and white color fusion is performed on the third back-end processed image corresponding to the second image and the fourth back-end processed image corresponding to the third image to obtain the back-end fused image. In this way, not only color information corresponding to the second image is retained, but also luminance information corresponding to the third image is fused. Because the third image has higher definition than the second image, quality of the fused image can be improved, and the back-end fused image with higher definition is obtained.

Certainly, the back-end fusion module may further include other functional modules, which may be set and changed based on a requirement. This is not limited in this embodiment of this application.

It should be understood that the back-end fusion module in this embodiment may be the same as or different from the back-end fusion module in the foregoing embodiment, and may be specifically set based on a requirement. This is not limited in this embodiment of this application.

It should be understood that the obtained back-end fused image is located in the YUV region. The back-end fused image is to be displayed as a shot image on an interface of the electronic device, or is merely stored, and may be specifically transmitted based on a requirement. This is not limited in this embodiment of this application.

In this embodiment, after the foregoing series of processing based on the second image and the third image with different richness of details, a shot image with higher definition and better quality can be obtained through fusion.

It should also be understood that the foregoing process is only an example, and that a specific order may be adjusted based on a requirement. Certainly, steps may be added or removed. This is not limited in this embodiment of this application.

Embodiment 2b: As shown in FIG. 9(b), a method for image or video shooting is provided, and the method includes the following S1401 to S1480.

A first operation of a user is received, it is determined that a current shooting mode is a photo mode, and a to-be-shot scene has medium or high lightness.

S1401. Determine that a current zoom ratio falls within a second zoom ratio range, and determine a target camera.

For example, assuming that the current zoom ratio is 1.5, the current zoom ratio falls within the second zoom ratio range [1, 2). Therefore, it can be determined that target cameras are a main camera 1931 and a black and white camera 1932, where the black and white camera 1932 is an auxiliary camera.

S1402. Determine, based on a preview image captured by a camera, whether a to-be-shot scene is an HDR scene.

A high dynamic range (HDR) image is a high dynamic range. HDR scenes include scenery, high light, and/or low light scenes.

It should be understood that a preview image in a current viewfinder window is obtained by the main camera 1931 and sent to a display for displaying.

For example, whether the to-be-shot scene is an HDR scene can be determined in the following manner.

For example, first, based on pixel values of three primary colors red, green, and blue corresponding to each pixel in the preview image, a grey-scale value corresponding to each pixel is obtained through calculation. It should be understood that the grey-scale value is used to represent a luminance status corresponding to each pixel.

If an image bit depth is 8 bits, a value range of a gray-scale value corresponding to a pixel is [0, 255]. Therefore, the gray-scale value corresponding to the pixel in the preview image can be counted, and a luminance histogram is generated. A horizontal axis of the luminance histogram is used to represent different gray-scale values, and a vertical axis is used to represent a count corresponding to each gray-scale value.

Then, based on the luminance histogram, it is possible to determine a first proportion of pixels belonging to a low gray-scale range, for example, pixels whose gray-scale values are within a range of 0 to 5 in the entire preview image; and it is also possible to determine a second proportion of pixels belonging to a high gray-scale range, for example, pixels whose gray-scale values are within a range of 245 to 255 in the entire preview image.

Based on this, and based on the first proportion and the second proportion, a proportion of pixels in a dark region and pixels in a bright region in the entire preview image can be determined, and when the proportion satisfies a preset condition, it can be determined that the to-be-shot scene corresponding to the preview image is an HDR scene. When the proportion does not satisfy the preset condition, it is determined that the to-be-shot scene is not an HDR scene.

It should be understood that values of the low gray-scale range and the high gray-scale range may be set and changed based on a requirement when the first proportion and the second proportion are determined based on the luminance histogram. The foregoing description is only an example. This is not limited in this embodiment of this application.

S1403. If the scene is not an HDR scene, obtain a second image by using the main camera 1931, obtain a third image by using the black and white camera 1932, and then perform relevant steps in the foregoing Embodiment 2a on the second image and the third image to obtain a shot image.

S1404. If the scene is an HDR scene, perform the following S1410 to S1480.

S1410. Obtain nine frames of second images by using the main camera 1931 and obtain two frames of third images by using the black and white camera 1932. Herein, the nine frames of second images obtained by the main camera 1931 include six frames of second images with a moderate exposure, one frame of second image with a long exposure, and two frames of second images with a short exposure.

Herein, a quantity of second images, quantities of images with a moderate exposure, a long exposure, and a short exposure, and a quantity of third images are only examples. Specific quantities may be obtained based on a requirement. This is not limited in this embodiment of this application.

The second image is located in a RAW region, the second image is a Bayer pattern image, and the third image obtained by the black and white camera 1932 is a gray image.

It should be understood that a field of view corresponding to the second image is basically consistent with a field of view corresponding to the third image, and details of the third image are richer than details of the second image.

S1420. Perform first preprocessing on the six frames of second images with a moderate exposure to obtain six frames of first preprocessed images located in the RAW region.

The first preprocessing may include at least one of registration, default pixel correction, RAW region noise reduction, black level correction, lens shading correction, and automatic white balance.

For the description of registration, default pixel correction, RAW region noise reduction, black level correction, lens shading correction, and automatic white balance, refer to the foregoing content in S120. Details are not described herein again.

It should be understood that the first preprocessing includes one or more of the foregoing processing steps, and when the first preprocessing includes a plurality of processing steps, an order of the plurality of processing steps may be adjusted based on a requirement. This is not limited in this embodiment of this application. In addition, the first preprocessing may further include other steps, which may be added based on a requirement. This is not limited in this embodiment of this application.

S1430. Perform fusion on the first preprocessed images corresponding to the six frames of second images with a moderate exposure by using a pre-fusion module, to obtain one frame of pre-fused image corresponding to the six frames of first preprocessed images.

It should be understood that the six frames of first preprocessed images corresponding to the six frames of second images with a moderate exposure are all located in the RAW region. In this case, the corresponding pre-fusion module correspondingly includes a RAW region multi-frame fusion module to implement a RAW region multi-frame fusion function. Therefore, the pre-fused image obtained through processing by the pre-fusion module is still located in the RAW region.

Certainly, the pre-fusion module may further include other functional modules. This is not limited in this embodiment of this application. The pre-fusion module in this embodiment may be the same as or different from the pre-fusion module in the foregoing Embodiment 2a, and may be specifically set based on a requirement. This is not limited in this embodiment of this application.

It should be understood that when the user uses a camera application, the main camera 1931 and the second zoom ratio range corresponding to the main camera 1931 are used with a higher frequency and higher probability. Therefore, to improve image quality and user experience, the second image with a long exposure, the second image with a moderate exposure, and the second image with a short exposure that are obtained by the main camera 1931 need to be processed in the RAW region during first preprocessing and fusion processing by using the pre-fusion module, to retain more details and improve quality of subsequent images. Technical effects of the foregoing image processing in the color space RAW also apply for other embodiments. Details are not described herein again.

S1440. Perform fifth front-end processing on the one frame of pre-fused image corresponding to the six frames of second images with a moderate exposure to obtain one corresponding frame of fifth front-end processed image; perform sixth front-end processing on the one frame of second image with a long exposure and the two frames of second images with a short exposure to obtain three corresponding frames of sixth front-end processed images; and perform seventh front-end processing on the two frames of third images to obtain two corresponding frames of seventh front-end processed images.

For the description of the fifth front-end processing, the sixth front-end processing, and the seventh front-end processing, refer to the foregoing content in S120. Details are not described herein again.

It should be understood that when the fifth front-end processing performed on the pre-fused image includes demosaic, the correspondingly obtained fifth front-end processed image is located in an RGB region; when the fifth front-end processing performed on the pre-fused image includes demosaic and color space conversion, the correspondingly obtained front-end processed image is located in a YUV region; or when the fifth front-end processing performed on the pre-fused image does not include demosaic and color space conversion, the correspondingly obtained fifth front-end processed image is located in the RAW region.

Likewise, when the sixth front-end processing performed on the one frame of second image with a long exposure and the two frames of second images with a short exposure includes demosaic, the correspondingly obtained sixth front-end processed images are located in the RGB region; when the sixth front-end processing performed on the one frame of second image with a long exposure and the two frames of second images with a short exposure includes demosaic and color space conversion, the correspondingly obtained front-end processed images are located in the YUV region; or when the sixth front-end processing performed on the one frame of second image with a long exposure and the two frames of second images with a short exposure does not include demosaic and color space conversion, the correspondingly obtained sixth front-end processed images are located in the RAW region.

For example, in the Embodiment 2b provided in this application, the fifth front-end processing performed on the pre-fused image and the sixth front-end processing performed on the second image with a long exposure and the second image with a short exposure both include demosaic. Therefore, the correspondingly obtained fifth front-end processed image and sixth front-end processed image are both located in the RGB region and are color images.

In addition, for the third image, because the third image is a gray image (shown as a Y diagram in the figure), the seventh front-end processing performed on the third image does not include demosaic and color space conversion. Therefore, after the seventh front-end processing is performed on the third image, the corresponding seventh front-end processed image is still a gray image.

It should also be understood that in this embodiment, other processing steps than the demosaic and color space conversion in the fifth front-end processing, the sixth front-end processing, and the seventh front-end processing may be the same or different. This is not limited in this embodiment of this application. In addition, the fifth front-end processing, the sixth front-end processing, and the seventh front-end processing in this embodiment may be the same as or different from content included in the first front-end processing in the foregoing embodiment, and may be specifically set and changed based on a requirement. This is not limited in this embodiment of this application.

S1450. Perform fusion on the fifth front-end processed image corresponding to the pre-fused image and the sixth front-end processed images corresponding to the second image with a long exposure and the second images with a short exposure by using an intermediate fusion module, to obtain one frame of intermediate fused image.

It should be understood that when the fifth front-end processing performed on the pre-fused image and the sixth front-end processing performed on the second image with a long exposure and the second images with a short exposure both include demosaic, the obtained fifth front-end processed image corresponding to the pre-fused image is located in the RGB region, and the obtained sixth front-end processed images corresponding to the second image with a long exposure and second images with a short exposure are also located in the RGB region. In this case, the intermediate fusion module correspondingly includes an RGB region multi-frame fusion module to implement multi-frame fusion of color images with different exposure. Therefore, the intermediate fused image processed by the intermediate fusion module is also located in the RGB region and is a color image.

When the fifth front-end processing performed on the pre-fused image and the sixth front-end processing performed on the second image with a long exposure and the second images with a short exposure both include demosaic and color space conversion, the obtained fifth front-end processed image corresponding to the pre-fused image is located in the YUV region, and the obtained sixth front-end processed images corresponding to the second image with a long exposure and the second images with a short exposure are also located in the YUV region. In this case, the intermediate fusion module correspondingly includes a YUV region multi-frame fusion module to implement YUV region multi-frame fusion of images with different exposure. Therefore, the intermediate fused image processed by the intermediate fusion module is also located in the YUV region.

When neither the fifth front-end processing performed on the pre-fused image nor the sixth front-end processing performed on the second image with a long exposure and the second images with a short exposure includes demosaic and color space conversion, the obtained fifth front-end processed image corresponding to the pre-fused image is located in the RAW region, and the obtained sixth front-end processed images corresponding to the second image with a long exposure and the second images with a short exposure are also located in the RAW region. In this case, the intermediate fusion module correspondingly includes a RAW region multi-frame fusion module to implement RAW region multi-frame fusion of images with different exposure. Therefore, the intermediate fused image processed by the intermediate fusion module is also located in the RAW region.

For example, in this embodiment, the fifth front-end processing, the sixth front-end processing, and the seventh front-end processing all include demosaic, and the correspondingly obtained fifth front-end processed image, the sixth front-end processed images, and the seventh front-end processed images are all located in the RGB region and are color images; and correspondingly, the intermediate fusion module includes an RGB region multi-frame fusion module.

Therefore, the intermediate fused image obtained by using the intermediate fusion module is also located in the RGB region.

Certainly, the intermediate fusion module may further include other functional modules, which may be set and changed based on a requirement. This is not limited in this embodiment of this application.

S1460. Perform fusion on the seventh front-end processed images corresponding to the two frames of third images by using a third front-end fusion module, to obtain one corresponding frame of third front-end fused image.

For the description of the third front-end fusion module, refer to the foregoing content in S250. Details are not described herein again.

S1470. Perform fifth back-end processing on the intermediate fused image to obtain a corresponding fifth back-end processed image, and perform sixth back-end processing on the third front-end fused image to obtain a corresponding sixth back-end processed image.

For the description of the fifth back-end processing and the sixth back-end processing, refer to the foregoing content in S140. Details are not described herein again.

It should be understood that the third front-end fused image is a gray image and the corresponding back-end processed image is also a gray image.

It should be understood that when the intermediate fused image is located in the RGB region, the fifth back-end processing performed on the intermediate fused image needs to include color space conversion, so that the correspondingly obtained fifth back-end processed image is located in the YUV region; when the intermediate fused image is located in the YUV region, the fifth back-end processing performed on the intermediate fused image does not need to include color space conversion; or when the intermediate fused image is located in the RAW region, the fifth back-end processing performed on the intermediate fused image needs to include demosaic and color space conversion.

For example, in this embodiment, because the intermediate fused image is located in the RGB region, the fifth back-end processing performed on the intermediate fused image needs to include color space conversion, so that the correspondingly obtained fifth back-end processed image is located in the YUV region and has a format consistent with that of the sixth back-end processed image corresponding to the third front-end fused image, thereby facilitating subsequent fusion processing.

It should also be understood that in this embodiment, other processing steps than the demosaic and color space conversion in the fifth back-end processing and the sixth back-end processing may be the same or different. This is not limited in this embodiment of this application. In addition, the fifth back-end processing and the sixth back-end processing in this embodiment may be the same as or different from content included in the back-end processing in the foregoing embodiment, and may be specifically set and changed based on a requirement. This is not limited in this embodiment of this application.

S1480. Perform fusion on the fifth back-end processed image corresponding to the second images and the sixth back-end processed image corresponding to the third images by using a back-end fusion module, to obtain a back-end fused image, where the back-end fused image is a shot image.

Because the second image is a Bayer pattern image, and the third image is a grey image, and colors of the two images are different, after the foregoing processing, there is still a problem that colors of the fifth back-end processed image corresponding to the second image and the sixth back-end processed image corresponding to the third image are different. Therefore, the back-end fusion module can be used for fusion processing. In other words, the back-end fusion module may include a black and white color fusion module for implementing fusion of images of different colors.

Based on this, black and white color fusion is performed on the fifth back-end processed image corresponding to the second image and the sixth back-end processed image corresponding to the third image to obtain the back-end fused image. In this way, not only color information corresponding to the second image is retained, but also luminance information corresponding to the third image is fused. Because the third image has higher definition than the second image, quality of the fused image can be improved, and the back-end fused image with higher definition is obtained.

Certainly, the back-end fusion module may further include other functional modules, which may be set and changed based on a requirement. This is not limited in this embodiment of this application.

It should be understood that the back-end fused image is located in the YUV region. The back-end fused image is to be displayed as a shot image on an interface of the electronic device, or is merely stored, and may be specifically transmitted based on a requirement. This is not limited in this embodiment of this application.

It should also be understood that the foregoing process is only an example, and that a specific order may be adjusted based on a requirement. Certainly, steps may be added or removed. This is not limited in this embodiment of this application.

Figure 10:
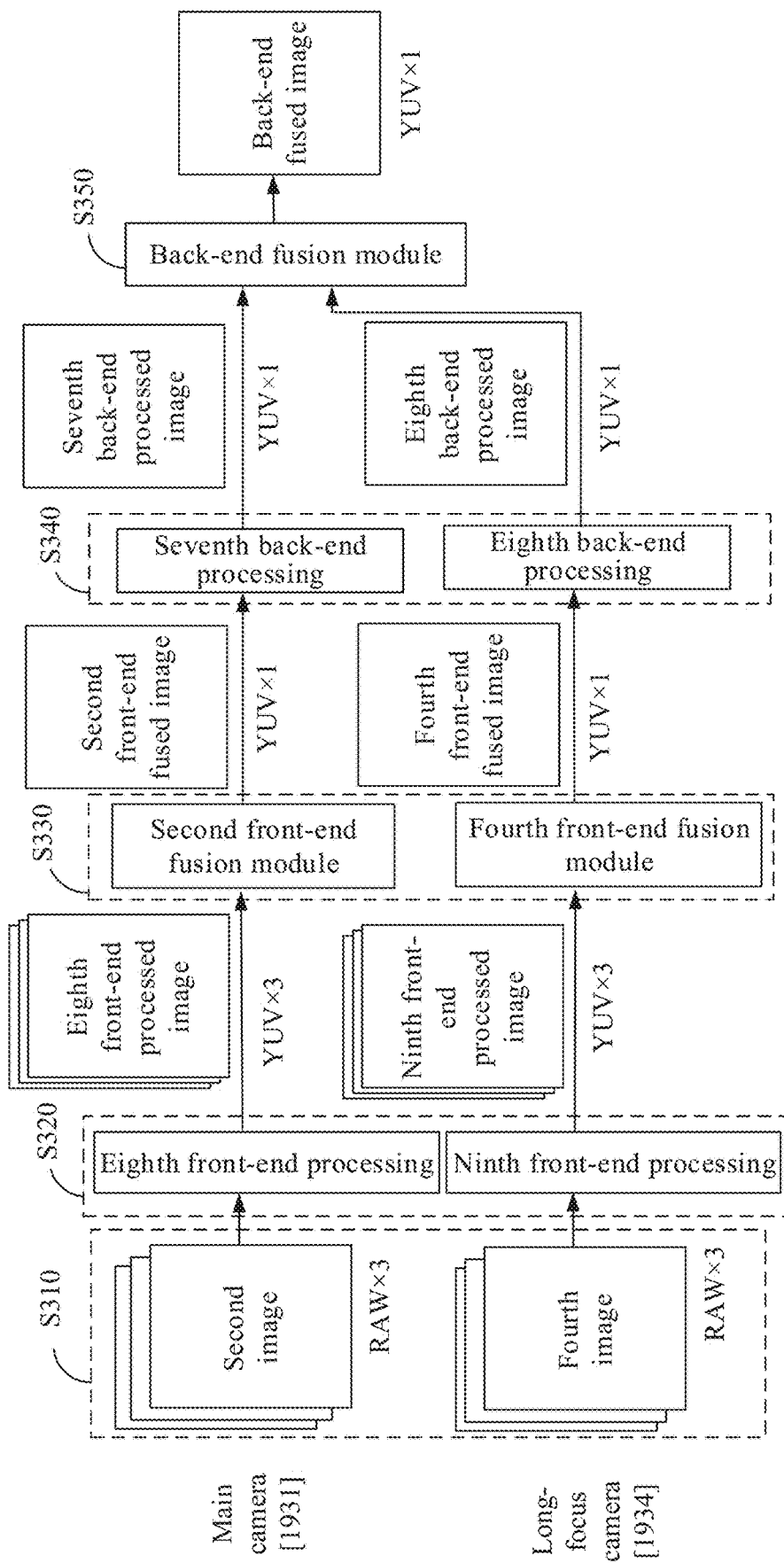
FIG. 10 is still another schematic flowchart of a method for image or video shooting in a photo mode according to an embodiment of this application.

Embodiment 3: As shown in FIG. 10, a method for image or video shooting is provided, and the method includes the following S310 to S350.

A first operation of a user is received, it is determined that a current shooting mode is a photo mode, and a to-be-shot scene has medium or high lightness.

S310. Determine that a current zoom ratio falls within a third zoom ratio range, and determine a target camera.

For example, assuming that the current zoom ratio is 2.6×, the current zoom ratio falls within the third zoom ratio range [2, 3.x). Therefore, it can be determined that target cameras are a main camera 1931 and a long-focus camera 1934, where the long-focus camera 1934 is an auxiliary camera. For example, three frames of second images are obtained by using the main camera 1931 and three frames of fourth images are obtained by using the long-focus camera 1934.

Herein, quantities of second images and fourth images are only examples. Specific quantities may be obtained based on a requirement. This is not limited in this embodiment of this application.

The second image and the fourth image are both located in a RAW region and are both Bayer pattern images. A field of view corresponding to the second image is greater than a field of view image range corresponding to the fourth image, and definition of the fourth image is higher than definition of the second image.

S320. Perform eighth front-end processing on the three frames of second images to obtain three corresponding frames of eighth front-end processed images; and perform ninth front-end processing on the three frames of fourth images to obtain three corresponding frames of ninth front-end processed images.

For the description of the eighth front-end processing and the ninth front-end processing, refer to the foregoing content in S120. Details are not described herein again.

It should be understood that when the eighth front-end processing includes demosaic and color space conversion, after the eighth front-end processing is performed on the second image, the corresponding eighth front-end processed image is located in a YUV region. After the ninth front-end processing is performed on the fourth image, the corresponding ninth front-end processed image is located in the YUV region. When the eighth front-end processing does not include demosaic and color space conversion, after the eighth front-end processing is performed on the second image, the corresponding eighth front-end processed image is still located in the RAW region. After the ninth front-end processing is performed on the fourth image, the corresponding ninth front-end processed image is still located in the RAW region.

For example, in the Embodiment 3 provided in this application, to reduce an amount of data and save bandwidth, the eighth front-end processing and the ninth front-end processing include demosaic and color space conversion, so that after the eighth front-end processing is performed on the second image and the ninth front-end processing is performed on the fourth image, the corresponding eighth front-end processed image and ninth front-end processed image are located in the YUV region.

It should also be understood that in this embodiment, the eighth front-end processing and the ninth front-end processing may be the same or different. This is not limited in this embodiment of this application. The eighth front-end processing and the ninth front-end processing provided in this embodiment may be the same as or different from the front-end processing in the foregoing embodiment, and may be specifically set and changed based on a requirement. This is not limited in this embodiment of this application.

S330. Perform fusion on the three frames of front-end processed images corresponding to the three frames of second images by using a second front-end fusion module, to obtain a corresponding second front-end fused image; and perform fusion on the three frames of front-end processed images corresponding to the three frames of fourth images by using a fourth front-end fusion module, to obtain a corresponding fourth front-end fused image. The front-end fusion module further includes the fourth front-end fusion module.

It should be understood that when the eighth front-end processing includes demosaic and color space conversion, after the eighth front-end processing is performed on the second image, the corresponding eighth front-end processed image is located in the YUV region. After the ninth front-end processing is performed on the fourth image, the corresponding ninth front-end processed image is located in the YUV region. In this case, the second front-end fusion module and the fourth front-end fusion module correspondingly include a YUV region multi-frame fusion module to implement a YUV region multi-frame fusion function. Therefore, the second front-end fused image obtained through processing by the second front-end fusion module is located in the YUV region, and the fourth front-end fused image obtained through processing by the fourth front-end fusion module is also located in the YUV region.

It should be understood that when the eighth front-end processing does not include demosaic and color space conversion, after the eighth front-end processing is performed on the second image, the corresponding eighth front-end processed image is still located in the RAW region. After the ninth front-end processing is performed on the fourth image, the corresponding ninth front-end processed image is still located in the RAW region. In this case, the second front-end fusion module and the fourth front-end fusion module correspondingly include a RAW region multi-frame fusion module to implement a RAW region multi-frame fusion function. Therefore, the second front-end fused image obtained through processing by the second front-end fusion module is located in the RAW region, and the fourth front-end fused image obtained through processing by the fourth front-end fusion module is also located in the RAW region.

Certainly, the second front-end fusion module and the fourth front-end fusion module may further include other functional modules. For details, refer to the foregoing description of the first front-end fusion module or the second front-end fusion module in S130. Details are not described herein again.

Based on this, the plurality of frames of second images may include a second image with a long exposure, a second image with a short exposure, and a second image with a moderate exposure; and the plurality of frames of fourth images may include a fourth image with a long exposure, a fourth image with a short exposure, and a fourth image with a moderate exposure.

When the plurality of frames of second images include second images with different exposure, and the plurality of frames of fourth images include fourth images with different exposure, accordingly, the eighth front-end processed images corresponding to the plurality of frames of second images include eighth front-end processed images with different exposure, and the ninth front-end processed images corresponding to the plurality of frames of fourth images include ninth front-end processed images with different exposure. Based on this, after the second front-end fusion module performs fusion on the plurality of frames of eighth front-end processed images with different exposure, details of a dark region and an over-exposure region in the image can be increased, and a dynamic range can be improved, so that definition of the corresponding second front-end fused image can be improved. Likewise, after the fourth front-end fusion module performs fusion on the plurality of frames of ninth front-end processed images with different exposure, details of a dark region and an over-exposure region in the image can be increased, and a dynamic range can be improved, so that definition of the corresponding fourth front-end fused image can be improved.

It should also be understood that the second front-end fusion module and the fourth front-end fusion module in this embodiment may be the same or different; and the second front-end fusion module and the fourth front-end fusion module may be the same as or different from the first front-end fusion module, the second front-end fusion module, and the third front-end fusion module in the foregoing embodiment, and may be specifically set and changed based on a requirement. This is not limited in this embodiment of this application.

S340. Perform seventh back-end processing on the second front-end fused image corresponding to the three frames of second images to obtain a corresponding seventh back-end processed image; and perform eighth back-end processing on the fourth front-end fused image corresponding to the three frames of fourth images to obtain a corresponding eighth back-end processed image.

For the description of the seventh back-end processing and the eighth back-end processing, refer to the foregoing content in S140. Details are not described herein again.

It should be understood that the seventh back-end processed image corresponding to the second image and the eighth back-end processed image corresponding to the fourth image are both located in the YUV domain.

It should also be understood that in this embodiment, the seventh back-end processing may be the same as or different from the eighth back-end processing. In addition, the seventh back-end processing and the eighth back-end processing in this embodiment may be the same as or different from the back-end processing in the foregoing embodiment, and may be specifically set based on a requirement. This is not limited in this embodiment of this application.

S350. Perform fusion on the seventh back-end processed image corresponding to the second images and the eighth back-end processed image corresponding to the fourth images by using a back-end fusion module, to obtain a back-end fused image, where the back-end fused image is a shot image.

Because the field of view corresponding to the second image is different from the field of view corresponding to the fourth image, there is still a problem that the field of view is different between the seventh back-end processed image and the eighth back-end processed image after the processing. Therefore, the back-end fusion module can be used for fusion processing. In other words, the back-end fusion module may include a field of view fusion module for implementing fusion of images corresponding to different field of view ranges.

Based on this, when the seventh back-end processed image corresponding to the second image and the eighth back-end processed image corresponding to the fourth image are fused, the field of view of the second image is the same as the field of view of the seventh back-end processed image corresponding to the second image, the field of view of the fourth image is the same as the field of view of the eighth back-end processed image corresponding to the fourth image, and the field of view corresponding to the fused back-end fused image is the same as the field of view corresponding to the second image. Assuming that a central point of the field of view of the main camera 1931 is consistent with that of the long-focus camera 1934, because definition of the fourth image is relatively high, and accordingly, definition of the eighth back-end processed image corresponding to the fourth image is relatively high, after the seventh back-end processed image corresponding to the second image is fused with the eighth back-end processed image corresponding to the fourth image, definition in a region of the seventh back-end processed image corresponding to the second image is improved, where the region has a same field of view as the eighth back-end processed image corresponding to the fourth image, so that definition of the image is improved.

Certainly, the back-end fusion module may further include other functional modules, which may be set and changed based on a requirement. This is not limited in this embodiment of this application.

It should be understood that the back-end fusion module in this embodiment may be the same as or different from the back-end fusion module in the foregoing embodiment, and may be specifically set based on a requirement. This is not limited in this embodiment of this application.

It should be understood that the obtained back-end fused image is located in the YUV region. The back-end fused image is to be displayed as a shot image on an interface of the electronic device, or is merely stored, and may be specifically transmitted based on a requirement. This is not limited in this embodiment of this application.

In this embodiment, after the foregoing series of processing based on the second image and the fourth image with different fields of view and different definition, a shot image with higher definition and better quality can be obtained through fusion.

It should also be understood that the foregoing process is only an example, and that a specific order may be adjusted based on a requirement. Certainly, steps may be added or removed. This is not limited in this embodiment of this application.

Figure 11:
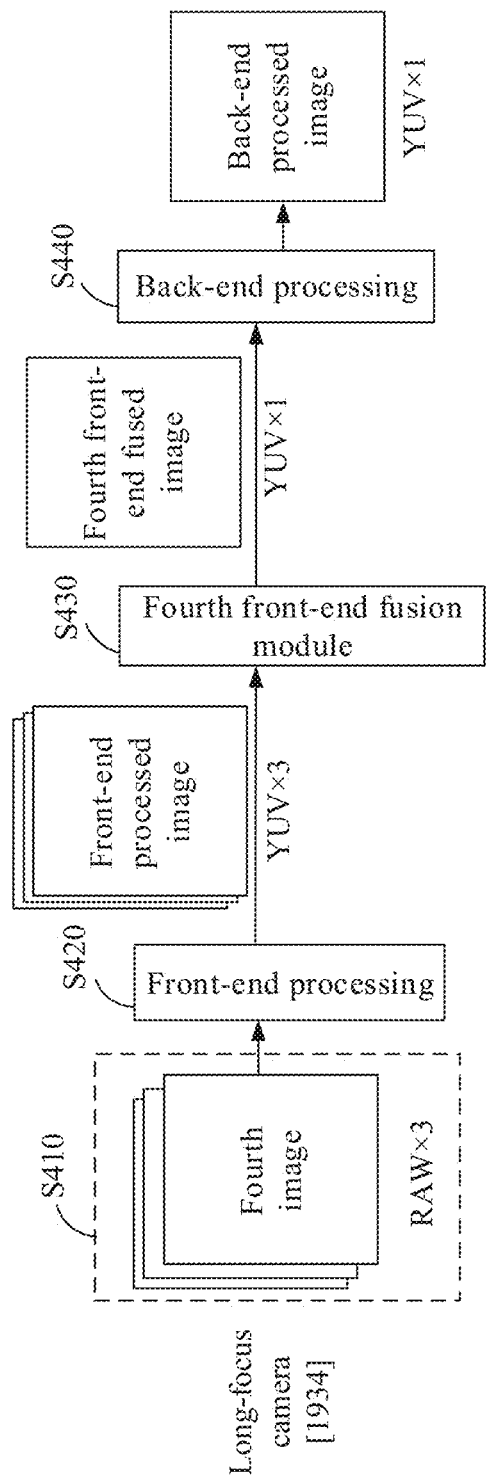
FIG. 11 is still another schematic flowchart of a method for image or video shooting in a photo mode, according to an embodiment of this application.

Embodiment 4: As shown in FIG. 11, a method for image or video shooting is provided, and the method includes the following S410 to S440.

A first operation of a user is received, it is determined that a current shooting mode is a photo mode, and a to-be-shot scene has medium or high lightness.

S410. Determine that a current zoom ratio falls within a fourth zoom ratio range, and determine a target camera.

For example, assuming that the current zoom ratio is 20, the current zoom ratio falls within the fourth zoom ratio range [3.x, 100], and it is determined that the target camera is a long-focus camera. For example, three frames of fourth images are obtained by using the long-focus camera.

It should be understood that when the zoom ratio is relatively large, definition of other cameras all decreases. Therefore, only the long-focus camera is set as the target camera corresponding to the fourth zoom ratio range.

Herein, a quantity of fourth images is only an example. A specific quantity may be obtained based on a requirement. This is not limited in this embodiment of this application.

The fourth image is located in a RAW region, and is a Bayer pattern image.

S420. Perform front-end processing on the three frames of fourth images to obtain three corresponding frames of front-end processed images.

For the description of the front-end processing, refer to the foregoing content in S120. Details are not described herein again.

It should be understood that when the front-end processing includes demosaic and color space conversion, after the front-end processing is performed on the fourth image, the corresponding front-end processed image is located in a YUV region. When the front-end processing does not include demosaic and color space conversion, after the front-end processing is performed on the fourth image, the corresponding front-end processed image is still located in the RAW region.

For example, the front-end processing in the Embodiment 4 provided in this application includes demosaic and color space conversion, so that an image in subsequent processing can be located in the YUV region. In this way, an amount of data is reduced, and bandwidth is saved.

It should be understood that the front-end processing provided in this embodiment may be the same as or different from the front-end processing in the foregoing embodiment, and may be specifically set and changed based on a requirement. This is not limited in this embodiment of this application.

S430. Perform fusion on the three frames of front-end processed images corresponding to the three frames of fourth images by using a fourth front-end fusion module, to obtain a fourth front-end fused image corresponding to the three frames of fourth images. The front-end fusion module further includes the fourth front-end fusion module.

It should be understood that when the front-end processing includes demosaic and color space conversion, after the front-end processing is performed on the fourth image, the corresponding front-end processed image is located in the YUV region. In this case, the fourth front-end fusion module correspondingly includes a YUV region multi-frame fusion module to implement a YUV region multi-frame fusion function. Therefore, the fourth front-end fused image obtained through processing by the fourth front-end fusion module is also located in the YUV region.

When the front-end processing does not include demosaic and color space conversion, after the front-end processing is performed on the fourth image, the corresponding front-end processed image is still located in the RAW region. In this case, the fourth front-end fusion module correspondingly includes a RAW region multi-frame fusion module to implement a RAW region multi-frame fusion function. Therefore, the fourth front-end fused image obtained through processing by the fourth front-end fusion module is located in the RAW region.

Certainly, the fourth front-end fusion module may further include other functional modules. For details, refer to the foregoing description of the first front-end fusion module or the second front-end fusion module in S130. Details are not described herein again.

Based on this, the plurality of frames of fourth images may include a fourth image with a long exposure, a fourth image with a short exposure, and a fourth image with a moderate exposure.

When the plurality of frames of fourth images include fourth images with different exposure, accordingly, the front-end processed images corresponding to the plurality of frames of fourth images include front-end processed images with different exposure. Based on this, after the fourth front-end fusion module performs fusion on the plurality of frames of front-end processed images with different exposure, details of a dark region and an over-exposure region in the image can be increased, and a dynamic range can be improved, so that definition of the corresponding fourth front-end fused image can be improved.

It should also be understood that the fourth front-end fusion module in this embodiment may be the same as or different from the first front-end fusion module, the second front-end fusion module, the third front-end fusion module, or the fourth front-end fusion module in the foregoing embodiment, and may be specifically set and changed based on a requirement. This is not limited in this embodiment of this application.

S440. Perform back-end processing on the fourth front-end fused image corresponding to the fourth images, to obtain a corresponding back-end processed image, where the back-end processed image is a shot image.

For the description of the back-end processing, refer to the foregoing content in S140. Details are not described herein again.

It should be understood that the back-end processed image corresponding to the fourth image is located in the YUV region.

It should be understood that the back-end processing provided in this embodiment may be the same as or different from the back-end processing in the foregoing embodiment, and may be specifically set and changed based on a requirement. This is not limited in this embodiment of this application.

In this implementation, after the foregoing series of processing based on the plurality of frames of fourth image, a shot image with higher definition and better quality can be obtained through fusion.

It should also be understood that the foregoing process is only an example, and that a specific order may be adjusted based on a requirement. Certainly, steps may be added or removed. This is not limited in this embodiment of this application.

Figure 12:
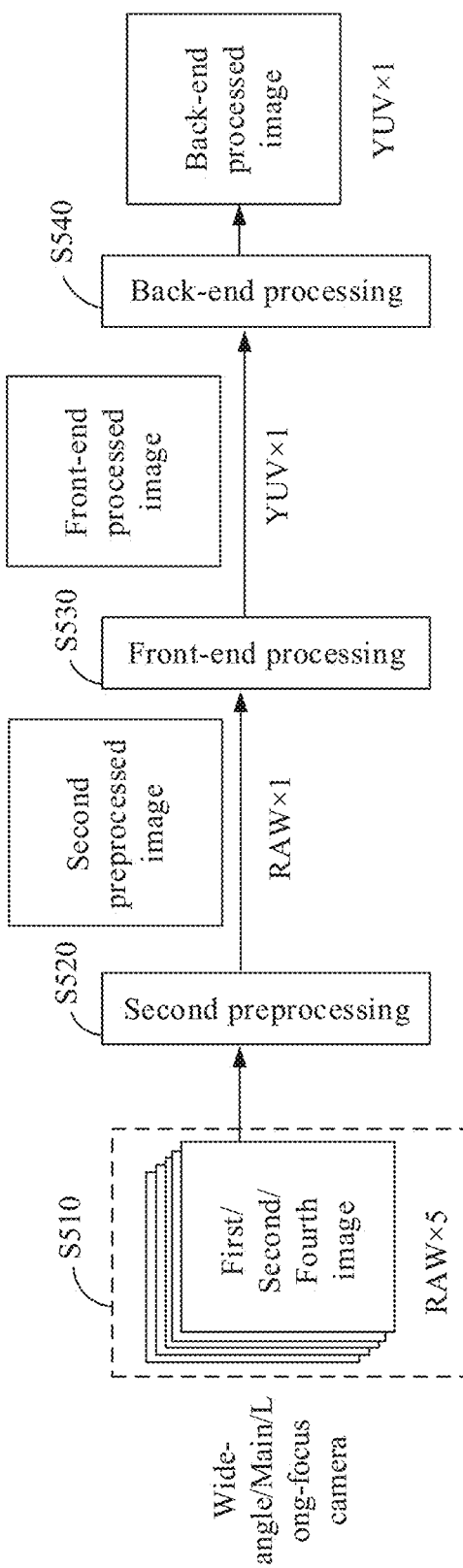
FIG. 12 is still another schematic flowchart of a method for image or video shooting in a photo mode, according to an embodiment of this application.

Embodiment 5: As shown in FIG. 12, a method for image or video shooting is provided, and the method includes the following S510 to S540.

A first operation of a user is received, it is determined that a current shooting mode is a photo mode, and lightness of a to-be-shot scene is less than a preset lightness threshold, that is, the to-be-shot scene has low lightness.

S510. Determine a zoom ratio range within which a current zoom ratio falls, and determine a target camera.

For example, assuming that the current zoom ratio is 0.5×, the current zoom ratio falls within a first zoom ratio range [0.5, 1), and in low lightness, the target camera is a wide-angle camera 1933. For example, five frames of first images are obtained by using the wide-angle camera 1933.

In addition, if the current zoom ratio is 2.6×, the current zoom ratio falls within a third zoom ratio range [2, 3.x), and in low lightness, the target camera is a main camera 1931. For example, five frames of second images are obtained by using the main camera 1931.

If the current zoom ratio is 20, the current zoom ratio falls within a fourth zoom ratio range [3.x, 100], and in low lightness, the target camera is a long-focus camera. For example, five frames of fourth images are obtained by using the long-focus camera.

Herein, quantities of first images, second images, and fourth images are only examples. Specific quantities may be obtained based on a requirement. This is not limited in this embodiment of this application.

The first image, the second image, and the fourth image are all located in a RAW region and are Bayer pattern images.

S520. Perform second preprocessing on the five frames of first images, the five frames of second images, or the five frames of fourth images, to obtain a corresponding second preprocessed image located in the RAW region.

The foregoing S520 may also be expressed as: performing second preprocessing on the five frames of first images to obtain the corresponding second preprocessed image located in the RAW region; performing second preprocessing on the five frames of second images to obtain the corresponding second preprocessed image located in the RAW region; or performing second preprocessing on the five frames of fourth images to obtain the corresponding second preprocessed image located in the RAW region.

The second preprocessing provided in this embodiment includes a night algorithm module. For example, the night algorithm module is generated based on a Unet network model, and is capable of fusing a plurality of frames of first images, a plurality of frames of second images, or a plurality of frames of fourth images in the RAW region into one corresponding frame of second preprocessed image located in the RAW region.

Figure 13:
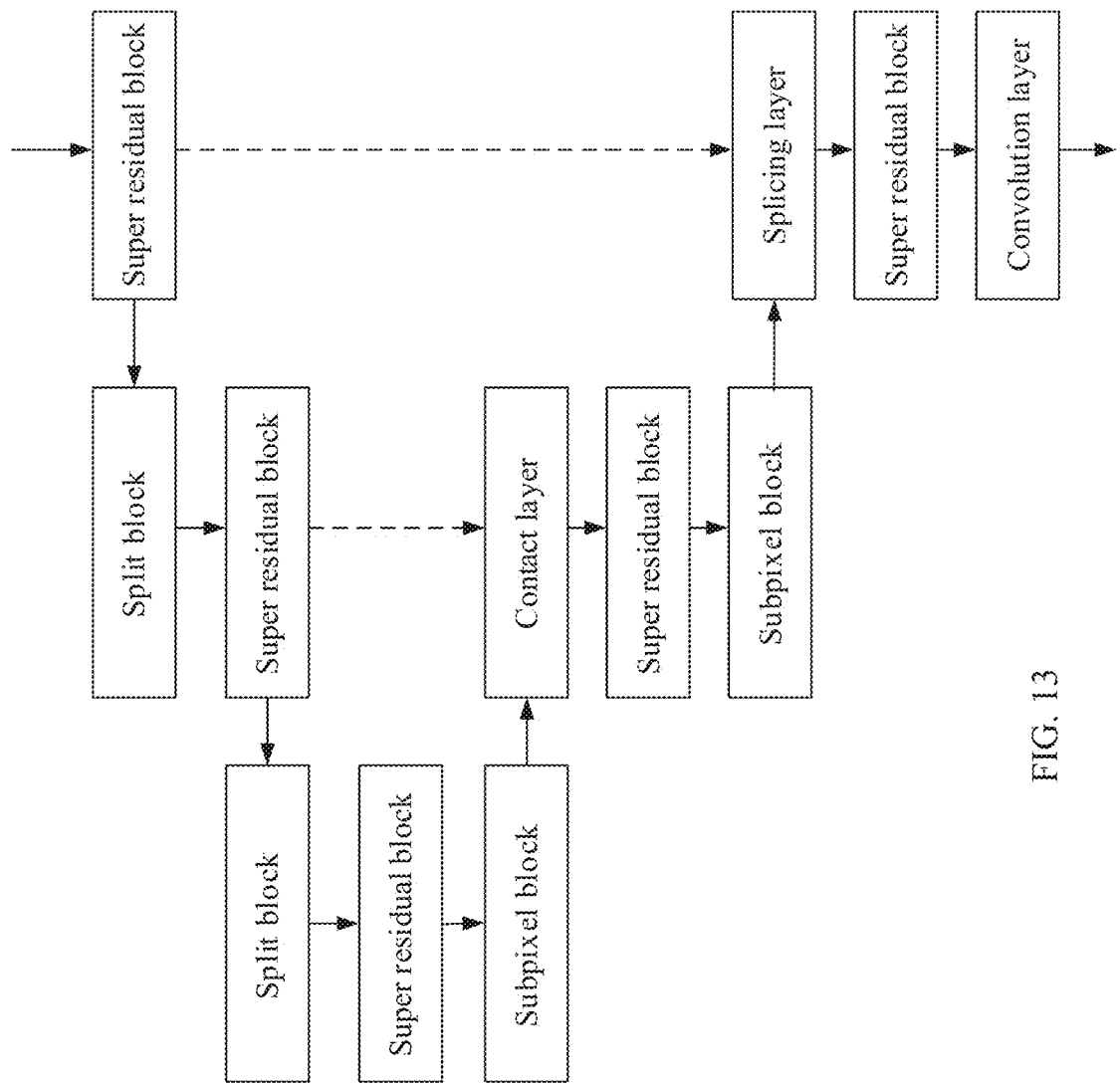
FIG. 13 is a schematic diagram of a structure of a night algorithm module, according to an embodiment of this application.

For example, FIG. 13 is a schematic diagram of a structure of a night algorithm module according to an embodiment of this application. As shown in FIG. 13, the night algorithm module provided in this embodiment includes super residual block (super resblock), split, subpixel, contact layer, and convolution layer (Conv).

Figure 14:
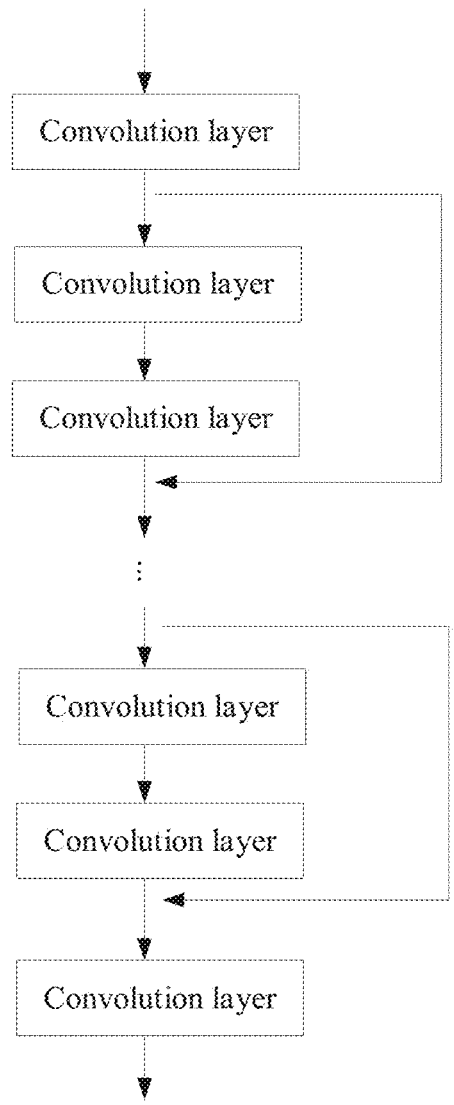
FIG. 14 is a schematic diagram of a structure of a super residual block in FIG. 13.

FIG. 14 is a schematic diagram of a structure of a super residual block. As shown in FIG. 14, each super residual block includes a plurality of convolution layers, inputs and outputs of different convolution layers are superposed, and then an output of final superposition is used as an output result of the super residual block.

With reference to FIG. 13, for example, five frames of fourth images captured by the long-focus camera 1934 are input into a first super residual block in a first row from a left side for processing, and image information is extracted; then the image information is input into a split block for processing, information of one channel is split into four channels in an interlaced manner to obtain more local image information, and then the local image information is input into a first super residual block in a second row for processing; and then the processed information is further input into a split block and a super residual block for processing, so that a processing result meets an image encoding requirement.

Then a processing result of a second super residual block in a third row is input into a subpixel block for processing, and information of four channels is combined into one channel in an interlaced manner, so that a size can be increased and that an image resolution can be improved; features of an output of the subpixel block in the third row and an output of the first super residual block in the second row are spliced by using a contact layer, and then the spliced features are input into a second super residual block in the second row for processing.

Then a processing result of the second super residual block in the second row is continuously input into a subpixel block for processing; features of an output of the subpixel block in the second row and an output of the first super residual block in the first row are spliced by using the contact layer; and then the spliced features are input into a second super residual block in the first row for processing. Finally, the processed features are input into a plurality of convolution layers for convolution processing, to obtain one frame of second preprocessed image corresponding to the five frames of first images.

S530. Perform front-end processing on the second preprocessed image corresponding to the five frames of first images, the five frames of second images, or the five frames of fourth images, to obtain a corresponding front-end processed image.

For the description of the front-end processing, refer to the foregoing content in S120. Details are not described herein again.

For example, in this embodiment, to reduce an amount of data and save bandwidth, the front-end processing includes demosaic and color space conversion, so that after the front-end processing is performed on the second preprocessed image located in the RAW region and corresponding to the first images, the second images, or the fourth images, the obtained front-end processed image is located in a YUV region.

It should also be understood that the front-end processing provided in this embodiment may be the same as or different from the front-end processing in the foregoing embodiment, and may be specifically set and changed based on a requirement. This is not limited in this embodiment of this application.

S540. Perform back-end processing on the front-end processed image corresponding to the five frames of first images, the five frames of second images, or the five frames of fourth images, to obtain a corresponding back-end processed image, where the back-end processed image is a shot image.

For the description of the back-end processing, refer to the foregoing content in S140. Details are not described herein again.

It should be understood that the back-end processed image corresponding to the first images, the second images, and the fourth images are all located in the YUV region.

It should be understood that the back-end processing provided in this embodiment may be the same as or different from the back-end processing in the foregoing embodiment, and may be specifically set and changed based on a requirement. This is not limited in this embodiment of this application.

In this embodiment, in a scene of low lightness, multi-frame fusion processing and the foregoing other processing may be performed based on the plurality of frames of first images, second images, or fourth images by using a network model, to obtain a shot image with higher definition and better quality through fusion.

It should also be understood that the foregoing process is only an example, and that a specific order may be adjusted based on a requirement. Certainly, steps may be added or removed. This is not limited in this embodiment of this application.

Figure 15:
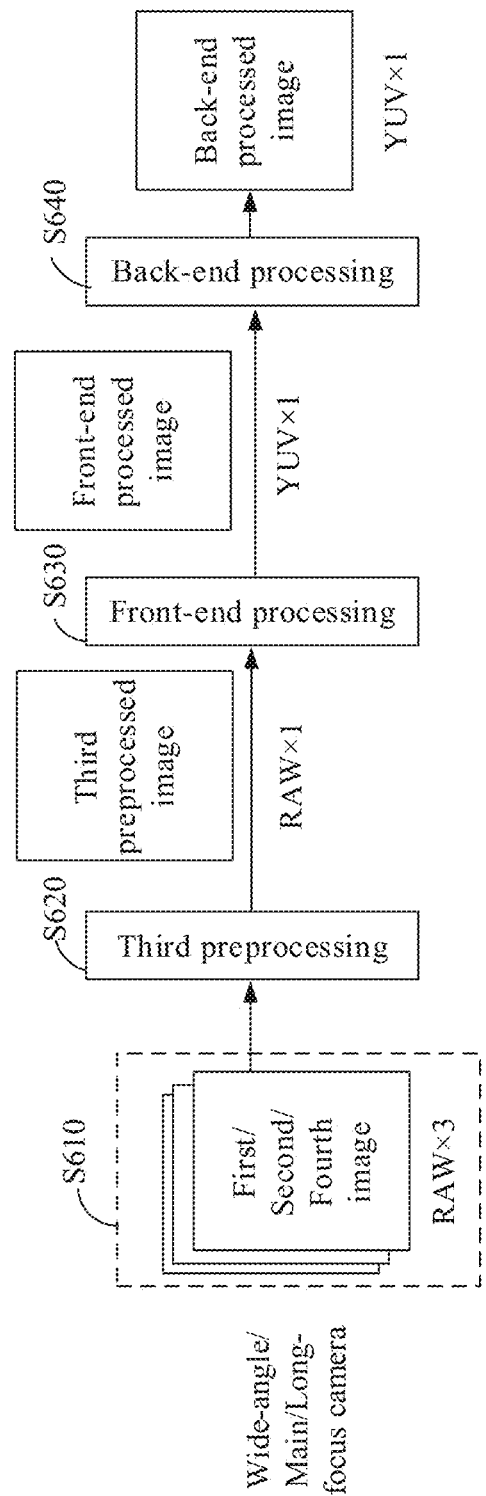
FIG. 15 is another schematic flowchart of a method for image or video shooting in a video mode, according to an embodiment of this application.

Embodiment 6: As shown in FIG. 15, a method for image or video shooting is provided, and the method includes the following S610 to S640.

S610. Determine a zoom ratio range within which a current zoom ratio falls, and determine a target camera.

For example, a first operation of a user is received, and it is determined that a current shooting mode is a video mode. When the current shooting mode is the video mode, the current zoom ratio is first determined. Assuming that the current zoom ratio is 0.5×, the current zoom ratio falls within a first zoom ratio range [0.5, 1), and the target camera is a wide-angle camera 1933. For example, three frames of first images are obtained by using the wide-angle camera 1933.

In addition, if the current zoom ratio is 2.6×, the current zoom ratio falls within a third zoom ratio range [2, 3.x), and in low lightness, the target camera is a main camera 1931. For example, three frames of second images are obtained by using the main camera 1931.

If the current zoom ratio is 20, the current zoom ratio falls within a fourth zoom ratio range [3.x, 100], and in low lightness, the target camera is a long-focus camera. For example, three frames of fourth images are obtained by using the long-focus camera.

Herein, quantities of first images, second images, and fourth images are only examples. Specific quantities may be obtained based on a requirement. This is not limited in this embodiment of this application.

The first image, the second image, and the fourth image are all located in a RAW region and are Bayer pattern images.

S620. Perform third preprocessing on the three frames of first images, the three frames of second images, or the three frames of fourth images, to obtain a corresponding third preprocessed image located in the RAW region.

The foregoing S620 may also be expressed as: performing third preprocessing on the three frames of first images to obtain the corresponding third preprocessed image located in the RAW region; performing third preprocessing on the three frames of second images to obtain the corresponding third preprocessed image located in the RAW region; and performing third preprocessing on the three frames of fourth images to obtain the corresponding third preprocessed image located in the RAW region.

The three frames of first images include a first image with a long exposure, a first image with a short exposure, and a first image with a moderate exposure; the three frames of second images include a second image with a long exposure, a second image with a short exposure, and a second image with a moderate exposure; and the three frames of fourth images include a fourth image with a long exposure, a fourth image with a short exposure, and a fourth image with a moderate exposure.

The third preprocessing provided in this embodiment of this application includes an HDR algorithm module. For example, the HDR algorithm module can fuse, based on long-short exposure fusion processing and a tone mapping (tone mapping) model, a plurality of frames of first images, second images, or fourth images with different exposure into one frame of third preprocessed image located in the RAW region.

Figure 16:
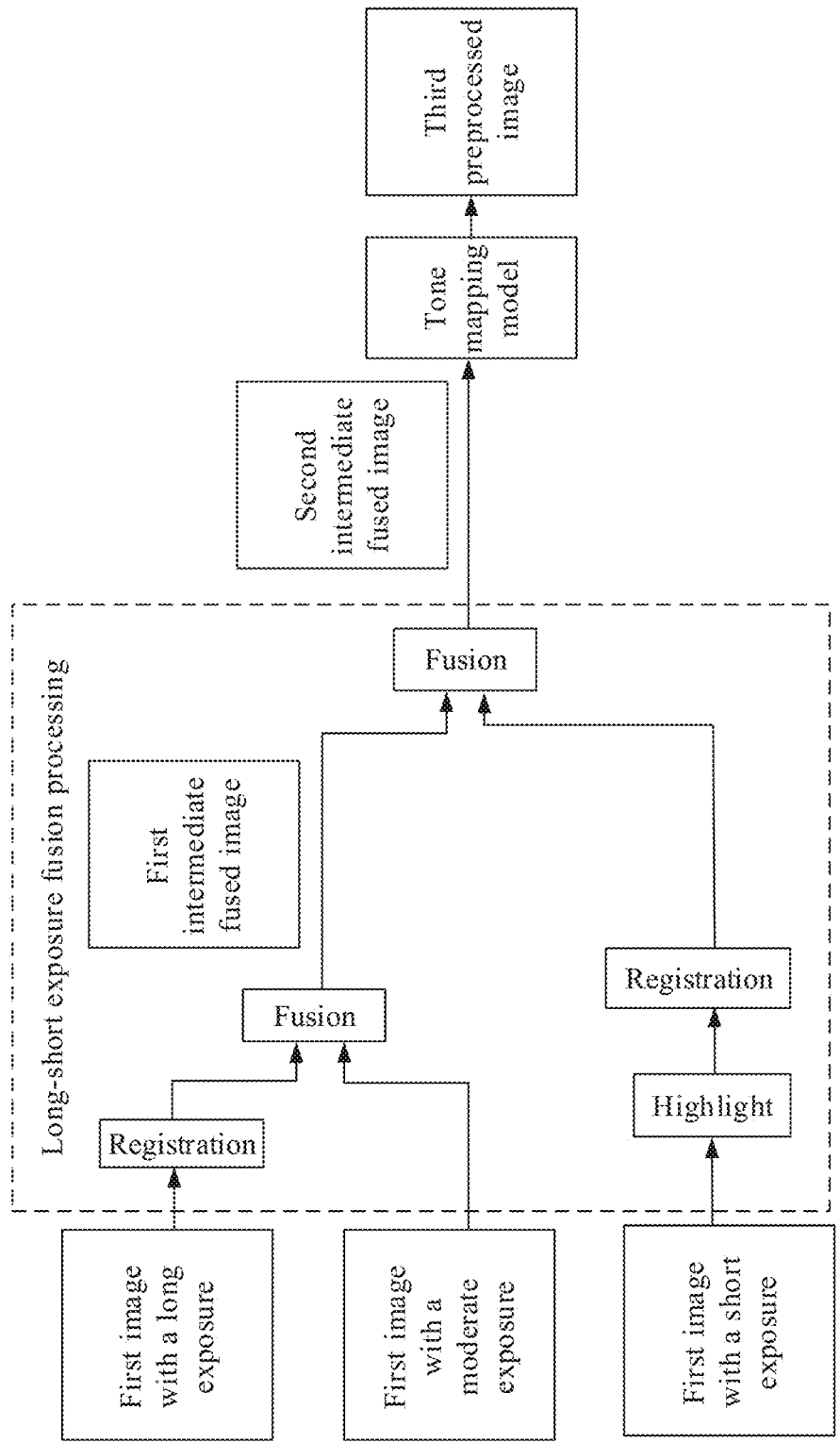
FIG. 16 is a schematic flowchart for obtaining a third preprocessed image by using an HDR algorithm module, according to an embodiment of this application.
Figure 17:
FIG. 17 shows a first image with a long exposure, a first image with a short exposure, and the third preprocessed image in FIG. 16.

For example, FIG. 16 is a schematic flowchart for obtaining the third preprocessed image by using the HDR algorithm module according to an embodiment of this application. FIG. 17 shows the first image with a long exposure, the first image with a short exposure, and the third preprocessed image in FIG. 16.

As shown in FIG. 16 and FIG. 17, for example, for the three frames of first images including the first image with a long exposure (as shown in FIG. 17(a)), the first image with a short exposure (as shown in FIG. 17(b)), the first image with a moderate exposure, the first image with a moderate exposure and the first image with a long exposure may be fused first to obtain a first intermediate fused image, and then the intermediate fused image and the second image with a short exposure are fused to obtain a second intermediate fused image. Before fusion is performed with the first image with a long exposure, the first image with a long exposure may be registered first. Before fusion is performed with the first image with a short exposure, the first image with a short exposure may be highlighted and registered first. Then after the fusion, the second intermediate fused image is input into the tone mapping model, so that mapping conversion processing is performed on colors of the second intermediate fused image. In this way, the third preprocessed image is obtained (as shown in FIG. 17(c)).

Optionally, the tone mapping model may be any one of a Unet network model, a Resnet network model, and a Hdrnet network model. Certainly, the tone mapping model may be another model. This is not limited in this embodiment of this application.

In this embodiment, fusion of the first image with a moderate exposure and the first image with a long exposure can enhance details of a dark region not exposed sufficiently in the first image with a moderate exposure, and fusion with the first image with a short exposure can enhance details of a bright region in the first image with a moderate exposure. Therefore, performing long-short exposure fusion processing on the first image with a moderate exposure can improve details of the dark region and the bright region in the first image with a moderate exposure at the same time, improve a dynamic range, and achieve an objective of improving definition of the image.

S630. Perform front-end processing on the third preprocessed image to obtain a corresponding front-end processed image.

For the description of the front-end processing, refer to the foregoing content in S120. Details are not described herein again.

For example, in this embodiment, to reduce an amount of data and save bandwidth, the front-end processing includes demosaic and color space conversion, so that after the front-end processing is performed on the third preprocessed image located in the RAW region and corresponding to the first images, the second images, or the fourth images, the obtained front-end processed image is located in a YUV region.

It should also be understood that the front-end processing provided in this embodiment may be the same as or different from the front-end processing in the foregoing embodiment, and may be specifically set and changed based on a requirement. This is not limited in this embodiment of this application.

S640. Perform back-end processing on the front-end processed image to obtain a corresponding back-end processed image, where the back-end processed image is a shot image.

For the description of the back-end processing, refer to the foregoing content in S140. Details are not described herein again.

It should be understood that the back-end processed image corresponding to the first images, the second images, or the fourth images is located in the YUV region.

It should be understood that the back-end processing provided in this embodiment may be the same as or different from the back-end processing in the foregoing embodiment, and may be specifically set and changed based on a requirement. This is not limited in this embodiment of this application.

In this implementation, in the video mode, fusion processing of the plurality of frames of images with different exposures and the foregoing other processing may be performed based on the plurality of frames of first images, second images, or fourth images by using the HDR algorithm module, to obtain a shot image with higher definition and better quality through fusion.

It should also be understood that the foregoing process is only an example, and that a specific order may be adjusted based on a requirement. Certainly, steps may be added or removed. This is not limited in this embodiment of this application.

The methods for image or video shooting in the photo mode and the video mode provided in this application are described in detail above in the Embodiments 1 to 6. The electronic device 100 may separately select one method for use or may use a combination of the methods, which may be specifically set and adjusted based on a requirement. This is not limited in the embodiments of this application.

With reference to the foregoing content, generally, before using the photo mode to perform photographing, that is, when performing photo preview, or before using the video mode to perform video shooting, that is, when performing video preview, the user usually performs zooming (that is, adjusting a focal length) first, and then performs shooting. In addition, zooming is possible during video shooting.

Because a focusing distance of a single camera is always limited, to improve zoom ratio coverage of the electronic device, this application provides an electronic device including a plurality of cameras (multiple cameras), where the plurality of cameras include a wide-angle camera 1933, a main camera 1931, a black and white camera 1932, and a long-focus camera 1934. Each camera corresponds to a range of zoom ratios. Therefore, when zooming is performed, for example, when switching from a zoom ratio range a to another zoom ratio range b, the electronic device can control the camera to switch from a camera A corresponding to the zoom ratio range a to a camera B corresponding to the zoom ratio range b to implement relay zooming, so that overall zoom ratio coverage of the electronic device is wider.

However, when switching from the camera A to the camera B, as the camera A is closed, the camera B is started. Because there are problems such as an optical axis offset and a field of view angle difference between the two cameras, direct switching between the two cameras may cause problems such as an abrupt change, jitter, and frame freezing in an image in photo preview, an image in video preview, or a picture center of a picture in video shooting, and a size of the field of view, and user experience is affected.

In view of this, an embodiment of this application provides a multi-camera zooming method (spatial alignment transform, SAT). The method can not only implement relay zooming, but also enable a camera corresponding to a target zoom ratio range to be started in advance and run in a background before zoom switching to the target zoom ratio range, so that during zoom switching, the camera only needs to be switched from a background running state to a foreground display state. The change is relatively small, and the switching is smoother. This embodiment may be performed in cooperation with any one or a combination of the foregoing embodiments.

The following describes a multi-camera zooming method provided in an embodiment of this application.

An embodiment of this application provides a multi-camera zooming method, applied to an electronic device 100 including a plurality of cameras, where the plurality of cameras include a wide-angle camera 1933, a main camera 1931, a black and white camera 1932, and a long-focus camera 1934.

It should be understood that each camera itself is suitable for a zoom ratio range, and zoom ratio ranges corresponding to the cameras may be different or may overlap. A specific zoom ratio range may be selected based on a requirement. This is not limited in this embodiment of this application.

With reference to the foregoing plurality of cameras, the multi-camera zooming method provided in this embodiment of this application includes:

during photo preview, video preview, or video shooting, when a first target camera corresponding to the $N^{th}$ zoom ratio range is different from a first target camera corresponding to an $(N+1)^{th}$ zoom ratio range, when zooming from the $N^{th}$ zoom ratio range to the $(N+1)^{th}$ zoom ratio range, the first target camera corresponding to the $N^{th}$ zoom ratio range is switched from a foreground display state to a closed state or a background running state, and the first target camera corresponding to the $(N+1)^{th}$ zoom ratio range is switched from the background running state to the foreground display state, where N is a positive integer; or when a first target camera corresponding to the $N^{th}$ zoom ratio range is the same as a first target camera corresponding to the $(N+1)^{th}$ zoom ratio range, when zooming from the $N^{th}$ zoom ratio range to the $(N+1)^{th}$ zoom ratio range, the first target camera corresponding to the $N^{th}$ zoom ratio range remains in a foreground display state.

Each zoom ratio range corresponds to one first target camera, and the first target camera is one of the wide-angle camera 1933, the main camera 1931, the black and white camera 1932, and the long-focus camera 1934.

It should be understood that the foreground display state indicates that the camera captures an image and the captured image is used for displaying; and the background running state indicates that the camera captures an image but the captured image is not used for displaying, for example, is stored for backup only. The closed state indicates that the camera does not capture an image. The camera in the background running state may also be referred to as an auxiliary camera corresponding to a zoom ratio range.

It should be understood that the first target camera corresponding to each zoom ratio range is one of the cameras to which the zoom ratio range is applicable. First target cameras corresponding to a plurality of zoom ratio ranges may be the same or may be different, and a correspondence is specifically set based on the divided zoom ratio ranges and the zoom ratio ranges of the cameras. This is not limited in this embodiment of this application.

It should be understood that the zoom ratio range applicable to the first target camera itself corresponding to the $N^{th}$ zoom ratio range needs to be greater than or equal to the $N^{th}$ zoom ratio range, so that the camera can be switched from the foreground display state to the background running state for continued use or switched to the closed state after switching. The zoom ratio range applicable to the first target camera itself corresponding to the $(N+1)^{th}$ zoom ratio range needs to be greater than the $(N+1)^{th}$ zoom ratio range, so that background running can be started when the camera is not switched to the $(N+1)^{th}$ zoom ratio range.

It should be understood that when zooming within a zoom ratio range does not exceed the zoom ratio range, the first target camera corresponding to the zoom ratio range is always in the foreground display state and no switching occurs, that is, the first target camera captures an image and transmits the image to a viewfinder window 60 for displaying.

It should be understood that during zooming, the first target camera corresponding to the $(N+1)^{th}$ zoom ratio range is switched from the background running state to the foreground display state, indicating that the first target camera corresponding to the $(N+1)^{th}$ zoom ratio range has been invoked to run in the background when zooming within the $N^{th}$ zoom ratio range does not reach a zoom switching point. An occasion of invoking, that is, a time of invoking the first target camera corresponding to the $(N+1)^{th}$ zoom ratio range when zooming to a specific ratio within the $N^{th}$ zoom ratio range may be set and changed based on a requirement and the applicable range of the camera. This is not limited in this embodiment of this application.

Optionally, in a possible implementation, a current zoom ratio is determined when zooming is performed during photo preview, video shooting, or video preview. Assuming that zooming from small to large is performed, when the current zoom ratio falls within the $N^{th}$ zoom ratio range, at a time of zooming to a minimum zoom ratio of the $N^{th}$ zoom ratio range, it is determined whether the first target camera corresponding to the $N^{th}$ zoom ratio range is the same as the first target camera corresponding to the $(N+1)^{th}$ zoom ratio range; and if no, the first target camera corresponding to the $(N+1)^{th}$ zoom ratio range starts to be invoked at the minimum zoom ratio of the $N^{th}$ zoom ratio range, for background running; or when zooming to a preset zoom ratio within the $N^{th}$ zoom ratio range, the first target camera corresponding to the $(N+1)^{th}$ zoom ratio range starts to be invoked for background running.

It should be understood that the preset zoom ratio may be set and changed based on a requirement. This is not limited in this embodiment of this application.

Optionally, in a possible implementation, when zooming is performed in photo preview, video shooting, or video preview, first, the current zoom ratio is determined, and then the current zoom ratio range within which the current zoom ratio falls is determined based on the current zoom ratio, for example, is the $m^{th}$ zoom ratio range; then a maximum value and a minimum value of the current zoom ratio range are respectively determined, and an absolute value of a difference between the maximum value and the current zoom ratio is determined as a first difference; and an absolute value of a difference between the minimum value and the current zoom ratio is determined as a second difference.

If the first difference is smaller than the second difference, it indicates that the current zoom ratio is close to the maximum value of the current zoom ratio range. Therefore, a switching condition may be set as: when it is calculated that the first difference is less than the second difference, determining whether the first target camera corresponding to the current zoom ratio range is the same as a first target camera corresponding to the $(m+1)^{th}$ zoom ratio range, and if no, starting the first target camera corresponding to the $(m+1)^{th}$ zoom ratio range for background running. If the first difference is greater than the second difference, it indicates that the current zoom ratio is close to the minimum value of the current zoom ratio range. Therefore, a switching condition may be set as: when it is calculated that the first difference is greater than the second difference, determining whether the first target camera corresponding to the current zoom ratio range is the same as a first target camera corresponding to the $(m-1)^{th}$ zoom ratio range, and if no, starting the first target camera corresponding to the $(m-1)^{th}$ zoom ratio range for background running.

It should be understood that when zooming from the $N^{th}$ zoom ratio range to the $(N+1)^{th}$ zoom ratio range, when the first target camera corresponding to the $(N+1)^{th}$ zoom ratio range is invoked and started for background running, starting from zooming within the $N^{th}$ zoom ratio range, synchronization processing can be performed on the first target camera corresponding to the $(N+1)^{th}$ zoom ratio range and the first target camera corresponding to the $N^{th}$ zoom ratio range. For example, luminance information, color information, focus points, and centers of the fields of view of the two cameras are all kept consistent. In this way, when the camera zooms to the $(N+1)^{th}$ zoom ratio range, a preview image does not have problems such as an abrupt change and jitter. Therefore, switching is smoother, and a user can hardly perceive any change, thereby effectively improving user experience.

Figure 18:
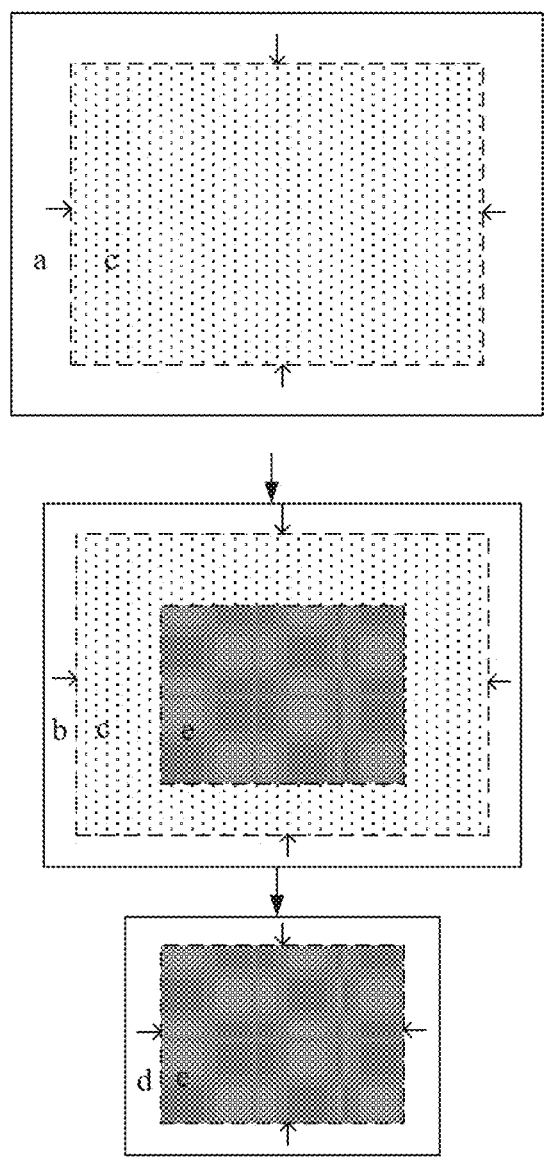
FIG. 18 is a schematic diagram of changes of a field of view in multi-camera zoom switching, according to an embodiment of this application.

For example, FIG. 18 is a schematic diagram of changes of a field of view in multi-camera zoom switching.

As shown in FIG. 18, when zooming from small to large within the $n^{th}$ zoom ratio range, a camera Cn corresponding to the $n^{th}$ zoom ratio range is started, and a field of view is gradually narrowed as a zoom ratio increases. For example, a field of view of the camera Cn is gradually narrowed from a region a shown in the figure.

When zooming from the $n^{th}$ zoom ratio range to the $(n+1)^{th}$ zoom ratio range, when a first zoom switching point is reached, that is, when narrowing to a field of view corresponding to a first zoom switching point (region c shown in the figure), the camera Cn needs to be switched to a camera Cn+1 corresponding to the $(n+1)^{th}$ zoom ratio range. However, if a minimum zoom ratio of the camera Cn+1 is a ratio of the first zoom switching point, a minimum field of view corresponding to the camera Cn+1 is the region c. In this case, when the field of view of the camera Cn is narrowed from the region a to the region c, if the camera is directly switched to the camera Cn+1 corresponding to the region c, the switching is relatively difficult, and there may be problems such as an optical axis offset and a field of view angle difference between the two cameras, resulting in problems such as an abrupt change and jitter in a picture center and a size of the field of view, and affecting user experience.

Therefore, this application provides a camera Cn+1 that has larger zoom ratio coverage, where a maximum field of view corresponding to the camera is, for example, a region b in the figure. In this way, when zooming from the $n^{th}$ zoom ratio range to the $(n+1)^{th}$ zoom ratio range, before the first zoom switching point is reached, the camera Cn+1 is started and run in the background, so that the field of view corresponding to the camera Cn+1 is gradually narrowed from the region b.

In this way, in the zoom process, when the range is not narrowed to the region c, synchronization processing is performed on the camera Cn and the camera Cn+1 to keep parameters of the two cameras consistent. Then when the region c is reached, the camera Cn+1 is switched from a background running state to a foreground display state. Therefore, the camera Cn+1 makes preparations in advance to narrow the range to the region c simultaneously with the camera Cn. Therefore, when the region c is reached, the switching can be smoother, and a user can hardly perceive any change, thereby effectively improving user experience.

Likewise, the zoom ratio continues to be increased. When zooming from the (n+1)th zoom ratio range to the (n+2)th zoom ratio range, when a second zoom switching point is reached, that is, when narrowing the range to a field of view corresponding to the second zoom switching point (region d shown in the figure), the camera Cn+1 needs to be switched to a camera Cn+2 corresponding to the (n+1)th zoom ratio range.

To improve user experience, this application provides a camera Cn+2 that has larger zoom ratio coverage, where a maximum field of view corresponding to the camera is, for example, a region d in the figure. In this way, when zooming from the (n+1)th zoom ratio range to the (n+2)th zoom ratio range, before the second zoom switching point is reached, the camera Cn+2 is started and run in the background, so that a field of view corresponding to the camera Cn+2 is gradually narrowed from the region d.

In this way, in the zoom process, when the range is not narrowed to a region e, synchronization processing is performed on the camera Cn+1 and the camera Cn+2 to keep parameters of the two cameras consistent. Then when reaching the region d, the camera Cn+2 is switched from the background running state to the foreground display state. Therefore, the camera Cn+2 makes preparations in advance to narrow the range to the region d simultaneously with the camera Cn+1. Therefore, when the region d is reached, the switching can be smoother, and the user can hardly perceive any change, thereby effectively improving user experience.

If the zoom process includes more zoom switching points, for switching of the camera, the camera is started in advance and runs in the background as described above to implement relay zooming, so that overall zoom ratio coverage of the electronic device is wider and that the switching is smoother.

It should also be understood that, according to the description of the foregoing Embodiments 1 to 5, it can be learned that in the methods for image or video shooting provided in the embodiments of this application, one or two cameras need to be invoked to obtain raw images for different zoom ratio ranges when the photo mode is triggered. Generally, the electronic device uses one zoom ratio range division mode, that is, zoom ratio ranges corresponding to the photo mode and the photo preview are divided in the same mode. Based on this, in the photo mode, when the current zoom ratio falls within a zoom ratio range and a corresponding camera needs to obtain an image, the camera is a first target camera for obtaining an image in photo preview. In addition, when two corresponding cameras need to obtain images, to invoke the two cameras more quickly, in this application, one camera in photo preview is used as a first target camera and is in the foregoing display state, and the other camera in photo preview is used as an auxiliary camera and enters the background running state. Therefore, during photographing, a speed of obtaining a shot image is higher, and photographing experience of the user is better.

Herein, the first target camera corresponding to the $(N+1)^{th}$ zoom ratio range is another camera that needs to obtain an image when photographing is performed within the $N^{th}$ zoom ratio range.

In the multi-camera zoom switching method provided in this embodiment of this application, on a basis that a plurality of cameras implement relay zooming, in a case that two adjacent zoom ratio ranges correspond to different first target cameras, when zooming from a previous zoom ratio range to a subsequent zoom ratio range, a first target camera corresponding to the subsequent zoom ratio range is not switched from being closed to being started, but switched from the background running state to the foreground display state. Because the first target camera has been started in advance, there is no frame freezing during switching. In addition, because the two cameras are synchronized within the previous zoom ratio range, a preview image does not have problems such as an abrupt change or jitter during switching, and the switching is smoother.

In addition, in a case that two adjacent zoom ratio ranges correspond to a same first target camera, the first target camera corresponding to the previous zoom ratio range remains in the foreground display state, so that the camera does not perform close and start operations. In this way, a picture is not affected, and frame freezing does not occur.

Optionally, in photo preview, the method further includes:
when the first target camera corresponding to the $N^{th}$ zoom ratio range is the same as the first target camera corresponding to the $(N+1)^{th}$ zoom ratio range, when zooming within the $N^{th}$ zoom ratio range, a second target camera corresponding to the $N^{th}$ zoom ratio range remains in the background running state, where the second target camera corresponding to the $N^{th}$ zoom ratio range is different from the first target camera.

It should be understood that with regard to the $N^{th}$ zoom ratio range, when the first target camera corresponding to the $N^{th}$ zoom ratio range is the same as the first target camera corresponding to the $(N+1)^{th}$ zoom ratio range, during photographing within the $N^{th}$ zoom ratio range, if two corresponding cameras need to obtain images, a second target camera further needs to be set. A type and a quantity of second target cameras corresponding to the $N^{th}$ zoom ratio range may be set and changed based on a requirement. This is not limited in this embodiment of this application.

It should be understood that, to invoke the first target camera and the second target camera more quickly during photographing within the $N^{th}$ zoom ratio range, in this application, in photo preview, the second target camera starts to be invoked when zooming within the $N^{th}$ zoom ratio range, so that the second target camera is in the background running state. Therefore, when the user triggers a shooting button 50 to perform photographing, a response speed of obtaining a shot image is higher, and photographing experience of the user is better.

Optionally, in a possible implementation, the current zoom ratio is determined when zooming is performed in the photo preview process. Assuming that zooming from small to large is performed, when the current zoom ratio falls within the $N^{th}$ zoom ratio range, at the time of zooming to the minimum zoom ratio of the $N^{th}$ zoom ratio range, it is determined whether the first target camera corresponding to the $N^{th}$ zoom ratio range is the same as the first target camera corresponding to the $(N+1)^{th}$ zoom ratio range; and if yes, when zooming to the minimum zoom ratio of the $N^{th}$ zoom ratio range, the second target camera corresponding to the $N^{th}$ zoom ratio range enters the background running state. Alternatively, when zooming to a preset zoom ratio of the $N^{th}$ zoom ratio range, the second target camera corresponding to the $N^{th}$ zoom ratio range starts to be invoked for background running.

Optionally, in another possible implementation, when zooming is performed in photo preview, first, the current zoom ratio is determined, and then the current zoom ratio range within which the current zoom ratio falls is determined based on the current zoom ratio, for example, is the $m^{th}$ zoom ratio range; then the maximum value and the minimum value of the current zoom ratio range are respectively determined, and the absolute value of the difference between the maximum value and the current zoom ratio is determined as the first difference; and the absolute value of the difference between the minimum value and the current zoom ratio is determined as the second difference.

If the first difference is smaller than the second difference, it indicates that the current zoom ratio is close to the maximum value of the current zoom ratio range. Therefore, a switching condition may be set as: when it is calculated that the first difference is less than the second difference, determining whether the first target camera corresponding to the current zoom ratio range is the same as the first target camera corresponding to the $(m+1)^{th}$ zoom ratio range, and if yes, starting a second target camera corresponding to the $m^{th}$ zoom ratio range for background running. If the first difference is greater than the second difference, it indicates that the current zoom ratio is close to the minimum value of the current zoom ratio range. Therefore, a switching condition may be set as: when it is calculated that the first difference is greater than the second difference, determining whether the first target camera corresponding to the current zoom ratio range is the same as the first target camera corresponding to the $(m-1)^{th}$ zoom ratio range, and if yes, starting the second target camera corresponding to the $m^{th}$ zoom ratio range for background running.

Optionally, the zoom ratio included in the $N^{th}$ zoom ratio range is less than the zoom ratio included in the $(N+1)^{th}$ zoom ratio range; or the zoom ratio included in the $N^{th}$ zoom ratio range is greater than the zoom ratio included in the $(N+1)^{th}$ zoom ratio range.

The zoom ratio included in the $N^{th}$ zoom ratio range is less than the zoom ratio included in the $(N+1)^{th}$ zoom ratio range. In other words, as N increases, the zoom ratio increases. The zoom ratio included in the $N^{th}$ zoom ratio range is greater than the zoom ratio included in the $(N+1)^{th}$ zoom ratio range. In other words, as N increases, the zoom ratio decreases.

Therefore, when the zoom ratio is increased or decreased, before zooming switching to a target zoom ratio range, the first target camera corresponding to the target zoom ratio range can be started in advance and run in the background, so that during zooming switching, the first target camera only needs to change from the background running state to the foreground display state. The change is relatively small, and the switching is smoother.

The multi-camera zooming method provided in this application is described in detail with reference to specific embodiments.

For example, the zoom ratio range corresponding to the electronic device is set to [0.5, 100]. The zoom ratio range is divided into four zoom ratio ranges, and a value of N is 1 to 4, that is, the four zoom ratio ranges are a first zoom ratio range, a second zoom ratio range, a third zoom ratio range, and a fourth zoom ratio range respectively, and zoom ratios included in the four zoom ratio ranges increase sequentially.

For example, it is assumed that the first zoom ratio range F1 is set to [0.5, 1), and the second zoom ratio range F2 is set to [1, 2), and the third zoom ratio range F3 is set to [2, 3.x), and the fourth zoom ratio range F4 is set to [3.x, 100]. It should be understood that herein each number is only an example, and may be set and changed based on a requirement. This is not limited in this embodiment of this application.

For example, a zoom ratio range of the wide-angle camera 1933 is [0.5, 1.2], a zoom ratio range of the main camera 1931 is [0.5, 10], a zoom ratio range of the black and white camera 1932 is [0.9, 2.1], and a zoom ratio range of the long-focus camera 1934 is [2, 100].

Based on this, the first target camera corresponding to the first zoom ratio range is set as the wide-angle camera 1933, the first target camera corresponding to the second zoom ratio range and the first target camera corresponding to the third zoom ratio range are both the main camera 1931, the second target camera corresponding to the second zoom ratio range is the black and white camera 1932, and the first target camera corresponding to the fourth zoom ratio range is the long-focus camera 1934.

Figure 19:
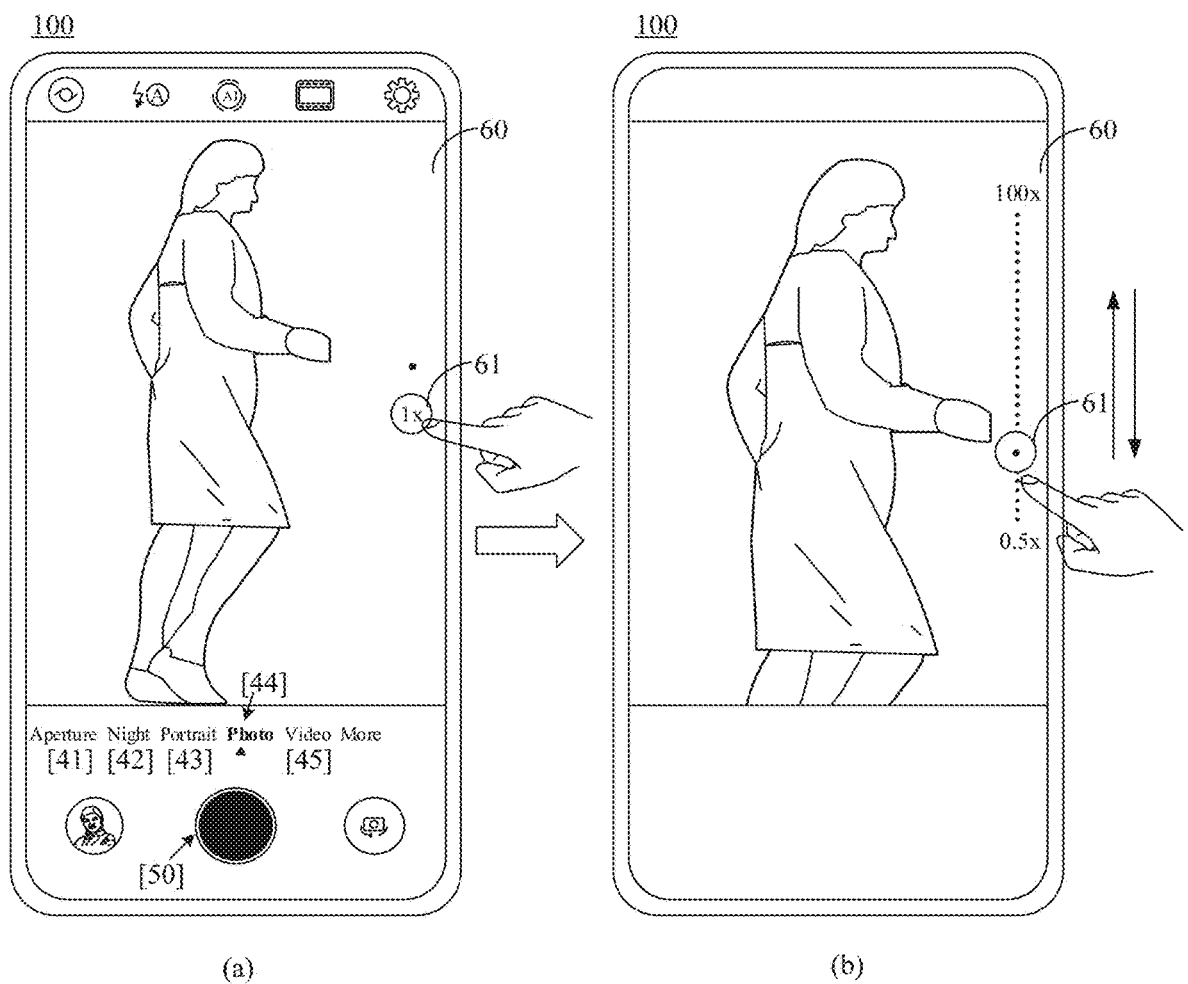
FIG. 19 is a schematic diagram of a zoom screen in photo preview, according to an embodiment of this application.
Figure 20:
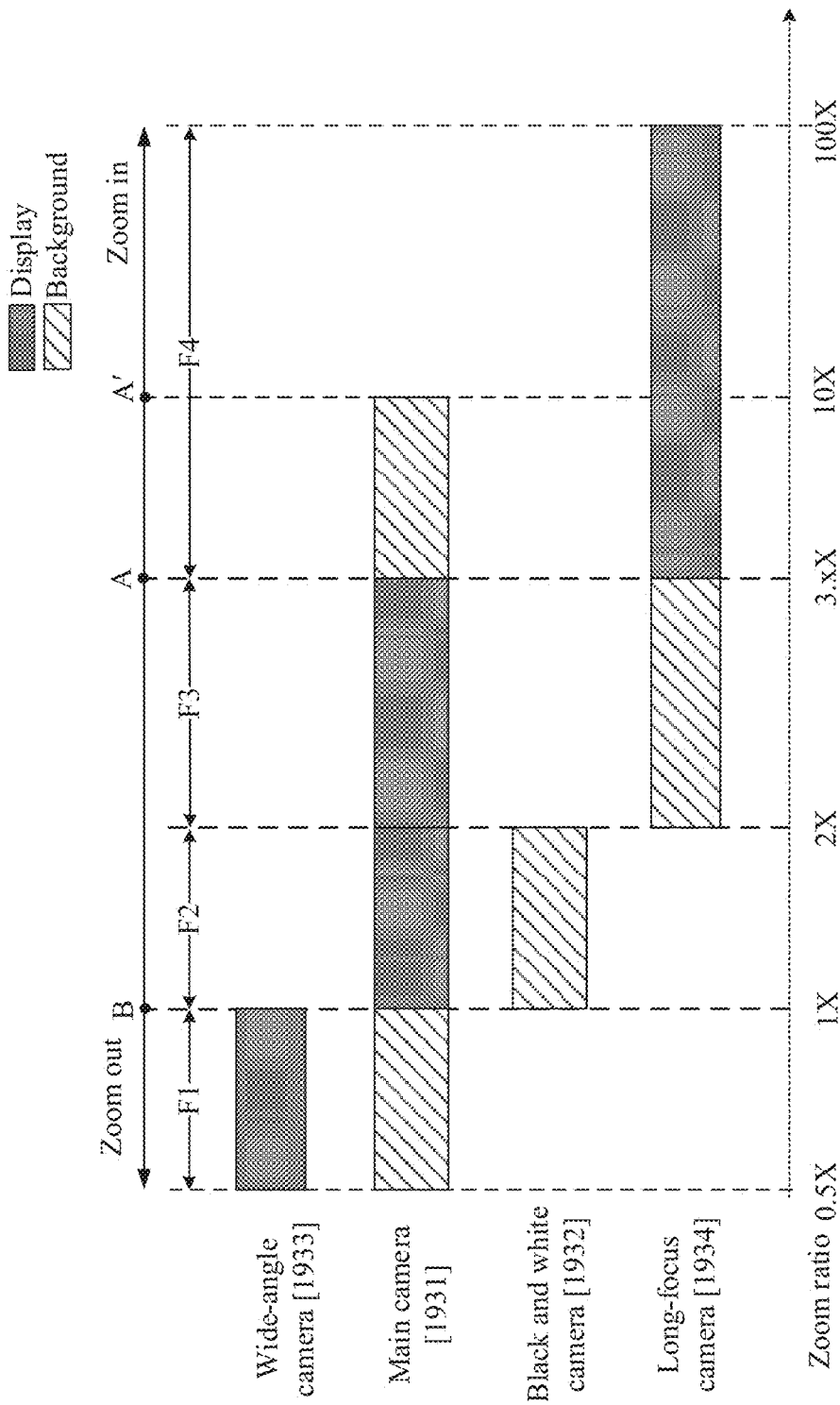
FIG. 20 and FIG. 21 are schematic diagrams of a multi-camera zoom process in photo preview, according to an embodiment of this application.
Figure 21:
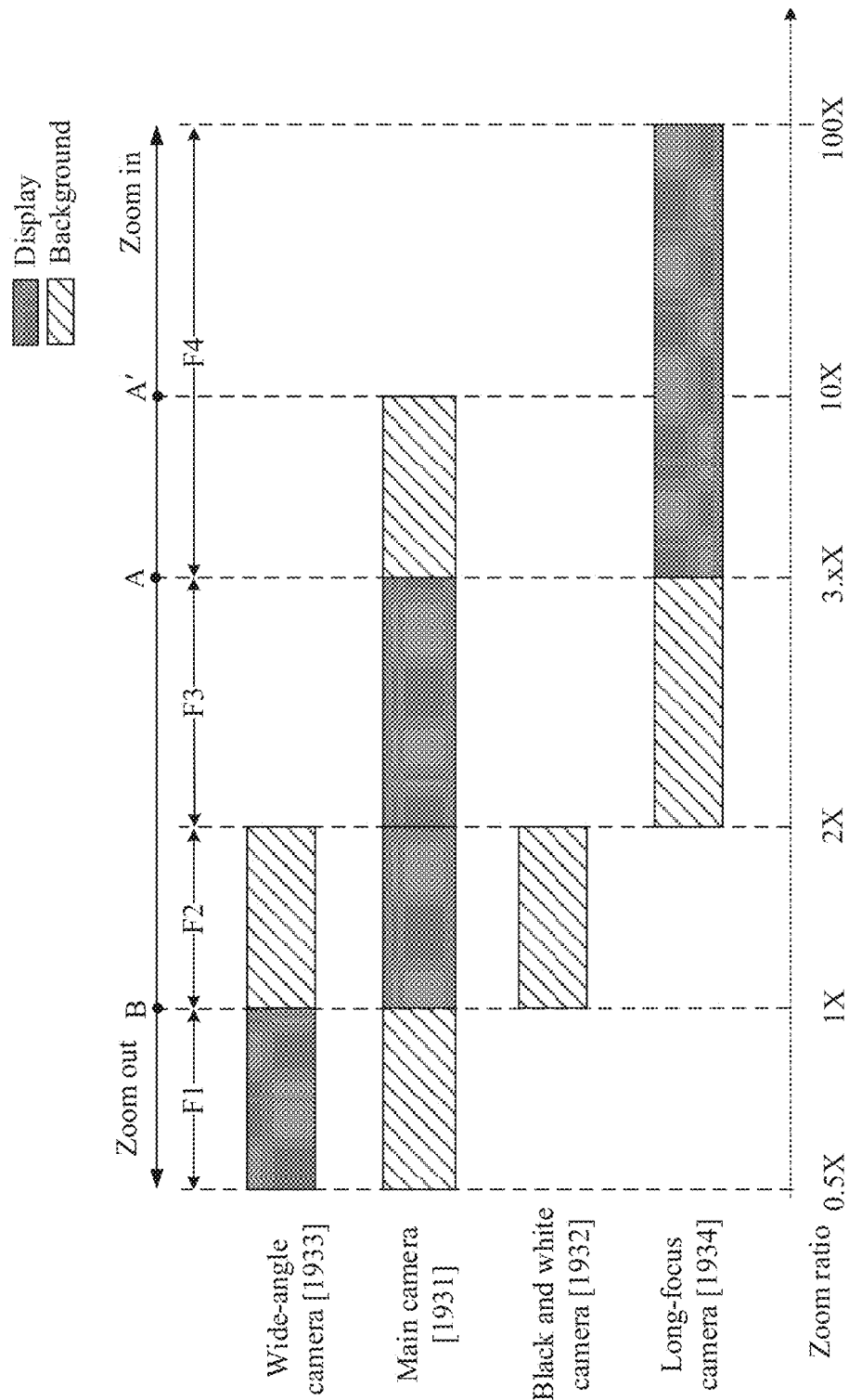

FIG. 19 is a schematic diagram of a zoom screen in photo preview according to an embodiment of this application. FIG. 20 and FIG. 21 are schematic diagrams of a multi-camera zoom process in photo preview according to an embodiment of this application.

For example, in response to a touch operation of a user, when an electronic device 100 runs a camera application, the electronic device 100 displays a shooting screen shown in FIG. 19(a). On the shooting screen, a shooting button 50 indicates that a current shooting mode is a photo mode. The shooting screen further includes a viewfinder window 60, and the viewfinder window 60 may be used to display a preview image in real time before photographing. In addition, the shooting screen further displays a zoom option 61. The user may select a current zoom ratio in the zoom option 61 for photographing, for example, 0.5×, 2×, or 50×. As shown in FIG. 19(b), in response to the zooming operation of the user, the preview image may be zoomed in or zoomed out based on the currently selected zoom ratio.

It should be understood that the zoom option 61 displayed in the preview image may be in a list style in response to the operation of the user, or may be in styles such as a sliding rod and a disc, so that the user makes an adjustment. FIG. 19 described above is only an example. This is not limited in this application.

To implement a multi-camera zooming method (spatial alignment transform, SAT), and not only implement relay zooming, but also start in advance and run a camera corresponding to a target zoom ratio range in a background before zooming switching to the target zoom ratio range, this application further provides the following embodiment.

Embodiment 7: A multi-camera zooming method is provided, and the method includes the following steps.

As shown in FIG. 20, when performing photo preview and zooming from small to large, when zooming within a first zoom ratio range F1, a wide-angle camera 1933 corresponding to the first zoom ratio range is in a foreground display state, and sends an obtained image to a display for displaying; and a main camera 1931 corresponding to a second zoom ratio range F2 has started a background running state at a minimum zoom ratio of the first zoom ratio range F1. At this stage, the main camera 1931 is an auxiliary camera.

During zooming from the first zoom ratio range F1 to the second zoom ratio range F2, 1× is a first zoom switching point. When zooming to the first zooming switching point, the main camera 1931 corresponding to the second zoom ratio range F2 performs relay zooming, switches from the background running state to the foreground display state, and sends an obtained image to the display for displaying; and the wide-angle camera 1933 corresponding to the first zoom ratio range F1 switches from the foreground display state to a closed state. In addition, because the second zoom ratio range corresponds to a second target camera, the second target camera enters the background running state from the first zoom switching point.

When zooming within the second zoom ratio range F2, the main camera 1931 is in the foreground display state, and sends an obtained image to the display for displaying, and the black and white camera 1932 is in the background running state. At this stage, the black and white camera 1932 is an auxiliary camera.

When zooming from the second zoom ratio range F2 to a third zoom ratio range F3, because a first target camera corresponding to the third zoom ratio range F3 is still the main camera 1931, the main camera 1931 does not need to perform switching, and the main camera 1931 can remain in the foreground display state. Herein, the black and white camera 1932 switches from the background running state to the closed state.

When zooming within the third zoom ratio range F3, the main camera 1931 is in the foreground display state, and sends an obtained image to the display for displaying, and a long-focus camera 1934 corresponding to a fourth zoom ratio range F4 has started the background running state at a minimum zoom ratio of the third zoom ratio range F3. At this stage, the long-focus camera 1934 is an auxiliary camera.

During zooming from the third zoom ratio range F3 to the fourth zoom ratio range F4, 3.x×X is a second zoom switching point. When zooming to the second zoom switching point, the long-focus camera 1934 corresponding to the fourth zoom ratio range F4 performs relay zooming, switches from the background running state to the foreground display state, and sends an obtained image to the display for displaying. In addition, the main camera 1931 corresponding to the third zoom ratio range F3 switches from the foreground display state to the background running state or to the closed state (not shown in the figure).

Herein, it should be understood that, due to a limited focal length of the main camera 1931, after switching to the background running state, the main camera 1931 may not be applicable as the zoom ratio continues to increase. Therefore, for example, the main camera 1931 switches from the background running state to the closed state when zooming to 10× within the fourth zoom ratio range. When zooming between the second zoom switching point and 10×, the main camera 1931 is an auxiliary camera.

Embodiment 8: A multi-camera zooming method is provided, and the method includes the following steps.

As shown in FIG. 20, when performing photo preview and zooming from large to small, when zooming within a fourth zoom ratio range F4, a long-focus camera 1934 corresponding to the fourth zoom ratio range F4 is in a foreground display state, and sends an obtained image to a display for displaying. In addition, a main camera 1931 corresponding to a third zoom ratio range F3 is in a background running state.

Herein, it should be understood that because a focal length of the main camera 1931 is limited, the main camera 1931 cannot be applied when a zoom ratio is relatively large. Therefore, for example, the main camera 1931 switches from a closed state to the background running state only when zooming to 10× within the fourth zoom ratio range. When zooming between 10× and a first zoom switching point, the main camera 1931 is an auxiliary camera.

During zooming from the fourth zoom ratio range F4 to the third zoom ratio range F3, 3.x×X is the first zoom switching point. When zooming to the first zoom switching point, the main camera 1931 corresponding to the third zoom ratio range F3 performs relay zooming, switches from the background running state to the foreground display state, and sends an obtained image to the display for displaying. In addition, the long-focus camera 1934 corresponding to the fourth zoom ratio range F4 switches from the foreground display state to the background running state.

When zooming within the third zoom ratio range F3, the main camera 1931 is in the foreground display state, and sends an obtained image to the display for displaying, and the long-focus camera 1934 corresponding to the fourth zoom ratio range F4 switches from the background running state to the closed state at a preset zoom ratio of the third zoom ratio range F3, for example, at 2×. At this stage, the long-focus camera 1934 is an auxiliary camera.

When zooming from the third zoom ratio range F3 to a second zoom ratio range F2, because a first target camera corresponding to the second zoom ratio range F2 is still the main camera 1931, the main camera 1931 does not need to perform switching, and the main camera 1931 can remain in the foreground display state. Herein, a black and white camera 1932 switches from the closed state to the background running state.

When zooming within the second zoom ratio range, the main camera 1931 is in the foreground display state, and sends an obtained image to the display for displaying, and the black and white camera 1932 is in the background running state. At this stage, the black and white camera 1932 is an auxiliary camera.

During zooming from the second zoom ratio range F2 to a first zoom ratio range F1, 1× is a second zoom switching point. When zooming to the second zoom switching point, a wide-angle camera 1933 corresponding to the first zoom ratio range F1 performs relay zooming, switches from the closed state to the foreground display state, and sends an obtained image to the display for displaying; and the main camera 1931 corresponding to the second zoom ratio range switches from the foreground display state to the background running state. In addition, a second target camera corresponding to the second zoom ratio range, that is, the black and white camera 1932, switches from the background running state to the closed state at the second zoom switching point.

When zooming within the first zoom ratio range F1, the wide-angle camera 1933 corresponding to the first zoom ratio range F1 is in the foreground display state, and sends an obtained image to the display for displaying; and the main camera 1931 corresponding to the second zoom ratio range F2 is in the background running state. At this stage, the main camera 1931 is an auxiliary camera.

Herein, it should be noted that, because the electronic device 100 usually allows two cameras to run at the same time, when zooming from the second zoom ratio range F2 to the first zoom ratio range F1, because the first target camera and the second target camera corresponding to the second zoom ratio range F2, that is, the main camera 1931 and the black and white camera 1932, are already running, the wide-angle camera 1933 corresponding to the first zoom ratio range F1 cannot enter the background running state, but is only in the closed state.

Based on this, optionally, as shown in FIG. 21, when the electronic device 100 allows three cameras to run at the same time, when zooming from the second zoom ratio range F2 to the first zoom ratio range F1, when zooming to the second zoom ratio range, and zooming to the second zoom switching point, the wide-angle camera 1933 corresponding to the first zoom ratio range F1 performs relay zooming, switches from the background running state to the foreground display state, and sends an obtained image to the display for displaying. Herein, the wide-angle camera 1933 can switch from the closed state to the background running state from a maximum value of the second zoom ratio range, that is, 2×. Alternatively, the wide-angle camera 1933 can switch from the closed state to the background running state from a preset zoom ratio within the second zoom ratio range.

To implement a multi-camera zooming method, and not only implement relay zooming, but also start in advance and run a camera corresponding to a target zoom ratio range in a background before zooming switching to the target zoom ratio range, this application further provides the following embodiment.

Figure 22:
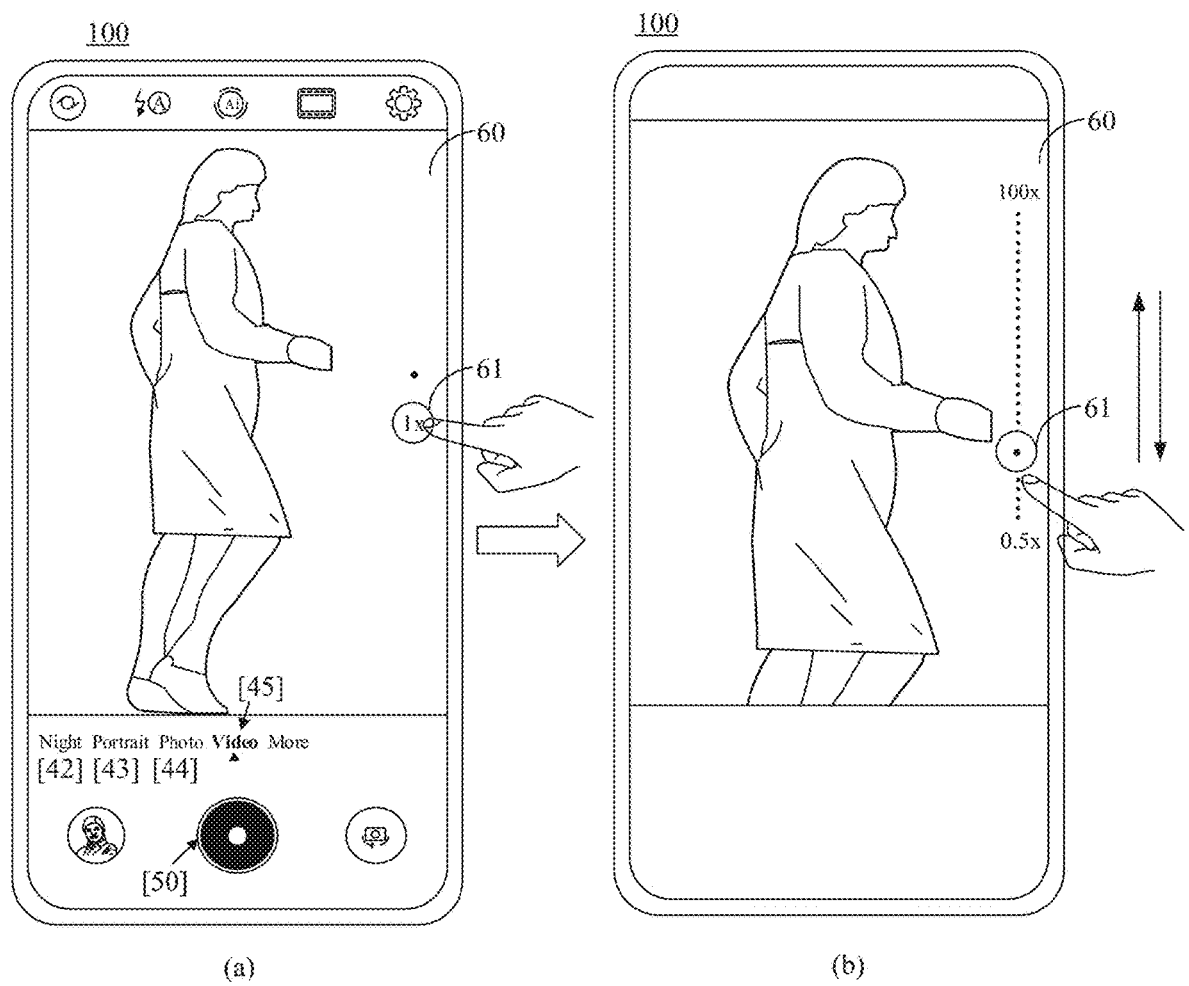
FIG. 22 is a schematic diagram of a zoom screen in video preview or video shooting, according to an embodiment of this application.
Figure 23:
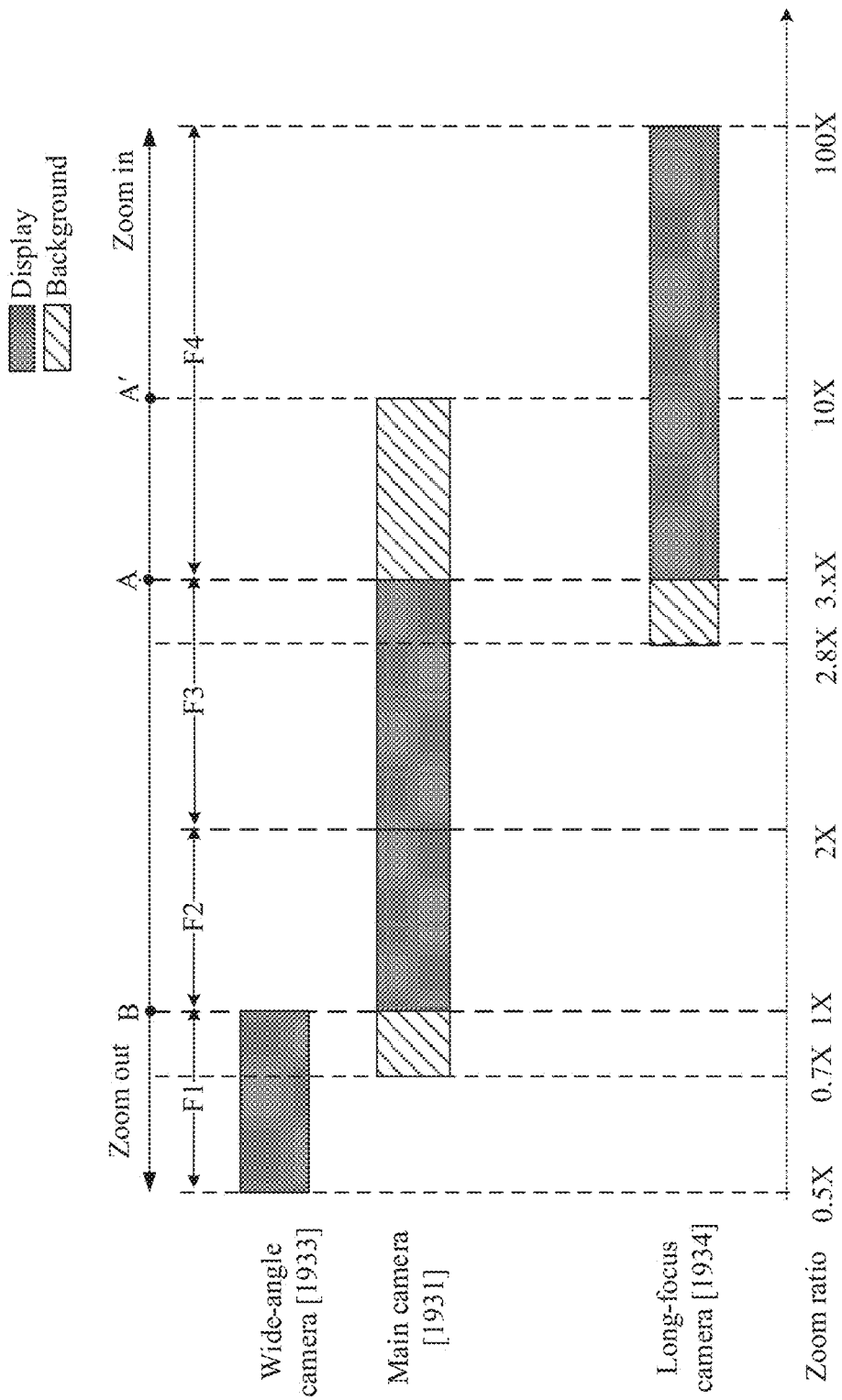
FIG. 23 and FIG. 24 are schematic diagrams of a multi-camera zoom process in video preview or video shooting, according to an embodiment of this application.
Figure 24:
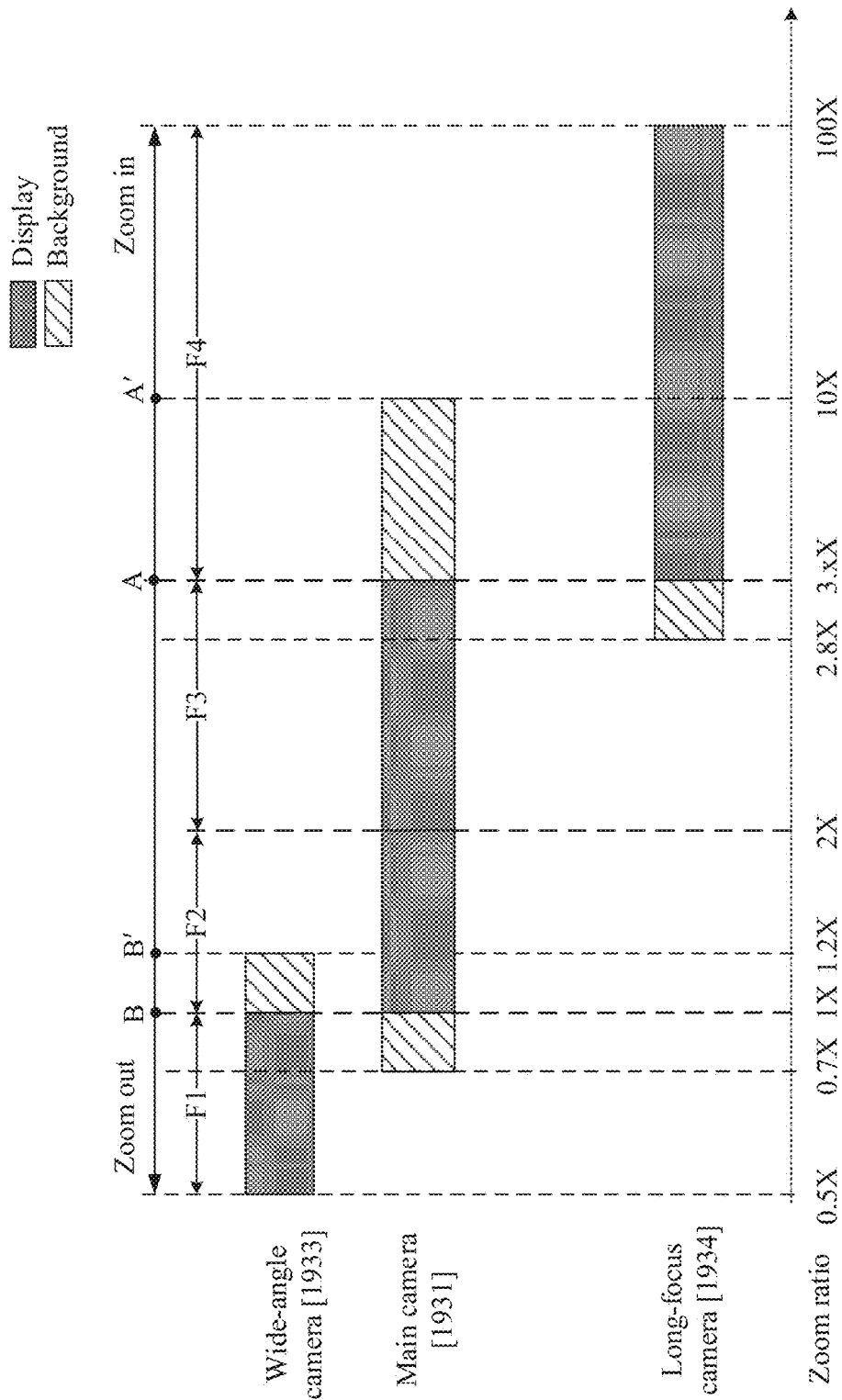

FIG. 22 is a schematic diagram of a zoom screen in video preview or video shooting according to an embodiment of this application. FIG. 23 and FIG. 24 are schematic diagrams of a multi-camera zoom process in video preview or video shooting according to an embodiment of this application.

For example, in response to a touch operation of a user, when an electronic device 100 runs a camera application, the electronic device 100 displays a shooting screen shown in FIG. 22(*a*). On the shooting screen, a shooting button 50 indicates that a current shooting mode is a video mode. The shooting screen further includes a viewfinder window 60, and the viewfinder window 60 may be used to display a preview image in real time before video shooting or display a video picture during video shooting. In addition, a zoom option 61 is also displayed in the preview image or the video picture. The user may select a current zoom ratio in the zoom option 61 for video shooting, for example, 0.5×, 2×, or, 50×. As shown in FIG. 22(*b*), in response to a zooming operation of the user, the preview image or the video picture can be zoomed in or zoomed out based on the currently selected zoom ratio.

With reference to the above, for the foregoing multi-camera zooming method, this application provides the following embodiment.

Embodiment 9: A multi-camera zooming method is provided, and the method includes the following steps.

As shown in FIG. 23, when performing video preview or video shooting and zooming from small to large, when zooming within a first zoom ratio range F1, a wide-angle camera 1933 corresponding to the first zoom ratio range is in a foreground display state, and sends an obtained image to a display for displaying; and a main camera 1931 corresponding to a second zoom ratio range F2 is started in advance at a preset zoom ratio within the first zoom ratio range F1. For example, the main camera 1931 switches from ta closed state to a background running state at 0.7×. When zooming between 0.7× and a first zoom switching point, the main camera 1931 is an auxiliary camera.

During zooming from the first zoom ratio range F1 to the second zoom ratio range F2, 1× is the first zoom switching point. When zooming to the first zoom switching point, the main camera 1931 corresponding to the second zoom ratio range F2 performs relay zooming, switches from the background running state to the foreground display state, and sends an obtained image to the display for displaying. In addition, the wide-angle camera 1933 corresponding to the first zoom ratio range F1 switches from the foreground display state to the closed state.

When zooming within the second zoom ratio range F2, the main camera 1931 is in the foreground display state, and sends an obtained image to the display for displaying.

When zooming from the second zoom ratio range F2 to a third zoom ratio range F3, because a first target camera corresponding to the third zoom ratio range F3 is still the main camera 1931, the main camera 1931 does not need to perform switching, and the main camera 1931 can remain in the foreground display state.

When zooming within the third zoom ratio range F3, the main camera 1931 is in the foreground display state, and sends an obtained image to the display for displaying, and a long-focus camera 1934 corresponding to a fourth zoom ratio range F4 is started in advance at a preset zoom ratio range within the third zoom ratio range F3. For example, the long-focus camera 1934 switches from the closed state to the background running state at 2.8×. When zooming between 2.8× and a second zoom switching point, the long-focus camera 1934 is an auxiliary camera.

During zooming from the third zoom ratio range F3 to the fourth zoom ratio range F4, 3.x× is the second zoom switching point. When zooming to the second zoom switching point, the long-focus camera 1934 corresponding to the fourth zoom ratio range F4 performs relay zooming, switches from the background running state to the foreground display state, and sends an obtained image to the display for displaying. In addition, the main camera 1931 corresponding to the third zoom ratio range F3 switches from the foreground display state to the background running state or to the closed state (not shown in the figure).

Herein, it should be understood that, due to a limited focal length of the main camera 1931, after switching to the background running state, the main camera 1931 may not be applicable as the zoom ratio continues to increase. Therefore, for example, the main camera 1931 switches from the background running state to the closed state when zooming to 10× within the fourth zoom ratio range. When zooming between the second zoom switching point and 10×, the main camera 1931 is an auxiliary camera.

Embodiment 10: A multi-camera zooming method is provided, and the method includes the following steps.

As shown in FIG. 23, when performing video preview or video shooting and zooming from large to small, when zooming within a fourth zoom ratio range F4, a long-focus camera 1934 corresponding to the fourth zoom ratio range F4 is in a foreground display state, and sends an obtained image to a display for displaying. In addition, a main camera 1931 corresponding to a third zoom ratio range F3 is in a background running state.

Herein, it should be understood that because a focal length of the main camera 1931 is limited, the main camera 1931 cannot be applied when a zoom ratio is relatively large. Therefore, for example, the main camera 1931 switches from a closed state to the background running state only when zooming to 10× within the fourth zoom ratio range. When zooming between 10× and a first zoom switching point, the main camera 1931 is an auxiliary camera.

During zooming from the fourth zoom ratio range F4 to the third zoom ratio range F3, 3.x× is the first zoom switching point. When zooming to the first zoom switching point, the main camera 1931 corresponding to the third zoom ratio range F3 performs relay zooming, switches from the background running state to the foreground display state, and sends an obtained image to the display for displaying. In addition, the long-focus camera 1934 corresponding to the fourth zoom ratio range F4 switches from the foreground display state to the background running state.

When zooming within the third zoom ratio range F3, the main camera 1931 is in the foreground display state, and sends an obtained image to the display for displaying, and the long-focus camera 1934 corresponding to the fourth zoom ratio range F4 switches from the background running state to the closed state at a preset zoom ratio of the third zoom ratio range F3, for example, 2.8×. When zooming between the first zoom switching point and 2.8×, the long-focus camera 1934 is an auxiliary camera.

When zooming from the third zoom ratio range F3 to a second zoom ratio range F2, because a first target camera corresponding to the second zoom ratio range F2 is still the main camera 1931, the main camera 1931 does not need to perform switching, and the main camera 1931 can remain in the foreground display state.

When zooming within the second zoom ratio range, the main camera 1931 is in the foreground display state, and sends an obtained image to the display for displaying.

During zooming from the second zoom ratio range F2 to a first zoom ratio range F1, 1× is a second zoom switching point. When zooming to the second zoom switching point, a wide-angle camera 1933 corresponding to the first zoom ratio range F1 performs relay zooming, switches from the closed state to the foreground display state, and sends an obtained image to the display for displaying. In addition, the main camera 1931 corresponding to the second zoom ratio range switches from the foreground display state to the background running state.

When zooming within the first zoom ratio range F1, the wide-angle camera 1933 corresponding to the first zoom ratio range F1 is in the foreground display state, and sends an obtained image to the display for displaying; and the main camera 1931 corresponding to the second zoom ratio range F2 is in the background running state. Based on this, the main camera 1931 corresponding to the second zoom ratio range F2 switches from the background running state to the closed state at a preset zoom ratio within the first zoom ratio range F1, for example, at 0.7×. When zooming between the second zoom switching point and 0.7×, the main camera 1931 is an auxiliary camera.

Based on this, as shown in FIG. 24, during video preview or video shooting and zooming from small to large, and zooming from the first zoom ratio range F1 to the second zoom ratio range F2, 1× is the first zoom switching point. When zooming to the first zoom switching point, the main camera 1931 corresponding to the second zoom ratio range F2 performs relay zooming, switches from the background running state to the foreground display state, and sends an obtained image to the display for displaying. In addition, the wide-angle camera 1933 corresponding to the first zoom ratio range F1 switches from the foreground display state to the background running state.

Herein, it should be understood that, due to a limited focal length of the wide-angle camera 1933, after switching to the background running state, the wide-angle camera 1933 may not be applicable as the zoom ratio continues to increase. Therefore, for example, the wide-angle camera 1933 switches from the background running state to the closed state when zooming to 1.2× within the second zoom ratio range. When zooming between the first zoom switching point and 1.2×, the wide-angle camera 1933 is an auxiliary camera.

Conversely, when zooming from large to small and zooming within the second zoom ratio range, the main camera 1931 is in the foreground display state, and sends an obtained image to the display for displaying. In addition, the wide-angle camera 1933 corresponding to the first zoom ratio range has started the background running state at a preset zoom ratio within the second zoom ratio range, for example, at 1.2×.

Then during zooming from the second zoom ratio range F2 to the first zoom ratio range F1, 1× is the second zoom switching point. When zooming to the second zoom switching point, the wide-angle camera 1933 corresponding to the first zoom ratio range F1 performs relay zooming, switches from the background running state to the foreground display state, and sends an obtained image to the display for displaying. In addition, the main camera 1931 corresponding to the second zoom ratio range switches from the foreground display state to the background running state. When zooming between 1.2× and the second zoom switching point, the wide-angle camera 1933 is an auxiliary camera.

The multi-camera zooming methods provided in the embodiments of this application have been described in detail above. The following describes the methods for image or video shooting in other modes provided in the embodiments of this application.

Figure 25:
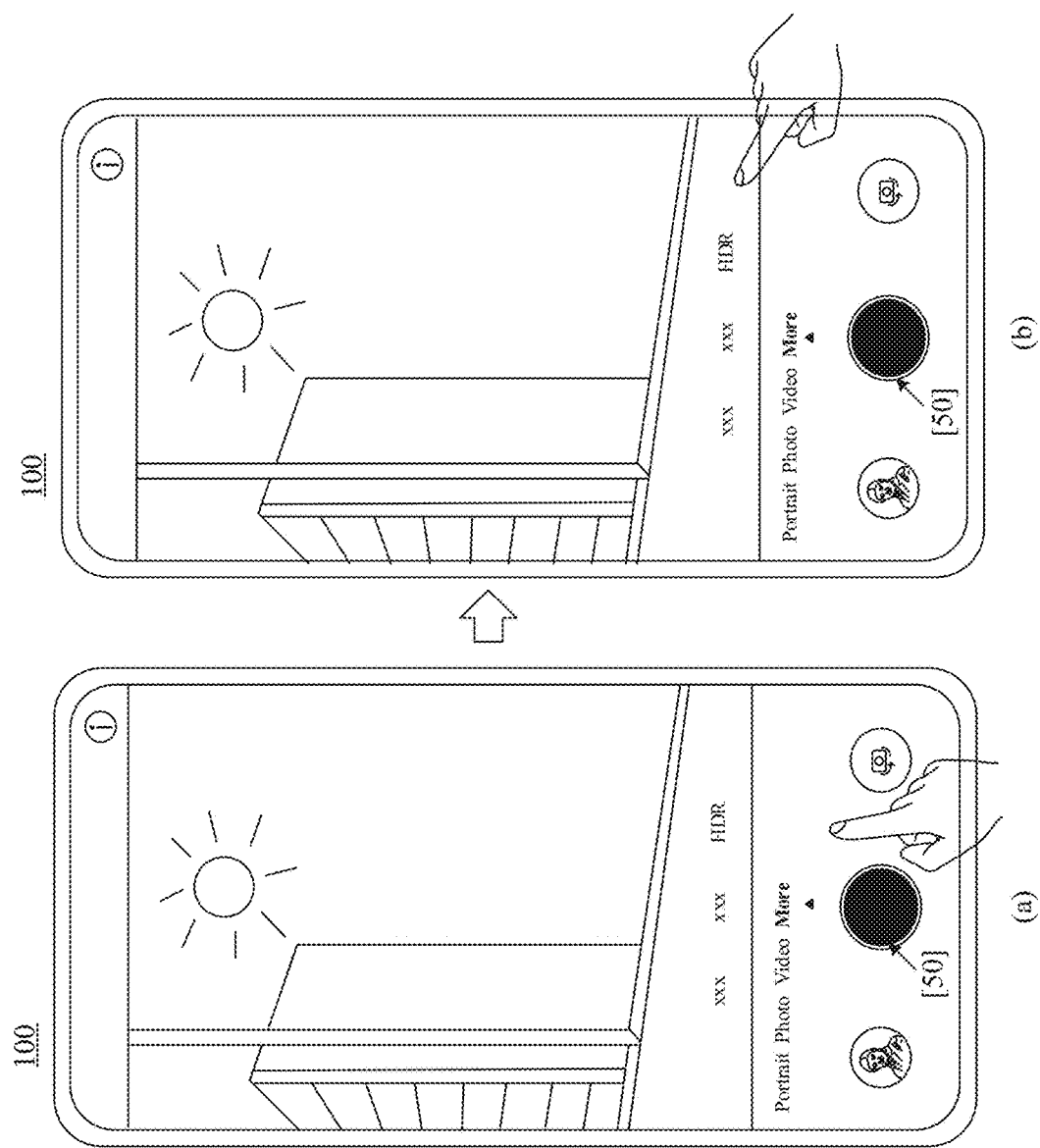
FIG. 25 is still another schematic diagram of a screen of an electronic device, according to an embodiment of this application.

FIG. 25 is still another schematic diagram of a screen of an electronic device according to an embodiment of this application.

For example, to shoot a sunny scene outside a window from a dark place in a room, in response to a slide operation of a user, the electronic device displays a shooting screen shown in FIG. 25(*a*), where a shooting button 50 indicates "more". Based on this, as shown in FIG. 25(*b*), in response to a tap operation of the user, a current shooting mode is switched to an HDR mode.

Certainly, the foregoing is only a manner of displaying options corresponding to the HDR mode on the interface of the electronic device. A specific manner may be set and changed based on a requirement. This is not limited in this embodiment of this application.

Figure 26:
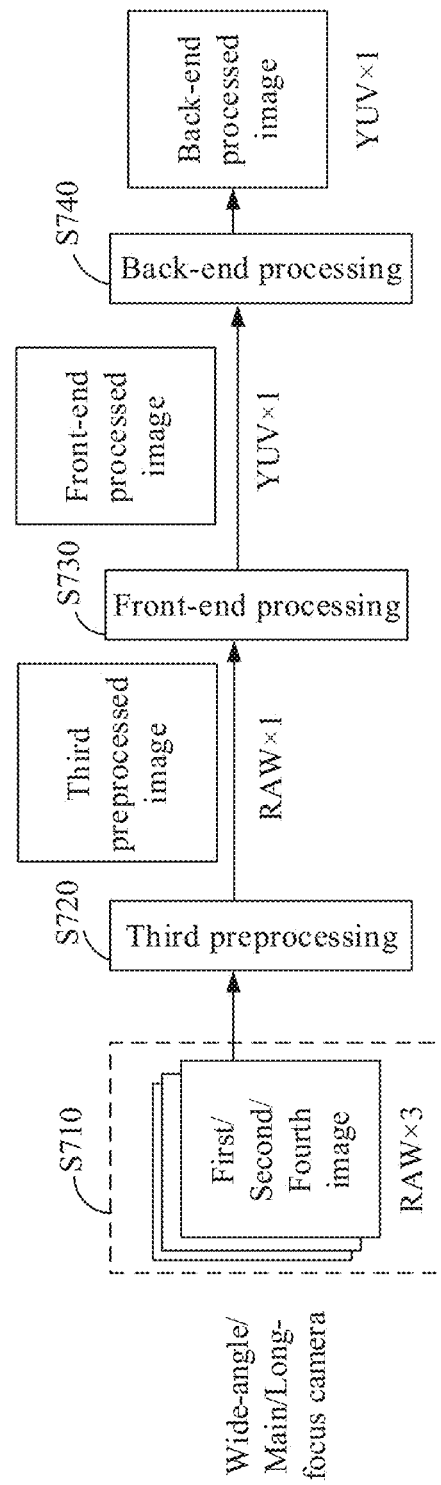
FIG. 26 is a schematic flowchart of a method for image or video shooting in an HDR mode, according to an embodiment of this application.

Embodiment 11: With reference to FIG. 25, FIG. 26 is a schematic flowchart of a method for image or video shooting in an HDR mode according to an embodiment of this application. As shown in FIG. 26, the method includes the following S710 to S740.

S710. Receive a first operation of a user, determine that a current shooting mode is an HDR mode, and first determine a current zoom ratio. Assuming that the current zoom ratio is 0.5×, the current zoom ratio falls within a first zoom ratio range [0.5, 1), and a target camera is a wide-angle camera 1933. For example, three frames of first images are obtained by using the wide-angle camera 1933.

In addition, if the current zoom ratio is 2.6×, the current zoom ratio falls within a third zoom ratio range [2, 3.x), and in low lightness, the target camera is a main camera 1931. For example, three frames of second images are obtained by using the main camera 1931.

If the current zoom ratio is 20×, the current zoom ratio falls within a fourth zoom ratio range [3.x, 100], and in low lightness, the target camera is a long-focus camera. For example, three frames of fourth images are obtained by using the long-focus camera.

Herein, quantities of first images, second images, and fourth images are only examples. Specific quantities may be obtained based on a requirement. This is not limited in this embodiment of this application.

The first image, the second image, and the fourth image are all located in a RAW region and are Bayer pattern images.

S720. Perform third preprocessing on the three frames of first images, the three frames of second images, or the three frames of fourth images, to obtain a corresponding third preprocessed image located in the RAW region.

The foregoing S720 may also be expressed as: performing third preprocessing on the three frames of first images to obtain the corresponding third preprocessed image located in the RAW region; performing third preprocessing on the three frames of second images to obtain the corresponding third preprocessed image located in the RAW region; and performing third preprocessing on the three frames of fourth images to obtain the corresponding third preprocessed image located in the RAW region.

The three frames of first images include a first image with a long exposure, a first image with a short exposure, and a first image with a moderate exposure; the three frames of second images include a second image with a long exposure, a second image with a short exposure, and a second image with a moderate exposure; and the three frames of fourth images include a fourth image with a long exposure, a fourth image with a short exposure, and a fourth image with a moderate exposure.

The third preprocessing provided in this embodiment of this application includes an HDR algorithm module. For example, the HDR algorithm module can fuse, based on long-short exposure fusion processing and a tone mapping (tone mapping) model, a plurality of frames of first images, second images, or fourth images with different exposure into one frame of third preprocessed image located in the RAW region.

For the description of the HDR algorithm module, refer to the foregoing description in S610. Details are not described herein again.

S730. Perform front-end processing on the third preprocessed image to obtain a corresponding front-end processed image.

For the description of the front-end processing, refer to the foregoing content in S120. Details are not described herein again.

For example, in this embodiment, to reduce an amount of data and save bandwidth, the front-end processing includes demosaic and color space conversion, so that after the front-end processing is performed on the third preprocessed image located in the RAW region and corresponding to the first images, the second images, or the fourth images, the obtained front-end processed image is located in a YUV region.

It should also be understood that the front-end processing provided in this embodiment may be the same as or different from the front-end processing in the foregoing embodiment, and may be specifically set and changed based on a requirement. This is not limited in this embodiment of this application.

S740. Perform back-end processing on the front-end processed image to obtain a corresponding back-end processed image, where the back-end processed image is a shot image.

For the description of the back-end processing, refer to the foregoing content in S140. Details are not described herein again.

It should be understood that the back-end processed image corresponding to the first images, the second images, or the fourth images is located in the YUV region.

It should be understood that the back-end processing provided in this embodiment may be the same as or different from the back-end processing in the foregoing embodiment, and may be specifically set and changed based on a requirement. This is not limited in this embodiment of this application.

In this implementation, in the HDR mode, fusion processing of the plurality of frames of images with different exposures and the foregoing other processing may be performed based on the plurality of frames of first images, second images, or fourth images by using the HDR algorithm module, to obtain a shot image with higher definition and better quality through fusion.

It should also be understood that the foregoing process is only an example, and that a specific order may be adjusted based on a requirement. Certainly, steps may be added or removed. This is not limited in this embodiment of this application.

Figure 27:
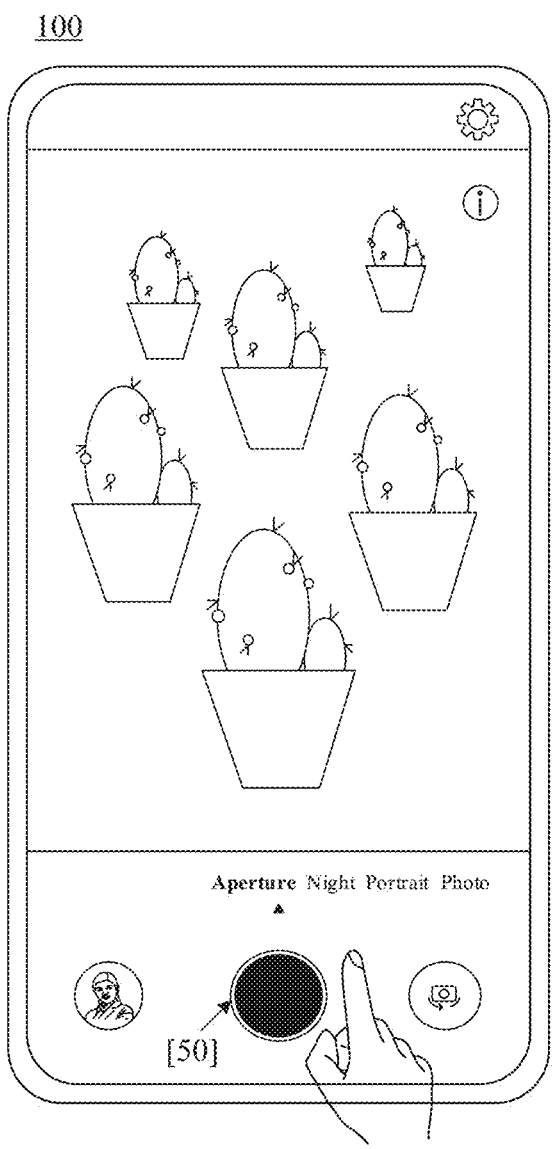
FIG. 27 is still another schematic diagram of a screen of an electronic device, according to an embodiment of this application.

FIG. 27 is still another schematic diagram of a screen of an electronic device according to an embodiment of this application.

For example, to focus on one of a plurality of cactuses during shooting, in response to a slide operation of a user, the electronic device displays a shooting screen shown in FIG. 27, where a shooting button 50 indicates that a current shooting mode is a wide aperture mode.

Certainly, the foregoing is only a manner of displaying options corresponding to the wide aperture mode on the interface of the electronic device. A specific manner may be set and changed based on a requirement. This is not limited in this embodiment of this application.

Figure 28:
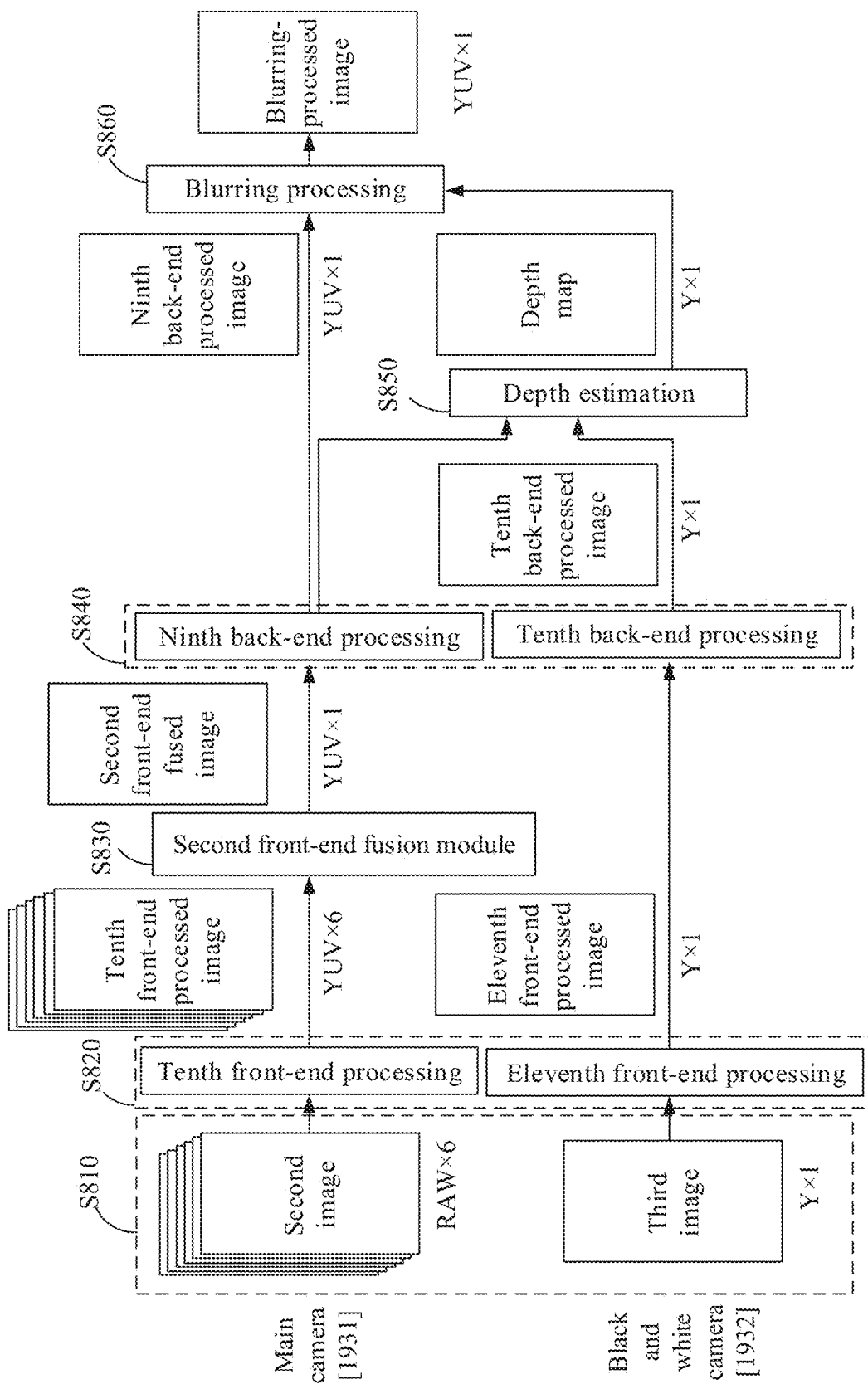
FIG. 28 is a schematic flowchart of a method for image or video shooting in a wide aperture mode, according to an embodiment of this application.

Embodiment 12: With reference to FIG. 27, FIG. 28 is a schematic flowchart of a method for image or video shooting in a wide aperture mode according to an embodiment of this application. As shown in FIG. 28, the method includes the following S810 to S860.

S810. Receive a first operation of a user, and determine that when a shooting mode is a wide aperture mode, a zoom ratio is applicable to 1× and above. Therefore, for example, six frames of second images are obtained by using a main camera 1931, and one frame of third image is obtained by using a black and white camera 1932, where the black and white camera 1932 is an auxiliary camera.

Herein, quantities of second images and third images are only examples. Specific quantities may be obtained based on a requirement. This is not limited in this embodiment of this application.

The second image is located in a RAW region, the second image is a Bayer pattern image, and the third image obtained by the black and white camera 1932 is a gray image.

It should be understood that a field of view corresponding to the second image is basically consistent with a field of view corresponding to the third image, and details of the third image are richer than details of the second image.

S820. Perform tenth front-end processing on the six frames of second images to obtain six corresponding frames of tenth front-end processed images; and perform eleventh front-end processing on the one frame of third image to obtain one corresponding frame of eleventh front-end processed image.

For the description of the tenth front-end processing and the eleventh front-end processing, refer to the foregoing content in S120. Details are not described herein again.

It should be understood that when the tenth front-end processing includes demosaic and color space conversion, after the tenth front-end processing is performed on the second image, the corresponding tenth front-end processed image is located in a YUV region. When the tenth front-end processing does not include demosaic and color space conversion, after the tenth front-end processing is performed on the second image, the corresponding tenth front-end processed image is still located in the RAW region.

For example, in this embodiment, to reduce an amount of data, save bandwidth, and increase a speed of subsequent processing, the tenth front-end processing performed on the second image includes demosaic and color space conversion, so that after the front-end processing is performed on the second image, the corresponding tenth front-end processed image is located in the YUV region.

It should be understood that for the third image, because the third image is a gray image (shown as a Y diagram in the figure), the eleventh front-end processing on the third image does not include demosaic and color space conversion. In this way, after the front-end processing is performed on the third image, the corresponding eleventh front-end processed image is still a gray image.

It should also be understood that in this embodiment, other processing steps than the demosaic and color space conversion in the tenth front-end processing and the eleventh front-end processing may be the same or different. This is not limited in this embodiment of this application. In addition, the tenth front-end processing and the eleventh front-end processing provided in this embodiment may be the same as or different from the front-end processing in the foregoing embodiment, and may be specifically set and changed based on a requirement. This is not limited in this embodiment of this application.

S830. Perform fusion on the six frames of tenth front-end processed images corresponding to the six frames of second images by using a second front-end fusion module, to obtain a second front-end fused image corresponding to the six frames of second images.

For example, the tenth front-end processing provided in this embodiment includes demosaic and color space conversion, and the six frames of tenth front-end processed images corresponding to the six frames of second images are located in the YUV region. In this case, the corresponding second front-end fusion module correspondingly includes a YUV region multi-frame fusion module to implement a YUV region multi-frame fusion function. Therefore, the second front-end fused image obtained through processing by the second front-end fusion module is still located in the YUV region. Therefore, the image in the subsequent processing can be located in the YUV region, the amount of data is reduced, and the bandwidth is saved.

It should be understood that the second front-end fusion module in this embodiment may be the same as or different from the first front-end fusion module, the second front-end fusion module, the third front-end fusion module, or the fourth front-end fusion module in the foregoing embodiment, and may be specifically set and changed based on a requirement. This is not limited in this embodiment of this application.

Certainly, the second front-end fusion module may further include other functional modules. For details, refer to the foregoing description of the first front-end fusion module or the second front-end fusion module in S130. Details are not described herein again.

Based on this, the plurality of frames of second images may include a second image with a long exposure, a second image with a short exposure, and a second image with a moderate exposure.

When the plurality of frames of second images include second images with different exposure, accordingly, tenth front-end processed images corresponding to the plurality of frames of second images include front-end processed images with different exposure. Based on this, after the second front-end fusion module performs fusion on the plurality of frames of tenth front-end processed images with different exposure, details of a dark region and an over-exposure region in the image can be increased, and a dynamic range can be improved, so that definition of the corresponding second front-end fused image can be improved.

S840. Perform ninth back-end processing on the second front-end fused image corresponding to the six frames of second images, to obtain a corresponding ninth back-end processed image; and perform tenth back-end processing on the front-end processed image corresponding to the third image, to obtain a corresponding tenth back-end processed image.

For the description of the ninth back-end processing and the tenth back-end processing, refer to the foregoing content in S140. Details are not described herein again.

It should be understood that the ninth back-end processed image corresponding to the second image is located in the YUV region, and the tenth back-end processed image corresponding to the third image is a gray image.

It should also be understood that in this embodiment, the ninth back-end processing may be the same as or different from the tenth back-end processing. In addition, the ninth back-end processing and the tenth back-end processing in this embodiment may be the same as or different from the back-end processing in the foregoing embodiment, and may be specifically set based on a requirement. This is not limited in this embodiment of this application.

S850. Perform depth estimation processing on the ninth back-end processed image corresponding to the six frames of second images and the tenth back-end processed image corresponding to the third image, to obtain a depth map.

It should be understood that the depth estimation processing refers to using a principle of binocular stereo vision to perform pixel matching on the ninth back-end processed image corresponding to the six frames of second images and the tenth back-end processed image corresponding to the one frame of third image, and then calculating depth information of each pixel based on a matching result, so that the depth map can be generated based on the depth information. The depth map is a gray image.

S860. Perform blurring processing on the ninth back-end processed image corresponding to the six frames of second images by using the depth map, to obtain a corresponding blurring-processed image. The blurring-processed image is a shot image.

It should be understood that the depth map can be used to assist in separating a foreground and a background in the ninth back-end processed image corresponding to the six frames of second images, and then perform blurring processing on the background or the foreground.

In this embodiment, in the wide aperture mode, after the foregoing series of processing based on the second image and the third image with different fields of view and different richness of details, a shot image with higher foreground definition and better quality can be obtained through fusion.

It should also be understood that the foregoing process is only an example, and that a specific order may be adjusted based on a requirement. Certainly, steps may be added or removed. This is not limited in this embodiment of this application.

An embodiment of this application further provides another schematic flowchart of a method for image or video shooting in a wide aperture mode according to an embodiment of this application. The method is applied to an electronic device 100 including a TOF camera 1935 in addition to the foregoing four cameras.

Figure 29:
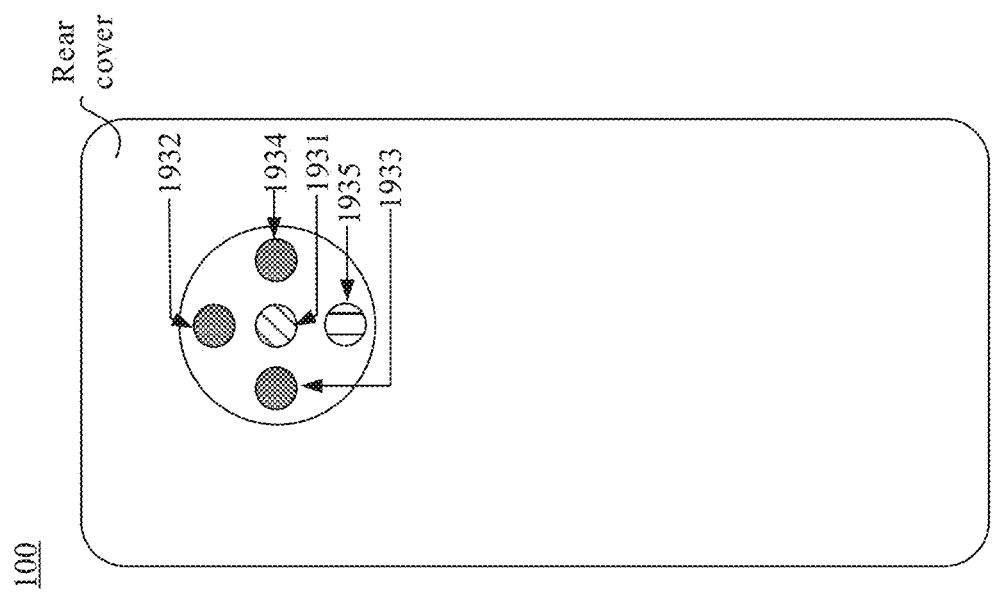
FIG. 29 is another schematic diagram of an arrangement of a plurality of cameras on a rear cover of an electronic device, according to an embodiment of this application.
Figure 29:
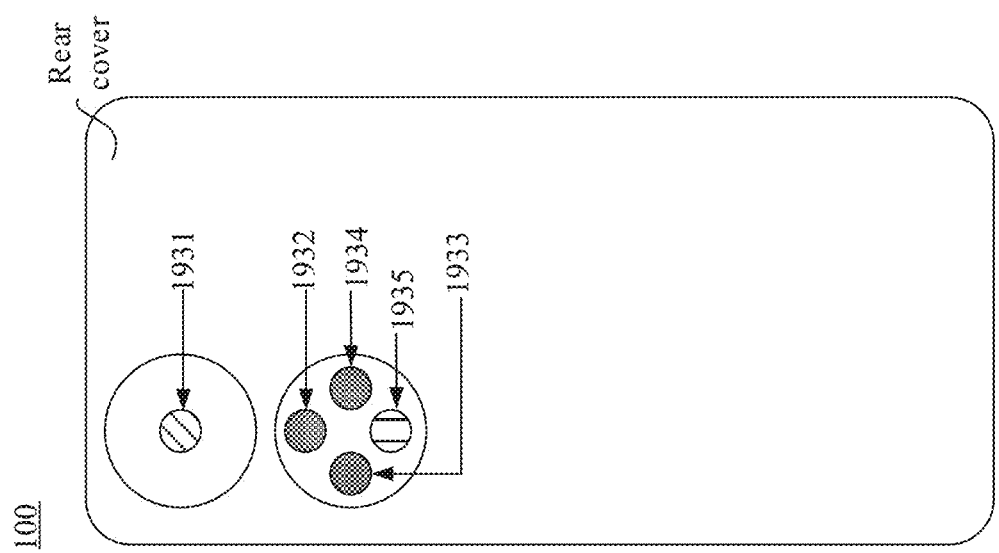

FIG. 29 is a schematic diagram of arrangements of the five cameras on a rear cover of the electronic device.

As shown in FIG. 29(*a*), the five cameras are arranged in an upper left corner of the rear cover of the electronic device 100. A main camera 1931, as a camera frequently used by a user, is separately distributed in a first circular area near an upper part of the rear cover. The four cameras, that is, a black and white camera 1932, a wide-angle camera 1933, a long-focus camera 1934, and the TOF camera 1935, are distributed in a second circular area near a lower part of the rear cover. In addition, a flashlight may also be disposed in the second circular area near the lower part of the rear cover.

As shown in FIG. 29(*b*), the five cameras are arranged in a circular area in the middle of the rear cover of the electronic device. The main camera 1931, as a camera frequently used by the user, is disposed at a central position of the circular area. The four cameras, that is, the black and white camera 1932, the wide-angle camera 1933, the long-focus camera 1934, and the TOF camera 1935, are distributed around the main camera 1931. In addition, in this circular area, a flashlight may also be disposed.

It should be understood that the foregoing two arrangements are only examples. Alternatively, the arrangements may be other arrangements. A specific arrangement may be designed and changed based on a requirement. This is not limited in this embodiment of this application.

Figure 30:
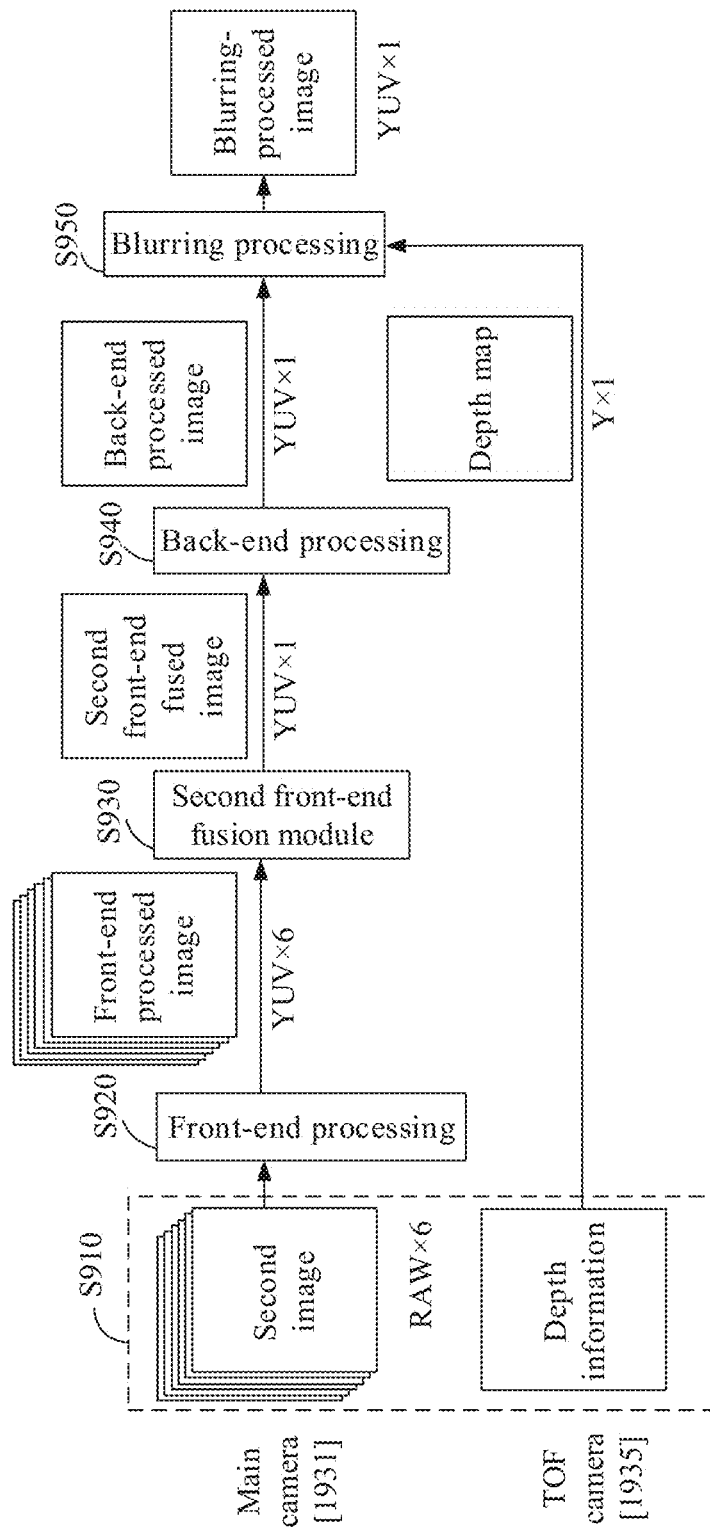
FIG. 30 is another schematic flowchart of a method for image or video shooting in a wide aperture mode, according to an embodiment of this application.

Embodiment 13: FIG. 30 is another schematic flowchart of a method for image or video shooting in a wide aperture mode according to an embodiment of this application. As shown in FIG. 30, the method includes the following S910 to S950.

S910. Receive a first operation of a user, and determine that when a shooting mode is a wide aperture mode, a zoom ratio is applicable to 1× and above. Therefore, for example, six frames of second images are obtained by using a main camera 1931, depth information of a to-be-shot scene is obtained by using a TOF camera 1935, and a depth map is generated by using the depth information. The TOF camera 1935 is an auxiliary camera.

It should be understood that a quantity of second images is only an example. A specific quantity may be obtained based on a requirement. This is not limited in this embodiment of this application. The second image is located in a RAW region, and is a Bayer pattern image.

Herein, when the TOF camera 1935 shoots the to-be-shot scene, the TOF camera 1935 can continuously emit light pulses to a target (such as an object in the to-be-shot scene), and then use a sensor to receive light returned from the object. Based on this, a distance of the target can be obtained by using a time of flight (round trip). Based on this, a distance between each point in the to-be-shot scene and an electronic device 100 is obtained by calculating a time from emitting light by the TOF camera 1935 to returning to the TOF camera 1935. Therefore, the depth information of the to-be-shot scene is obtained, and then the depth information is represented as the depth map. The depth map is a gray image.

Figure 31:
FIG. 31 shows images respectively shot by a main camera and a TOF camera, according to an embodiment of this application.

For example, FIG. 31(a) shows a second image obtained by the main camera 1931 by shooting the to-be-shot scene. FIG. 31(b) shows the depth map obtained by the TOF camera 1935 by shooting the same to-be-shot scene.

S920. Perform front-end processing on the six frames of second images to obtain six corresponding frames of front-end processed images.

For the description of the front-end processing, refer to the foregoing content in S120. Details are not described herein again.

It should be understood that when the front-end processing includes demosaic and color space conversion, after the front-end processing is performed on the second image, the corresponding front-end processed image is located in a YUV region. When the front-end processing does not include demosaic and color space conversion, after the front-end processing is performed on the second image, the corresponding front-end processed image is still located in the RAW region.

For example, in this embodiment, to reduce an amount of data, save bandwidth, and increase a speed of subsequent processing, the front-end processing performed on the second image includes demosaic and color space conversion, so that after the front-end processing is performed on the second image, the corresponding front-end processed image is located in the YUV region.

It should also be understood that the front-end processing provided in this embodiment may be the same as or different from the front-end processing in the foregoing embodiment, and may be specifically set and changed based on a requirement. This is not limited in this embodiment of this application.

S930. Perform fusion on the six frames of front-end processed images corresponding to the six frames of second images by using a second front-end fusion module, to obtain a second front-end fused image corresponding to the six frames of second images.

For example, the front-end processing provided in this embodiment includes demosaic and color space conversion, and the six frames of front-end processed images corresponding to the six frames of second images are located in the YUV region. In this case, the corresponding second front-end fusion module correspondingly includes a YUV region multi-frame fusion module to implement a YUV region multi-frame fusion function. Therefore, the second front-end fused image obtained through processing by the second front-end fusion module is still located in the YUV region. Therefore, the image in the subsequent processing can be located in the YUV region, the amount of data is reduced, and the bandwidth is saved.

It should be understood that the second front-end fusion module in this embodiment may be the same as or different from the first front-end fusion module, the second front-end fusion module, the third front-end fusion module, or the fourth front-end fusion module in the foregoing embodiment, and may be specifically set and changed based on a requirement. This is not limited in this embodiment of this application.

Certainly, the second front-end fusion module may further include other functional modules. For details, refer to the foregoing description of the first front-end fusion module or the second front-end fusion module in S130. Details are not described herein again.

Based on this, the plurality of frames of second images may include a second image with a long exposure, a second image with a short exposure, and a second image with a moderate exposure.

When the plurality of frames of second images include second images with different exposure, accordingly, front-end processed images corresponding to the plurality of frames of second images include front-end processed images with different exposure. Based on this, after the second front-end fusion module performs fusion on the plurality of frames of front-end processed images with different exposure, details of a dark region and an over-exposure region in the image can be increased, and a dynamic range can be improved, so that definition of the corresponding second front-end fused image can be improved.

S940. Perform back-end processing on the second front-end fused image to obtain a corresponding back-end processed image.

For the description of the back-end processing, refer to the foregoing content in S140. Details are not described herein again.

It should be understood that the back-end processed image corresponding to the second image is located in the YUV region.

It should be understood that the back-end processing provided in this embodiment may be the same as or different from the back-end processing in the foregoing embodiment, and may be specifically set and changed based on a requirement. This is not limited in this embodiment of this application.

S950. Perform blurring processing on the back-end processed image corresponding to the second images by using the depth map, to obtain a corresponding blurring-processed image. The blurring-processed image is a shot image.

It should be understood that the depth map can be used to assist in separating a foreground and a background in the back-end processed image, and then perform blurring processing on the background or the foreground.

In this embodiment, in the wide aperture mode, after the foregoing series of processing based on the second image and the depth map representing the depth information, a shot image with higher foreground definition and better quality can be obtained through fusion.

It should also be understood that the foregoing process is only an example, and that a specific order may be adjusted based on a requirement. Certainly, steps may be added or removed. This is not limited in this embodiment of this application.

Figure 32:
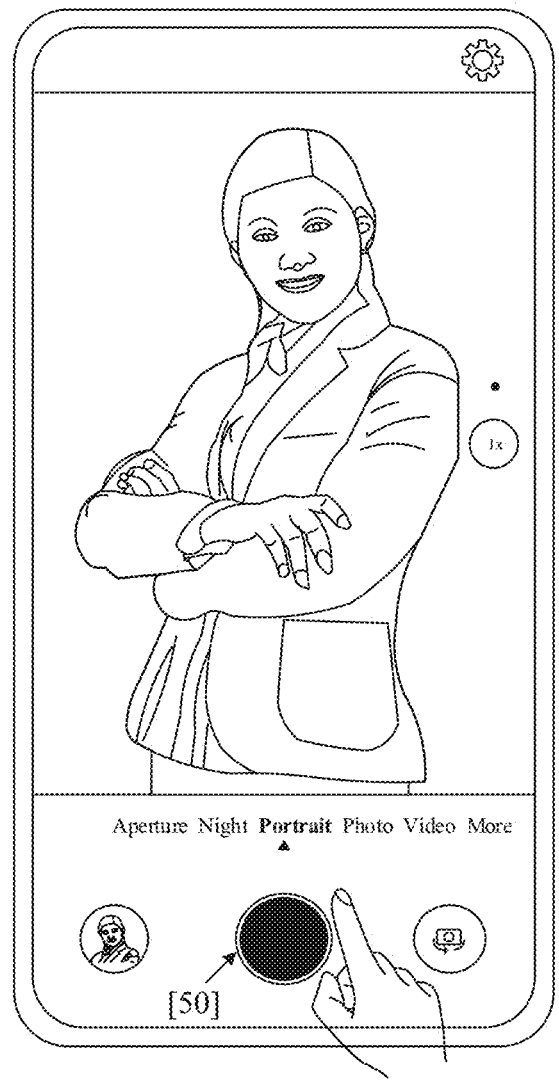
FIG. 32 is still another schematic diagram of a screen of an electronic device, according to an embodiment of this application.

FIG. 32 is still another schematic diagram of a screen of an electronic device according to an embodiment of this application.

For example, when shooting a lady in a scene, in response to a slide operation of a user, the electronic device 100 displays a shooting screen shown in FIG. 32, where a shooting button 50 indicates that a current shooting mode is a portrait mode.

Certainly, the foregoing is only a manner of displaying options corresponding to the portrait mode on the interface of the electronic device. A specific manner may be set and changed based on a requirement. This is not limited in this embodiment of this application.

Figure 33:
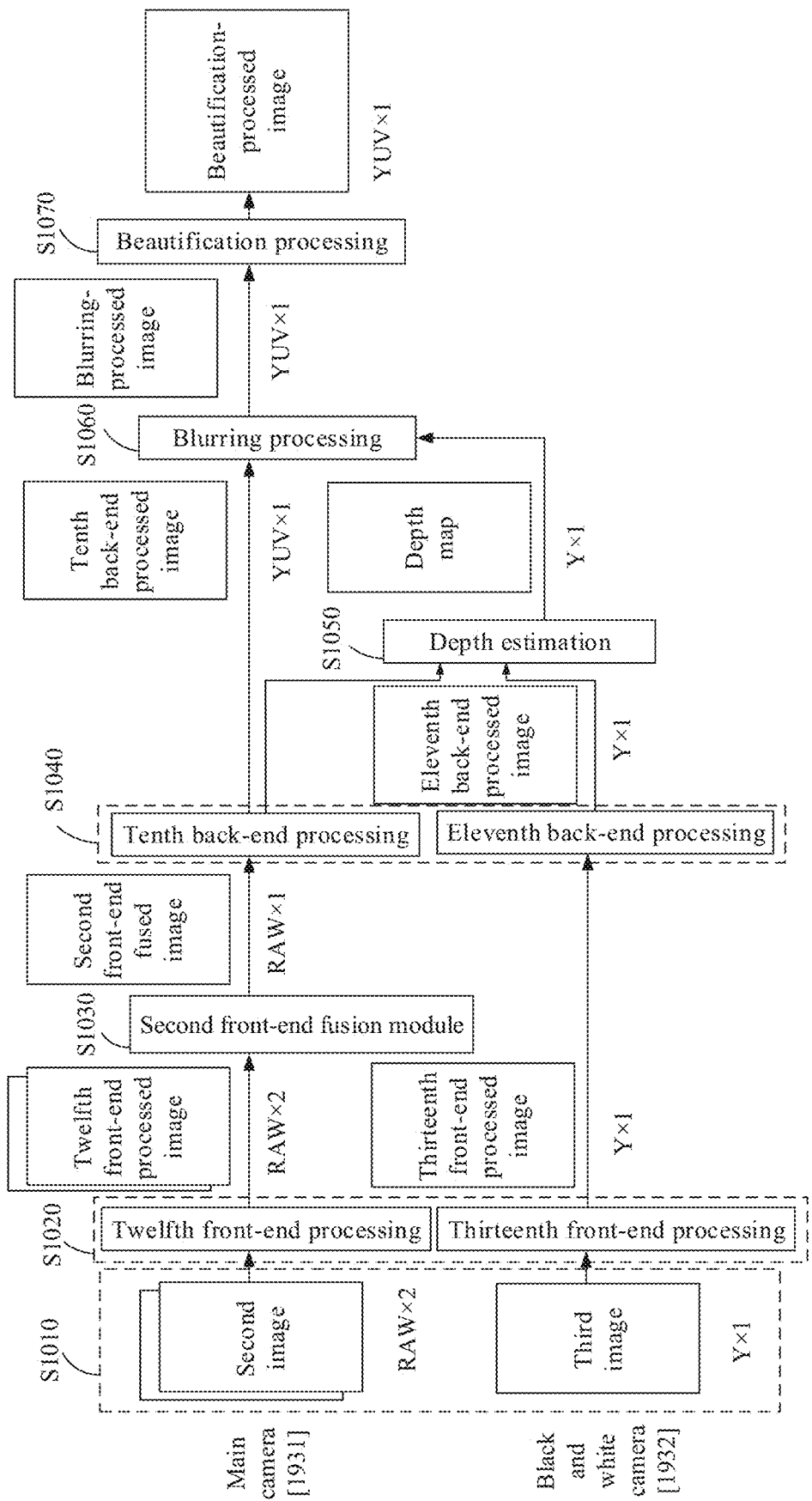
FIG. 33 is a schematic flowchart of a method for image or video shooting in a portrait mode, according to an embodiment of this application.

Embodiment 14: With reference to FIG. 32, FIG. 33 is a schematic flowchart of a method for image or video shooting in a portrait mode according to an embodiment of this application. As shown in FIG. 33, the method includes the following S1010 to S1070.

S1010. Receive a first operation of a user, and determine that when a shooting mode is a portrait mode, a zoom ratio is applicable to 1× and above. Therefore, for example, two frames of second images are obtained by using a main camera 1931, and one frame of third image is obtained by using a black and white camera 1932. The black and white camera 1932 is an auxiliary camera.

Herein, a quantity of second images is only an example. A specific quantity may be obtained based on a requirement. This is not limited in this embodiment of this application.

The second image is located in a RAW region, the second image is a Bayer pattern image, and the third image obtained by the black and white camera 1932 is a gray image.

It should be understood that a field of view corresponding to the second image is basically consistent with a field of view corresponding to the third image, and details of the third image are richer than details of the second image.

S1020. Perform twelfth front-end processing on the two frames of second images to obtain two corresponding frames of twelfth front-end processed images; and perform thirteenth front-end processing on the one frame of third image to obtain one corresponding frame of thirteenth front-end processed image.

For the description of the twelfth front-end processing and the thirteenth front-end processing, refer to the foregoing content in S120. Details are not described herein again.

It should be understood that when the twelfth front-end processing includes demosaic and color space conversion, after the twelfth front-end processing is performed on the second image, the corresponding twelfth front-end processed image is located in a YUV region. When the twelfth front-end processing does not include demosaic and color space conversion, after the twelfth front-end processing is performed on the second image, the corresponding twelfth front-end processed image is still located in the RAW region.

For example, in this embodiment, to retain more details, the twelfth front-end processing performed on the second image does not include demosaic and color space conversion, so that after the twelfth front-end processing is performed on the second image, the corresponding twelfth front-end processed image is located in the RAW region.

It should be understood that for the third image, because the third image is a gray image (shown as a Y diagram in the figure), the thirteenth front-end processing performed on the third image does not include demosaic and color space conversion. In this way, after the thirteenth front-end processing is performed on the third image, the corresponding thirteenth front-end processed image is still a gray image.

It should also be understood that in this embodiment, the twelfth front-end processing and the thirteenth front-end processing may be the same or different. This is not limited in this embodiment of this application. In addition, the twelfth front-end processing and the thirteenth front-end processing provided in this embodiment may be the same as or different from the front-end processing in the foregoing embodiment, and may be specifically set and changed based on a requirement. This is not limited in this embodiment of this application.

S1030. Perform fusion on the two frames of twelfth front-end processed corresponding to the two frames of second images by using a second front-end fusion module, to obtain a second front-end fused image corresponding to the two frames of second images.

For example, the twelfth front-end processing provided for the second images in this embodiment does not include demosaic and color space conversion, and the two frames of twelfth front-end processed images corresponding to the two frames of second images are located in the RAW region. In this case, the corresponding second front-end fusion module correspondingly includes a RAW region multi-frame fusion module to implement a RAW region multi-frame fusion function. Therefore, the second front-end fused image obtained through processing by the second front-end fusion module is also located in the RAW region.

It should be understood that the second front-end fusion module in this embodiment may be the same as or different from the first front-end fusion module, the second front-end fusion module, the third front-end fusion module, or the fourth front-end fusion module in the foregoing embodiment, and may be specifically set and changed based on a requirement. This is not limited in this embodiment of this application.

Certainly, the second front-end fusion module may further include other functional modules. For details, refer to the foregoing description of the first front-end fusion module or the second front-end fusion module in S130. Details are not described herein again.

Based on this, the plurality of frames of second images may include a second image with a long exposure, a second image with a short exposure, and a second image with a moderate exposure.

When the plurality of frames of second images include second images with different exposure, accordingly, front-end processed images corresponding to the plurality of frames of second images include front-end processed images with different exposure. Based on this, after the second front-end fusion module performs fusion on the plurality of frames of front-end processed images with different exposure, details of a dark region and an over-exposure region in the image can be increased, and a dynamic range can be improved, so that definition of the corresponding second front-end fused image can be improved.

Optionally, the foregoing S1020 may alternatively be: performing first preprocessing on the two frames of second images to obtain two frames of first preprocessed images located in the RAW region; and performing front-end processing on the one frame of third image to obtain one corresponding frames of front-end processed images.

For the description of the first preprocessing, refer to the content in S220. Details are not described herein again.

Correspondingly, S1030 is: performing fusion on the two frames of first preprocessed images corresponding to the two frames of second images by using the second front-end fusion module, to obtain a second front-end fused image corresponding to the two frames of second images.

S1040. Perform tenth back-end processing on the second front-end fused image corresponding to the two frames of second images, to obtain a corresponding tenth back-end processed image; and perform eleventh back-end processing on the thirteenth front-end processed image corresponding to the third image, to obtain a corresponding eleventh back-end processed image.

For the description of the tenth back-end processing and the eleventh back-end processing, refer to the foregoing content in S140. Details are not described herein again.

It should be understood that the tenth back-end processed image corresponding to the second image is located in the YUV region, and the eleventh back-end processed image corresponding to the third image is a gray image.

It should also be understood that in this embodiment, the tenth back-end processing may be the same as or different from the eleventh back-end processing. In addition, the tenth back-end processing and the eleventh back-end processing in this embodiment may be the same as or different from the back-end processing in the foregoing embodiment, and may be specifically set based on a requirement. This is not limited in this embodiment of this application.

S1050. Perform depth estimation processing on the tenth back-end processed image corresponding to the two frames of second images and the eleventh back-end processed image corresponding to the one frame of third image, to obtain a depth map.

It should be understood that the depth estimation processing refers to using a principle of binocular stereo vision to perform pixel matching on the tenth back-end processed image corresponding to the two frames of second images and the eleventh back-end processed image corresponding to the one frames of third images, and then calculating depth information of each pixel based on a matching result, so that the depth map can be generated based on the depth information. The depth map is a gray image.

S1060. Perform blurring processing on the tenth back-end processed image corresponding to the two frames of second images by using the depth map, to obtain a corresponding blurring-processed image.

It should be understood that the depth map can be used to assist in separating a foreground and a background in the tenth back-end processed image corresponding to the two frames of second images, and then perform blurring processing on the background or the foreground.

The blurring-processed image is located in the YUV region.

Figure 35:
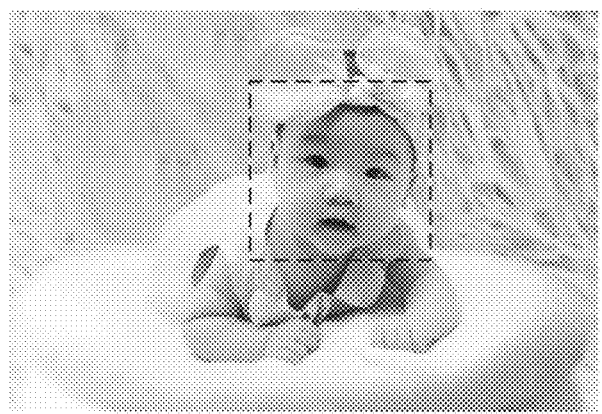
FIG. 35 shows a second enhanced image obtained after blurring processing, according to an embodiment of this application.

For example, as shown in FIG. 35, the electronic device 100 detects a human face during preview, and when the human face is detected, triggers face AE (Auto Exposure) and face AF (Auto Focus), so that the human face is within a most suitable luminance range, and the AF pushes a focus motor to place the human face on a most suitable focus plane.

After the shooting button is pressed, depth estimation processing is performed to generate the depth map, and a depth plane in which the human face is located is appropriately sharpened to improve definition of the human face. Blurring processing of different degrees is performed on other depth planes. A degree of blurring depends on a distance from the depth plane in which the human face is located. The longer the distance, the higher the degree of blurring; or the shorter the distance, the lower the degree of blurring.

S1070. Perform beautification processing on the blurring-processed image to obtain a beautification-processed image. The beautification-processed image is a shot image.

It should be understood that the beautification processing may be used to adjust a face image of a shot person, so that a face represented by the adjusted face image is beautified in comparison with an actual face of the shot person, such as skin whitening, dermabrasion (such as removing acne, freckles, or wrinkles on the face of the person), and the like. An adjustment of the face image in the "beautification" function may refer to smoothing processing performed on the face image by using an algorithm such as surface blurring, mean filtering, or bilateral filtering. Therefore, such processing on the face image may be referred to as beautification processing.

The beautification-processed image is located in the YUV region. The beautification-processed image is to be displayed as a shot image on a screen of the electronic device 100, or is merely stored, and may be specifically transmitted based on a requirement. This is not limited in this embodiment of this application.

It should also be understood that the foregoing process is only an example, and that a specific order may be adjusted based on a requirement. Certainly, steps may be added or removed. This is not limited in this embodiment of this application.

An embodiment of this application further provides another schematic flowchart of a method for image or video shooting in a portrait mode according to an embodiment of this application. The method is applied to an electronic device 100 including a TOF camera 1935 in addition to the foregoing four cameras.

Figure 34:
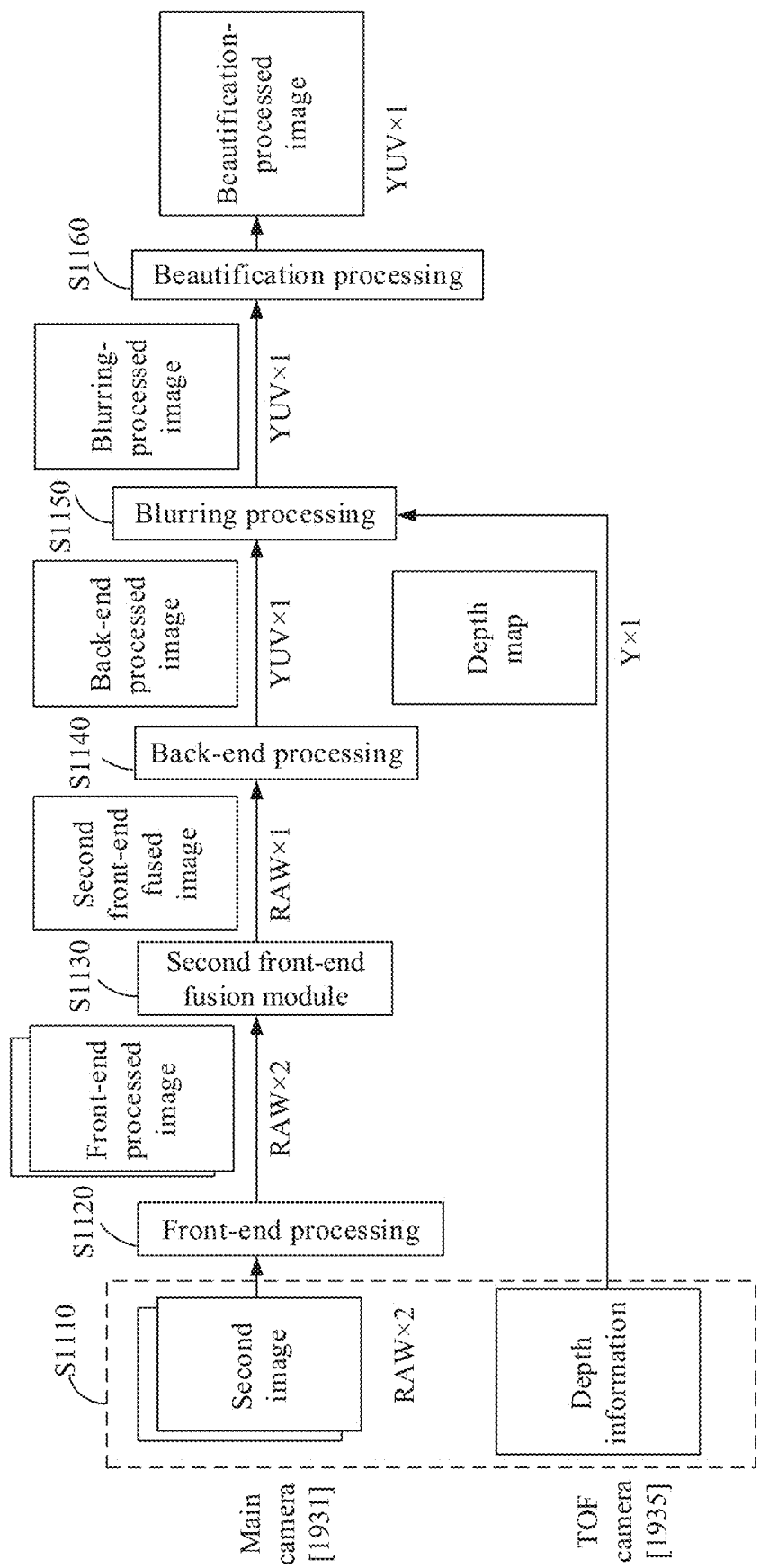
FIG. 34 is another schematic flowchart of a method for image or video shooting in a portrait mode, according to an embodiment of this application.

Embodiment 15: With reference to FIG. 32, FIG. 34 is another schematic flowchart of a method for image or video shooting in a portrait mode according to an embodiment of this application. As shown in FIG. 34, the method includes the following S1110 to S1160.

S1110. Receive a first operation of a user, and determine that when a shooting mode is a portrait mode, a zoom ratio is applicable to 1× and above. Therefore, for example, two frames of second images are obtained by using a main camera 1931, depth information of a to-be-shot scene is obtained by using a TOF camera 1935, and a depth map is generated by using the depth information. The TOF camera 1935 is an auxiliary camera.

It should be understood that a quantity of second images is only an example. A specific quantity may be obtained based on a requirement. This is not limited in this embodiment of this application. The second image is located in a RAW region, and is a Bayer pattern image.

Herein, for the process of obtaining the depth map by the TOF camera 1935, refer to the foregoing description in S910. Details are not described herein again.

S1120. Perform front-end processing on the two frames of second images to obtain two corresponding frames of front-end processed images.

For the description of the front-end processing, refer to the foregoing content in S120. Details are not described herein again.

It should be understood that when the front-end processing includes demosaic and color space conversion, after the front-end processing is performed on the second image, the corresponding front-end processed image is located in a YUV region. When the front-end processing does not include demosaic and color space conversion, after the front-end processing is performed on the second image, the corresponding front-end processed image is still located in the RAW region.

For example, in this embodiment, to retain more details, the front-end processing performed on the second image does not include demosaic and color space conversion, so that after the front-end processing is performed on the second image, the corresponding front-end processed image is located in the RAW region.

It should also be understood that the front-end processing provided in this embodiment may be the same as or different from the front-end processing in the foregoing embodiment, and may be specifically set and changed based on a requirement. This is not limited in this embodiment of this application.

S1130. Perform fusion on the two frames of front-end processed images corresponding to the two frames of second images by using a second front-end fusion module, to obtain a second front-end fused image corresponding to the two frames of second images.

For example, the front-end processing provided in this embodiment does not include demosaic and color space conversion, and the two frames of front-end processed images corresponding to the two frames of second images are located in the RAW region. In this case, the corresponding second front-end fusion module correspondingly includes a RAW region multi-frame fusion module to implement a RAW region multi-frame fusion function. Therefore, the second front-end fused image obtained through processing by the second front-end fusion module is also located in the RAW region.

It should be understood that the second front-end fusion module in this embodiment may be the same as or different from the first front-end fusion module, the second front-end fusion module, the third front-end fusion module, or the fourth front-end fusion module in the foregoing embodiment, and may be specifically set and changed based on a requirement. This is not limited in this embodiment of this application.

Certainly, the second front-end fusion module may further include other functional modules. For details, refer to the foregoing description of the first front-end fusion module or the second front-end fusion module in S130. Details are not described herein again.

Based on this, the plurality of frames of second images may include a second image with a long exposure, a second image with a short exposure, and a second image with a moderate exposure.

When the plurality of frames of second images include second images with different exposure, accordingly, front-end processed images corresponding to the plurality of frames of second images include front-end processed images with different exposure. Based on this, after the second front-end fusion module performs fusion on the plurality of frames of front-end processed images with different exposure, details of a dark region and an over-exposure region in the image can be increased, and a dynamic range can be improved, so that definition of the corresponding second front-end fused image can be improved.

It should also be understood that second front-end fusion module in this embodiment may be the same as or different from second front-end fusion module in the foregoing embodiment, and may be specifically set based on a requirement. This is not limited in this embodiment of this application.

S1140. Perform back-end processing on the second front-end fused image to obtain a corresponding back-end processed image.

For the description of the back-end processing, refer to the foregoing content in S140. Details are not described herein again.

It should be understood that the back-end processed image corresponding to the second image is located in the YUV region.

It should be understood that the back-end processing provided in this embodiment may be the same as or different from the back-end processing in the foregoing embodiment, and may be specifically set and changed based on a requirement. This is not limited in this embodiment of this application.

S1150. Perform blurring processing on the back-end processed image by using the depth map, to obtain a corresponding blurring-processed image.

It should be understood that the depth map can be used to assist in separating a foreground and a background in the back-end processed image, and then perform blurring processing on the background or the foreground.

The blurring-processed image is located in the YUV region.

S1160. Perform beautification processing on the blurring-processed image to obtain a beautification-processed image. The beautification-processed image is a shot image.

For the description of the beautification processing, refer to the foregoing content in S1070. Details are not described herein again.

The beautification-processed image is located in the YUV region. The beautification-processed image is to be displayed as a shot image on a screen of the electronic device 100, or is merely stored, and may be specifically transmitted based on a requirement. This is not limited in this embodiment of this application.

It should also be understood that the foregoing process is only an example, and that a specific order may be adjusted based on a requirement. Certainly, steps may be added or removed. This is not limited in this embodiment of this application.

Figure 36:
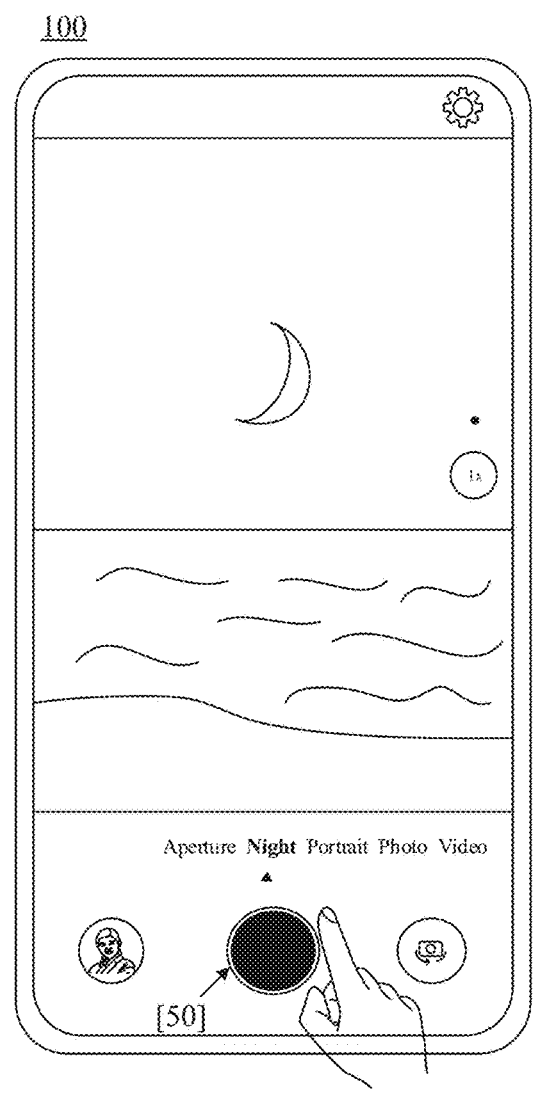
FIG. 36 is still another schematic diagram of a screen of an electronic device, according to an embodiment of this application.

FIG. 36 is still another schematic diagram of a screen of an electronic device according to an embodiment of this application.

For example, to shoot the moon rising from the sea at night, in response to a slide operation of a user, the electronic device displays a shooting screen shown in FIG. 36, where a shooting button 50 indicates that a current shooting mode is a night mode.

Certainly, the foregoing is only a manner of displaying options corresponding to the night mode on the interface of the electronic device. A specific manner may be set and changed based on a requirement. This is not limited in this embodiment of this application.

Figure 37:
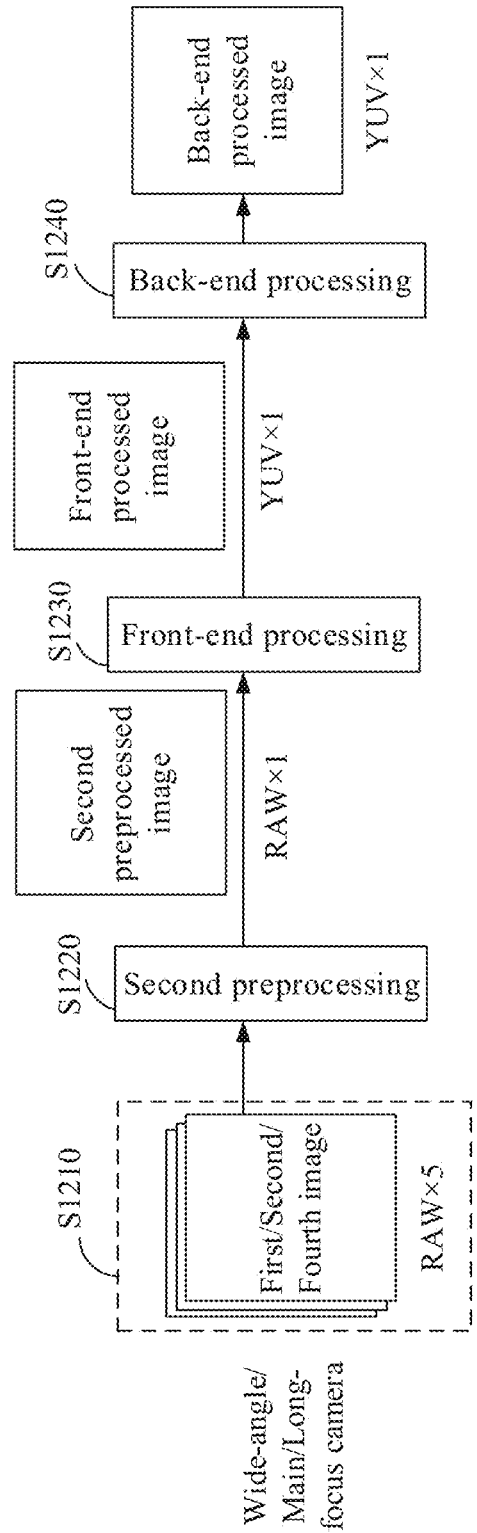
FIG. 37 is a schematic flowchart of a method for image or video shooting in a night mode, according to an embodiment of this application.

Embodiment 16: As shown in FIG. 37, a method for image or video shooting is provided, and the method includes the following S1210 to S1240.

S1210. Assuming that a current zoom ratio is 0.5×, the current zoom ratio falls within a first zoom ratio range [0.5, 1), and in low lightness, a target camera is a wide-angle camera 1933. For example, three frames of first images are obtained by using the wide-angle camera 1933.

In addition, if the current zoom ratio is 2.6×, the current zoom ratio falls within a third zoom ratio range [2, 3.x), and in low lightness, the target camera is a main camera 1931. For example, three frames of second images are obtained by using the main camera 1931.

If the current zoom ratio is 20, the current zoom ratio falls within a fourth zoom ratio range [3.x, 100], and in low lightness, the target camera is a long-focus camera. For example, three frames of fourth images are obtained by using the long-focus camera.

Herein, quantities of first images, second images, and fourth images are only examples. Specific quantities may be obtained based on a requirement. This is not limited in this embodiment of this application.

The first image, the second image, and the fourth image are all located in a RAW region and are Bayer pattern images.

S1220. Perform second preprocessing on the three frames of first images, the three frames of second images, or the three frames of fourth images, to obtain a corresponding second preprocessed image located in the RAW region.

The foregoing S1220 may also be expressed as: performing second preprocessing on the three frames of first images to obtain the corresponding second preprocessed image located in the RAW region; performing second preprocessing on the three frames of second images to obtain the corresponding second preprocessed image located in the RAW region; or performing second preprocessing on the three frames of fourth images to obtain the corresponding second preprocessed image located in the RAW region.

The second preprocessing provided in this embodiment includes a night algorithm module. For example, the night algorithm module is generated based on a Unet network model, and is capable of fusing a plurality of frames of first images, a plurality of frames of second images, or a plurality of frames of fourth images in the RAW region into one corresponding frame of second preprocessed image located in the RAW region. For the detailed description, refer to the foregoing content in S520. Details are not described herein again.

S1230. Perform front-end processing on the second preprocessed image corresponding to the three frames of first images, the three frames of second images, or the three frames of fourth images, to obtain a corresponding front-end processed image.

For the description of the front-end processing, refer to the foregoing content in S120. Details are not described herein again.

For example, in this embodiment, to reduce an amount of data and save bandwidth, the front-end processing includes demosaic and color space conversion, so that after the front-end processing is performed on the second preprocessed image located in the RAW region and corresponding to the first images, the second images, or the fourth images, the obtained front-end processed image is located in a YUV region.

It should also be understood that the front-end processing provided in this embodiment may be the same as or different from the front-end processing in the foregoing embodiment, and may be specifically set and changed based on a requirement. This is not limited in this embodiment of this application.

S1240. Perform back-end processing on the front-end processed image corresponding to the three frames of first images, the three frames of second images, or the three frames of fourth images, to obtain a corresponding back-end processed image, where the back-end processed image is a shot image.

For the description of the back-end processing, refer to the foregoing content in S140. Details are not described herein again.

It should be understood that the back-end processed image corresponding to the first images, the second images, or the fourth images is located in the YUV region.

It should be understood that the back-end processing provided in this embodiment may be the same as or different from the back-end processing in the foregoing embodiment, and may be specifically set and changed based on a requirement. This is not limited in this embodiment of this application.

In this implementation, in a night mode, multi-frame fusion processing and the foregoing other processing are performed based on the plurality of frames of first images, second images, or fourth images by using the network model, and a shot image with higher definition and better quality can be obtained through fusion.

It should also be understood that the foregoing process is only an example, and that a specific order may be adjusted based on a requirement. Certainly, steps may be added or removed. This is not limited in this embodiment of this application.

The methods for image or video shooting in the wide aperture mode, the portrait mode, and the night mode provided in the embodiments of this application are described in detail above in the Embodiments 11 to 16. The following describes a method for image or video shooting in an intelligent mode according to an embodiment of this application.

Figure 38:
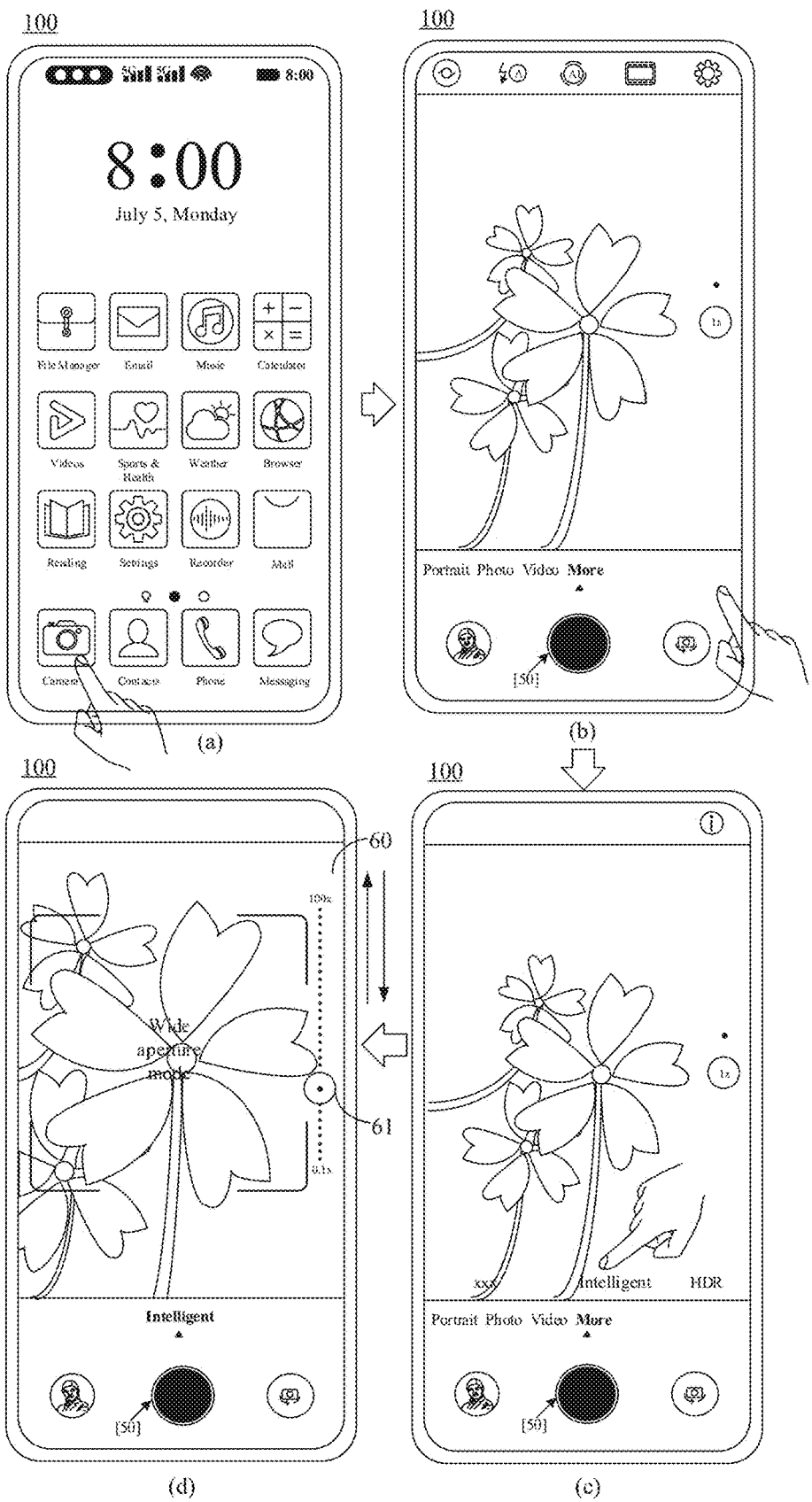
FIG. 38 is still another schematic diagram of a screen of an electronic device, according to an embodiment of this application.

FIG. 38 is still another schematic diagram of a screen of an electronic device according to an embodiment of this application.

For example, as shown in FIG. 38(a), in response to a touch operation of a user, when an electronic device 100 runs a camera application, the electronic device 100 displays a shooting screen shown in FIG. 38(b). A shooting button 50 indicates "more".

Continuing to respond to a tap operation of the user, the electronic device 100 displays a shooting screen shown in FIG. 38(c), where the shooting screen displays options corresponding to an intelligent mode.

Then, in response to a tap operation of the user on an option corresponding to the intelligent mode, the electronic device 100 displays a shooting screen shown in FIG. 38(d). The shooting screen further includes a viewfinder window 60, and the viewfinder window 60 may be used to display a preview image in real time before photographing or video shooting. In addition, the preview image further displays a zoom option 61. The user may select a currently required zoom ratio in the zoom option 61, for example, 0.5×, 2×, or, 50x.

Figure 39:
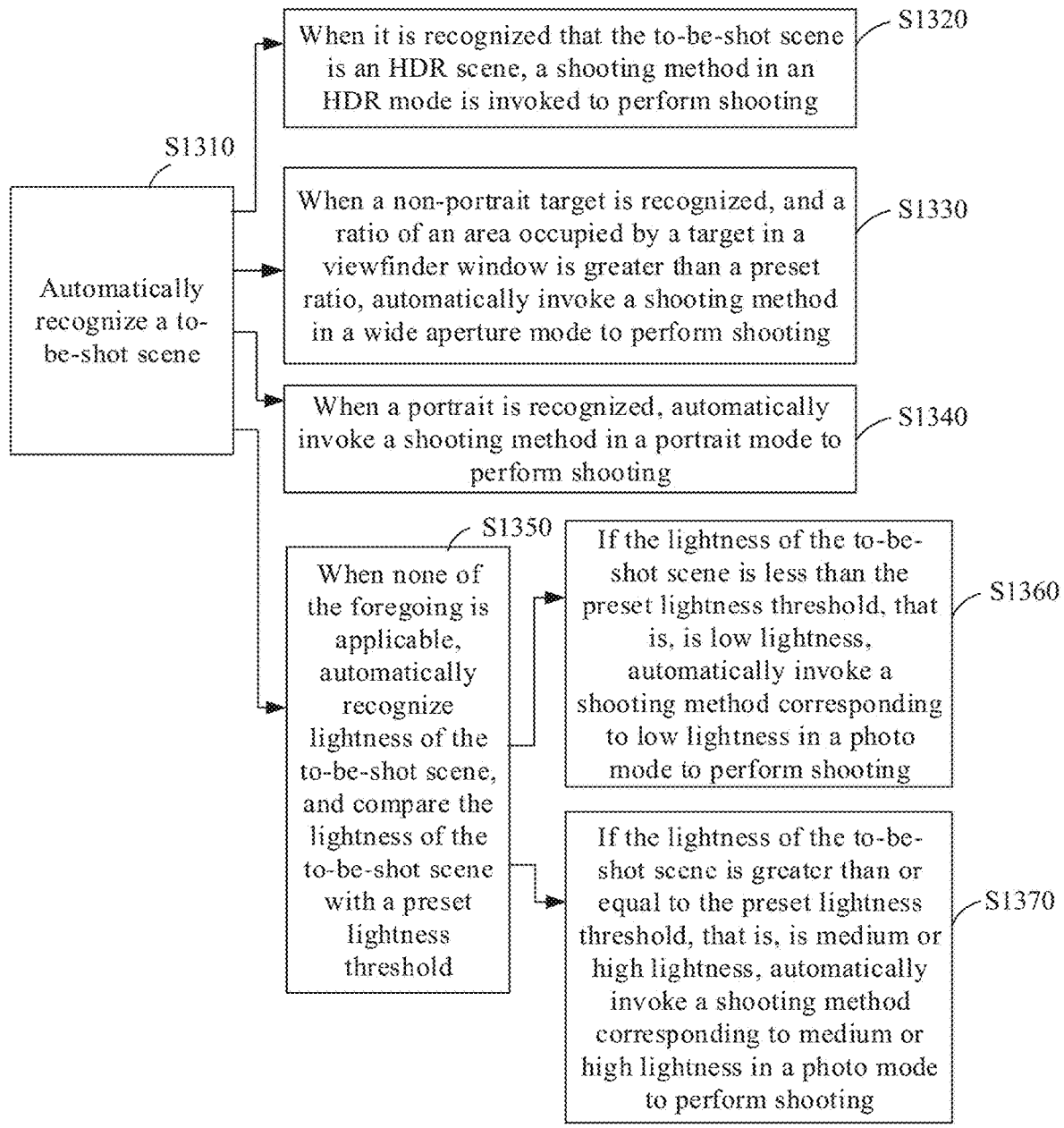
FIG. 39 is a schematic flowchart of a method for image or video shooting in an intelligent mode, according to an embodiment of this application.

With reference to FIG. 38(d), the shooting button 50 indicates that a current shooting mode is the intelligent mode. Based on this, FIG. 39 is a schematic flowchart of a method for image or video shooting in an intelligent mode according to an embodiment of this application.

Embodiment 17: As shown in FIG. 39, a method for image or video shooting is provided, and the method includes the following S1310 to S1370.

S1310. Receive a first operation of a user, and if it is determined that a current shooting mode is an intelligent mode, automatically recognize a to-be-shot scene.

S1320. When it is recognized that the to-be-shot scene is an HDR scene, a method for image or video shooting in an HDR mode is invoked to perform shooting.

For example, as shown in the foregoing Embodiment 11, if the scene is the HDR scene, a current zoom ratio is automatically determined, and a zoom ratio range within which the current zoom ratio falls is determined. When the current zoom ratio falls within a first zoom ratio range, it is determined that a target camera is a wide-angle camera, and a plurality of frames of first images are obtained by using the wide-angle camera 1933. When the current zoom ratio falls within a second zoom ratio range or a third zoom ratio range, it is determined that the target camera is a main camera 1931, and a plurality of frames of second images are obtained by using the main camera 1931. When the current zoom ratio falls within a fourth zoom ratio range, it is determined that the target camera is a long-focus camera 1934, and a plurality of frames of fourth images are obtained by using the long-focus camera 1934. Then third preprocessing is performed on the plurality of frames of first images, the plurality of frames of second images, or the plurality of frames of fourth images to obtain a corresponding third preprocessed image located in a RAW region, then front-end processing is performed on the third preprocessed image to obtain a corresponding front-end processed image, and then back-end processing is performed on the front-end processed image to obtain a corresponding back-end processed image, where the back-end processed image is used as a shot image.

S1330. When a non-portrait target is recognized, and a ratio of an area occupied by the target in a viewfinder window is greater than a preset ratio, automatically invoke a method for image or video shooting in a wide aperture mode to perform shooting.

For example, with reference to FIG. 38, when a flower is automatically recognized and the user performs a zooming operation, when a ratio of an area occupied by the flower in the viewfinder window is greater than a preset ratio (for example, 50%), as shown in the foregoing Embodiment 12 or 13, a plurality of frames of second images are obtained by using a main camera 1931, a plurality of frames of third images are obtained by using a black and white camera 1932, front-end processing is performed on the plurality of frames of second images and the plurality of frames of third images separately to obtain a plurality of corresponding frames of front-end processed images, and then fusion and back-end processing are performed on the plurality of front-end processed images corresponding to the plurality of frames of second images to obtain a corresponding back-end processed image; in addition, fusion and back-end processing are performed on the plurality of front-end processed images corresponding to the plurality of frames of third images to obtain a corresponding back-end processed image. Depth estimation processing is performed on both the two back-end processed images to obtain a depth map, or depth information of the to-be-shot scene is obtained by using a TOF camera 1935, and a depth map is generated; and then blurring processing is performed on the back-end processed image corresponding to the second images by using the depth map, to obtain a corresponding blurring-processed image. The blurring-processed image is a shot image.

S1340. When a portrait is recognized, automatically invoke a method for image or video shooting in a portrait mode to perform shooting.

For example, as shown in the foregoing Embodiments 14 and 15, if a portrait is recognized, the steps shown in Embodiment 12 or 13 are performed, and then, on a basis of Embodiment 12 or 13, beautification processing is performed on a blurring-processed image to obtain a beautification-processed image, where the beautification-processed image is a shot image.

S1350. When none of the foregoing is applicable, automatically recognize lightness of the to-be-shot scene, and compare the lightness of the to-be-shot scene with a preset lightness threshold.

S1360. If the lightness of the to-be-shot scene is less than the preset lightness threshold, that is, is low lightness, automatically invoke a method for image or video shooting corresponding to low lightness in a photo mode to perform shooting.

S1370. If the lightness of the to-be-shot scene is greater than or equal to the preset lightness threshold, that is, is medium or high lightness, automatically invoke a method for image or video shooting corresponding to medium or high lightness in the photo mode to perform shooting.

For example, as shown in the foregoing Embodiment 5, if the lightness is low lightness, the current zoom ratio is automatically determined, and the zoom ratio range within which the current zoom ratio falls is determined. When the current zoom ratio falls within the first zoom ratio range, it is determined that the target camera is the wide-angle camera, and a plurality of frames of first images are obtained by using the wide-angle camera. When the current zoom ratio falls within the second zoom ratio range or the third zoom ratio range, it is determined that the target camera is the main camera 1931, and a plurality of frames of second images are obtained by using the main camera 1931. When the current zoom ratio falls within the fourth zoom ratio range, it is determined that the target camera is the long-focus camera 1934, and a plurality of frames of fourth images are obtained by using the long-focus camera. Then second preprocessing is performed on the plurality of frames of first images, the plurality of frames of second images, or the plurality of frames of fourth images to obtain a corresponding second preprocessed image located in the RAW region, then front-end processing is performed on the second preprocessed image to obtain a corresponding front-end processed image, and then back-end processing is performed on the front-end processed image to obtain a corresponding back-end processed image, where the back-end processed image is used as a shot image.

For example, as shown in the foregoing Embodiments 1 to 4, if the lightness is medium or high lightness, the current zoom ratio is automatically determined, and the zoom ratio range within which the current zoom ratio falls is determined. If the current zoom ratio falls within the first zoom ratio range, the method shown in Embodiment 1 is used to obtain the shot image. If the current zoom ratio falls within the second zoom ratio range, the method shown in Embodiment 2 is used to obtain the shot image. If the current zoom ratio falls within the third zoom ratio range, the method shown in Embodiment 3 is used to obtain the shot image. If the current zoom ratio falls within the fourth zoom ratio range, the method shown in Embodiment 4 is used to obtain the shot image.

This embodiment of this application provides a method for image or video shooting. In the intelligent mode, by automatically recognizing the to-be-shot scene, processing methods in different modes can be automatically invoked to obtain a shot image based on a recognition result. Therefore, a usage threshold can be lowered for the user, and a shot image with an optimal effect, high definition, and high quality can be obtained adaptively.

The solutions provided in the embodiments of this application have been described above mainly from a perspective of the electronic device. It may be understood that, to implement the foregoing functions, the electronic device includes a corresponding hardware structure or software module or a combination thereof for performing each function. A person skilled in the art should be easily aware that units and algorithm steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the electronic device may be divided into functional modules according to the foregoing method examples. For example, each functional module corresponding to each function may be obtained through division, or two or more functions may be integrated into one processing module. The integrated module may be implemented in a form of hardware, or may be implemented in a form of a software functional module. It should be noted that the module division in the embodiments of this application is an example, and is merely logical function division. There may be another division manner in an actual implementation. In the following description, it is assumed that each functional module corresponding to each function is obtained through division.

Figure 40:
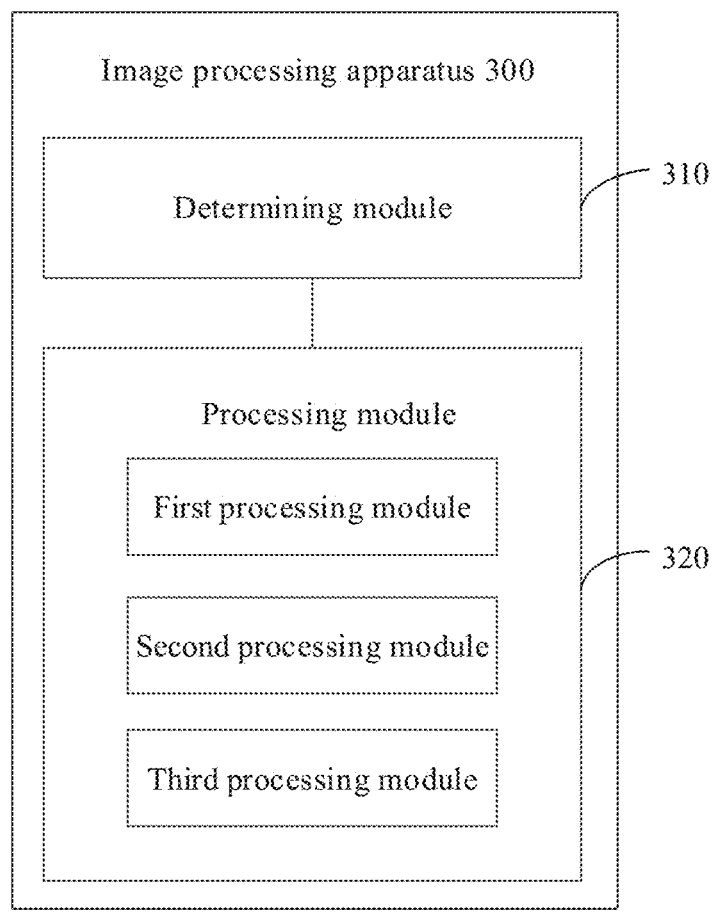
FIG. 40 is a schematic diagram of a structure of an image processing apparatus, according to an embodiment of this application.

FIG. 40 is a schematic diagram of a structure of an image processing apparatus according to an embodiment of this application. As shown in FIG. 40, the image processing apparatus 300 includes a determining module 310, a processing module 320, and a plurality of cameras, where the plurality of cameras include a wide-angle camera 1933, a main camera 1931, a black and white camera 1932, and a long-focus camera 1934.

The determining module 310 is configured to determine a current shooting mode. Shooting mode include a photo mode, a video mode, a night mode, a portrait mode, a wide aperture mode, an HDR mode, and an intelligent mode.

When the current shooting mode is the photo mode, the determining module 310 is further configured to determine lightness of a to-be-shot scene and a current zoom ratio. The processing module 320 is configured to determine a target camera based on the lightness of the to-be-shot scene and the current zoom ratio, and obtain raw images by using the target camera. The processing module 320 is further configured to process the raw images to obtain a shot image.

Optionally, when the lightness of the to-be-shot scene is greater than or equal to a preset lightness threshold, the determining module 310 is further configured to determine a zoom ratio range within which the current zoom ratio falls, and determine the target camera based on the zoom ratio range within which the current zoom ratio falls, and use the target camera to obtain the raw images.

Optionally, when the current zoom ratio falls within a first zoom ratio range, the determining module 310 is further configured to determine that target cameras are the wide-angle camera and the main camera 1931, obtain a first image by using the wide-angle camera, and obtain a second image by using the main camera 1931, where the raw images include the first image and the second image.

When the current zoom ratio falls within a second zoom ratio range, the determining module 310 is further configured to determine that target cameras are the main camera 1931 and the black and white camera 1932, obtain a second image by using the main camera 1931, and obtain a third image by using the black and white camera, where the raw images include the second image and the third image.

When the current zoom ratio falls within a third zoom ratio range, the determining module 310 is further configured to determine that target cameras are the main camera 1931 and the long-focus camera, obtain a second image by using the main camera 1931, and obtain a fourth image by using the long-focus camera, where the raw images include the second image and the fourth image.

When the current zoom ratio falls within a fourth zoom ratio range, it is determined that the target camera is the long-focus camera 1934, and a fourth image is obtained by using the long-focus camera, where the raw images include the fourth image.

When the lightness of the to-be-shot scene is less than the preset lightness threshold, or when the shooting mode is the night mode, the determining module 310 is configured to determine the zoom ratio range within which the current zoom ratio falls; and determine the target camera based on the zoom ratio range within which the current zoom ratio falls, and use the target camera to obtain the raw images.

Optionally, when the current zoom ratio falls within the first zoom ratio range, the determining module 310 is further configured to determine that the target camera is the wide-angle camera 1933, and use the wide-angle camera 1933 to obtain a plurality of frames of first images, where the raw images include the plurality of frames of first images.

When the current zoom ratio falls within the second zoom ratio range or the third zoom ratio range, the determining module 310 is further configured to determine that the target camera is the main camera 1931, and use the main camera 1931 to obtain a plurality of frames of second images, where the raw images include the plurality of frames of second images.

When the current zoom ratio falls within the fourth zoom ratio range, it is determined that the target camera is the long-focus camera 1934, and a plurality of frames of fourth images are obtained by using the long-focus camera 1934, where the raw images include the plurality of frames of fourth images.

When the current shooting mode is the video mode or the HDR mode, the determining module 310 is further configured to determine the zoom ratio range within which the current zoom ratio falls; and determine the target camera based on the zoom ratio range within which the current zoom ratio falls, and use the target camera to obtain the raw images; and the processing module 320 is further configured to process the raw images to obtain a shot image.

When the shooting mode is the wide aperture mode or the portrait mode, the main camera 1931 is used to obtain a plurality of frames of second images, and the black and white camera 1932 is used to obtain a plurality of frames of third images.

The processing module 320 is configured to: separately perform front-end processing on the plurality of frames of second images and the plurality of frames of third images, to obtain a plurality of frames of front-end processed images corresponding to the plurality of frames of second images and a plurality of frames of front-end processed images corresponding to the plurality of frames of third images; perform fusion on the plurality of frames of front-end processed images corresponding to the plurality of frames of second image and the plurality of frames of front-end processed images corresponding to the plurality of frames of third images by using a front-end fusion module, to obtain a front-end fused image corresponding to the plurality of frames of second images and a front-end fused image corresponding to the plurality of frames of third images; perform back-end processing on both the front-end fused image corresponding to the plurality of frames of second images and the front-end fused image corresponding to the plurality of frames of third images, to obtain a back-end processed image corresponding to the plurality of frames of second images and a back-end processed image corresponding to the plurality of frames of third images; perform depth estimation processing on the back-end processed image corresponding to the plurality of frames of second images and the back-end processed image corresponding to the plurality of frames of third images, to obtain a depth map; and perform blurring processing on the back-end processed image corresponding to the plurality of frames of second images by using the depth map, to obtain a corresponding blurring-processed image.

Alternatively, when the electronic device further includes a TOF camera 1935, and the shooting mode is the wide aperture mode or the portrait mode, the main camera 1931 is used to obtain a plurality of frames of second images, the TOF camera 1935 is used to obtain depth information of the to-be-shot scene, and the processing module 320 is configured to generate the depth map based on the depth information.

The processing module 320 is further configured to perform front-end processing on the plurality of frames of second images to obtain a plurality of frames of front-end processed images corresponding to the plurality of frames of second images; perform fusion on the plurality of frames of front-end processed images corresponding to the plurality of frames of second images by using the front-end fusion module, to obtain a front-end fused image corresponding to the plurality of frames of second images; perform back-end processing on the front-end fused image to obtain a corresponding back-end processed image; and perform blurring processing on the back-end processed image by using the depth map, to obtain a corresponding blurring-processed image.

When the shooting mode is the portrait mode, the processing module 320 is further configured to perform beautification processing on the blurring-processed image to obtain a beautification-processed image.

An embodiment of this application further provides an electronic device, including a camera module, a processor, and a memory.

The camera module is configured to obtain a plurality of frames of raw images, where the plurality of frames of raw images are images shot in a same to-be-shot scene.

The memory is configured to store a computer program capable of running on the processor.

The processor is configured to perform the foregoing method for image or video shooting, and/or perform the foregoing multi-camera zooming method.

Optionally, the camera module includes a wide-angle camera, a color camera, a black and white camera, and a long-focus camera.

The wide-angle camera is configured to obtain a first image after the processor obtains a photographing instruction.

The main camera is configured to obtain a second image after the processor obtains the photographing instruction.

The black and white camera is configured to obtain a third image after the processor obtains the photographing instruction.

The long-focus camera is configured to obtain a fourth image after the processor obtains the photographing instruction.

Strictly, the image is obtained by an image processor in the camera. The image sensor may be, for example, a charge-coupled device (CCD), or a complementary metal oxide semiconductor (CMOS).

An embodiment of this application further provides a computer-readable storage medium, where the computer-readable storage medium stores computer instructions, and when the computer-readable storage medium runs on an electronic device, the electronic device is enabled to perform the method according to any one of Embodiments 1 to 17. The computer instructions may be stored in the computer-readable storage medium or may be transmitted from the computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or may be a data storage device, such as a server or a data center, integrating one or more usable media. The usable medium may be a magnetic medium (for example, a floppy disk, a hard disk, or a magnetic tape), an optical medium, a semiconductor medium (for example, a solid state disk (SSD)), or the like.

Figure 41:
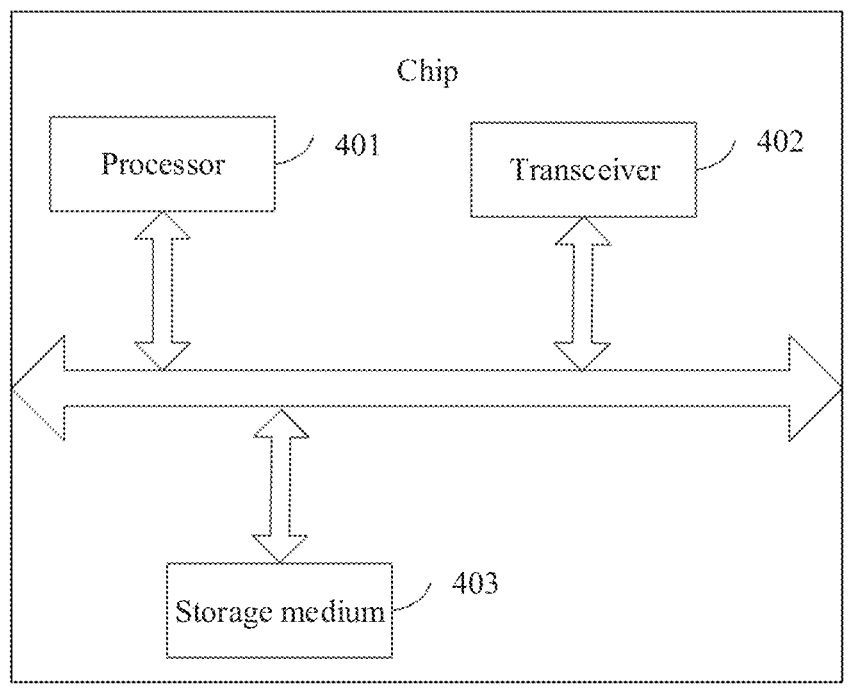
FIG. 41 is a schematic diagram of a structure of a chip, according to an embodiment of this application.

FIG. 41 is a schematic diagram of a structure of a chip according to an embodiment of this application. The chip shown in FIG. 41 may be a general-purpose processor or a special-purpose processor. The chip includes a processor 401. The processor 401 is configured to support an image processing apparatus in performing the technical solution shown in any one of Embodiments 1 to 17.

Optionally, the chip further includes a transceiver 402. The transceiver 402 is configured to accept control of the processor 401, and is configured to support a communications device in performing the technical solution shown in any one of Embodiments 1 to 17.

Optionally, the chip shown in FIG. 41 may further include a storage medium 403.

It should be understood that, the chip shown in FIG. 41 may be implemented by using the following circuit or component: one or more field-programmable gate arrays (FPGA), a programmable logic device (PLD), a controller, a state machine, gate logic, a discrete hardware component, or any other suitable circuit, or any combination of circuits capable of performing various functions described throughout this application.

The electronic device, image processing apparatus, computer storage medium, computer program product, and chip provided in the foregoing embodiments of this application are all configured to perform the methods provided above. Therefore, for the beneficial effects that can be achieved, refer to the beneficial effects corresponding to the foregoing methods. Details are not described herein again.

It should be understood that the foregoing description is intended only to help a person skilled in the art better understand the embodiments of this application, instead of limiting the scope of the embodiments of this application. Apparently, based on the examples provided above, a person skilled in the art may make various equivalent modifications or changes. For example, some steps in each embodiment of the foregoing shooting method may not be necessary, or some new steps may be added. Alternatively, any two or more of the foregoing embodiments are combined. Solutions after such modifications, changes, or combinations shall also fall within the scope of the embodiments of this application.

It should also be understood that, in the foregoing description of the embodiments of this application, each embodiment focuses on a difference from other embodiments. For same or similar parts, mutual reference may be made. Details are not described herein again for brevity.

It should also be understood that sequence numbers of the foregoing processes do not mean an execution order. The execution order of the processes should be determined based on functions and internal logic of the processes, and should not be construed as any limitation on implementation processes of the embodiments of this application.

It should also be understood that, in the embodiments of this application, "presetting" and "predefining" may be implemented by prestoring a corresponding code, table, or other means that can be used to indicate relevant information in a device (for example, including an electronic device). This application is not limited to specific implementations thereof.

It should also be understood that, division of modes, cases, classes, and embodiments in the embodiments of this application is merely for convenience of description and should not be construed as a particular limitation. Various modes, cases, classes, and features in the embodiments may be combined without contradiction.

It should also be understood that, in the embodiments of this application, if there is no special description or logic conflict, terms and/or descriptions in different embodiments are consistent and may be mutually referenced. Technical features in different embodiments may be combined to form a new embodiment based on an internal logical relationship between the technical features.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for image or video shooting, applied to an electronic device comprising a first camera, a second camera, and a third camera, wherein the method comprises:
   displaying, by the electronic device, a first screen, wherein the first screen comprises a preview image, a first widget, and a second widget, and wherein the second widget indicates a photo mode;
   detecting, by the electronic device, a first operation on the first widget;
   determining, by the electronic device, a first zoom ratio in response to the first operation, wherein the preview image is an image captured by the first camera in real time;
   detecting, by the electronic device, a second operation on the first screen;
   capturing, by the electronic device in response to the second operation, images by using the first camera and the second camera based on the first zoom ratio and a first lightness, wherein the second camera is an auxiliary camera, and wherein the first camera captures one or more frames of images and the second camera captures one or more frames of images;
   processing, by the electronic device, the one or more frames of images captured by the first camera and the one or more frames of images captured by the second camera to obtain a shot image through fusion;
   saving, by the electronic device, the shot image, wherein the first lightness is a lightness value determined by the electronic device based on the preview image;
   detecting, by the electronic device, a third operation on the first widget;
   determining, by the electronic device, a second zoom ratio in response to the third operation, and adjusting, by the electronic device, the preview image to be an image captured by the third camera in real time;
   detecting, by the electronic device, a fourth operation on the first screen;
   capturing, by the electronic device in response to the fourth operation, images by using the first camera and the third camera based on the second zoom ratio and the first lightness, wherein the first camera is an auxiliary camera, the third camera is different from the second camera, and the third camera captures one or more frames of images;
   processing, by the electronic device, the one or more frames of images captured by the first camera and the one or more frames of images captured by the third camera to obtain a second shot image through fusion; and
   saving, by the electronic device, the second shot image.

2. The method according to claim 1, wherein the electronic device further comprises a fourth camera, and the method further comprises:
   detecting, by the electronic device, a fifth operation on the first widget;
   determining, by the electronic device, a third zoom ratio in response to the fifth operation, and adjusting, by the electronic device, the preview image to be an image captured by the fourth camera in real time;
   detecting, by the electronic device, a sixth operation on the first screen;
   capturing, by the electronic device in response to the sixth operation, images by using the fourth camera based on the third zoom ratio and the first lightness, wherein the fourth camera is different from the third camera, and wherein the fourth camera captures two or more frames of images;
   processing, by the electronic device, the two or more frames of images captured by the fourth camera to obtain a third shot image; and
   saving, by the electronic device, the third shot image.

3. The method according to claim 2, wherein the method further comprises:
   a first series of steps, including:
      detecting, by the electronic device, a seventh operation on the first screen;
      capturing, by the electronic device in response to the seventh operation, images by using the first camera based on the first zoom ratio and a second lightness, wherein the first camera captures two or more frames of images;
      processing, by the electronic device, the two or more frames of images captured by the first camera to obtain a further shot image; and
      saving, by the electronic device, the further shot image;
   or
   a second series of steps, including:
      detecting, by the electronic device, an eighth operation on the first screen;
      capturing, by the electronic device in response to the eighth operation, images by using the third camera based on the second zoom ratio and the second lightness, wherein the third camera captures two or more frames of images;
      processing, by the electronic device, the two or more frames of images captured by the third camera, to obtain a further shot image; and
      saving, by the electronic device, the further shot image;
   or
   a third series of steps, including:
      detecting, by the electronic device, a ninth operation on the first screen;
      capturing, by the electronic device in response to the ninth operation, images by using the fourth camera based on the third zoom ratio and the second lightness, wherein the fourth camera captures two or more frames of images;
      processing, by the electronic device, the two or more frames of images captured by the fourth camera to obtain a further shot image; and
      saving, by the electronic device, the further shot image,
   wherein the second lightness is a lightness determined by the electronic device based on the preview image, the second lightness is different from the first lightness, and a lightness value of the second lightness is lower than the lightness value of the first lightness.

4. The method according to claim 3, wherein the method further comprises:
   (i):
      detecting, by the electronic device, an eleventh operation on the first widget;
      switching, by the electronic device, from the first zoom ratio to the second zoom ratio in response to the eleventh operation; and in response to switching from the first zoom ratio to the second zoom ratio, switching, by the electronic device, from capturing images by using the first camera and the second camera to capturing images by using the first camera and the third camera, wherein the second camera is an auxiliary camera for the first zoom ratio or the first camera is an auxiliary camera for the second zoom ratio;

or (ii):

detecting, by the electronic device, a twelfth operation on the first widget;

switching, by the electronic device, from the first zoom ratio to the third zoom ratio in response to the twelfth operation; and in response to switching from the first zoom ratio to the third zoom ratio, switching, by the electronic device, from capturing images by using the first camera and the second camera to capturing images by using the fourth camera and the first camera, wherein the first camera is an auxiliary camera for the third zoom ratio.

5. The method according to claim 4, wherein the method further comprises:

in response to switching from the first zoom ratio to the second zoom ratio, switching, by the electronic device, from capturing images by using the third camera, the first camera, and the second camera to capturing images by using the first camera and the third camera, wherein both the third camera and the second camera are auxiliary cameras for the first zoom ratio or the first camera is the auxiliary camera for the second zoom ratio.

6. The method according to claim 1, wherein a field of view of the second camera overlaps a field of view of the third camera.

7. The method according to claim 1, wherein the capturing, by the electronic device, the images by using the first camera and the second camera based on the first zoom ratio and first lightness comprises:

based on the first zoom ratio falling within a second zoom ratio range, obtaining, by the electronic device, a second image by using the first camera and obtaining a third image by using the second camera, wherein the second image comprises one or more frames and the third image comprises one or more frames; or based on the first zoom ratio falling within a third zoom ratio range, obtaining, by the electronic device, a second image by using the first camera and obtaining a fourth image by using the second camera, wherein the second image comprises one or more frames and the fourth image comprises one or more frames.

8. The method according to claim 1, wherein the capturing, by the electronic device, images by using the first camera and the third camera based on the second zoom ratio and the first lightness comprises:

obtaining, by the electronic device, a first image by using the third camera and obtaining a second image by using the first camera, wherein the first image comprises one or more frames, the second image comprises one or more frames, and the second zoom ratio falls within a first zoom ratio range.

9. The method according to claim 2, wherein the capturing, by the electronic device, the images by using the fourth camera based on the third zoom ratio and the first lightness comprises:

obtaining, by the electronic device, a fourth image by using the fourth camera, wherein the fourth image comprises a plurality of frames and the third zoom ratio falls within a fourth zoom ratio range.

10. The method according to claim 7, wherein after the obtaining, by the electronic device, the second image by using the first camera and obtaining the third image by using the second camera, the method further comprises:

performing, by the electronic device, first preprocessing on the second image to obtain a first preprocessed image located in a RAW region;

performing, by the electronic device, fusion on the first preprocessed image to obtain a corresponding pre-fused image;

separately performing, by the electronic device, front-end processing on the third image and a pre-fused image corresponding to the second image to obtain corresponding front-end processed images;

performing, by the electronic device, fusion on the front-end processed image corresponding to the third image to obtain a front-end fused image corresponding to the third image;

performing, by the electronic device, back-end processing on both the front-end processed image corresponding to the second image and the front-end fused image corresponding to the third image to obtain corresponding back-end processed images; and performing, by the electronic device, fusion on the back-end processed image corresponding to the second image and the back-end processed image corresponding to the third image to obtain a back-end fused image, wherein the back-end fused image is the first shot image.

11. The method according to claim 7, wherein after the obtaining, by the electronic device, the second image by using the first camera and obtaining the fourth image by using the second camera, the method further comprises:

separately performing, by the electronic device, front-end processing on the second image and the fourth image to obtain a front-end processed image corresponding to the second image and a front-end processed image corresponding to the fourth image;

separately performing, by the electronic device, fusion on the front-end processed image corresponding to the second image and the front-end processed image corresponding to the fourth image to obtain a front-end fused image corresponding to the second image and a front-end fused image corresponding to the fourth image;

performing, by the electronic device, back-end processing on both the front-end fused image corresponding to the second image and the front-end fused image corresponding to the fourth image to obtain corresponding back-end processed images; and performing, by the electronic device, fusion on the back-end processed image corresponding to the second image and the back-end processed image corresponding to the fourth image to obtain a back-end fused image, wherein the back-end fused image is the shot image.

12. The method according to claim 8, wherein the electronic device obtains the first image by using the third camera and obtains the second image by using the first camera, and the method further comprises:

separately performing, by the electronic device, front-end processing on the first image and the second image to obtain a front-end processed image corresponding to the first image and a front-end processed image corresponding to the second image;
separately performing, by the electronic device, fusion on the front-end processed image corresponding to the first image and the front-end processed image corresponding to the second image to obtain a front-end fused image corresponding to the first image and a front-end fused image corresponding to the second image;
performing, by the electronic device, back-end processing on both the front-end fused image corresponding to the first image and the front-end fused image corresponding to the second image to obtain corresponding back-end processed images;
performing, by the electronic device, distortion correction on the back-end processed image corresponding to the first image to obtain a corrected image; and
performing, by the electronic device, fusion on the corrected image and the back-end processed image corresponding to the second image to obtain a back-end fused image, wherein the back-end fused image is the first shot image.

13. The method according to claim 9, wherein after the obtaining, by the electronic device, the fourth image by using the fourth camera, the method further comprises:
performing, by the electronic device, front-end processing on the fourth image to obtain a corresponding front-end processed image;
performing, by the electronic device, fusion on the front-end processed image corresponding to the fourth image to obtain a front-end fused image corresponding to the fourth image; and
performing, by the electronic device, back-end processing on the front-end fused image corresponding to the fourth image to obtain a corresponding back-end processed image, wherein the back-end processed image is the third shot image.

14. The method according to claim 3,
wherein the capturing, by the electronic device, the images by using the first camera based on the first zoom ratio and the second lightness comprises:
obtaining, by the electronic device, a second image by using the first camera, wherein the second image comprises a plurality of frames and the first zoom ratio falls within a second zoom ratio range or a third zoom ratio range;
wherein the capturing, by the electronic device, the images by using the third camera based on the second zoom ratio and the second lightness comprises:
obtaining, by the electronic device, a first image by using the third camera, wherein the first image comprises a plurality of frames and the second zoom ratio falls within a first zoom ratio range; and
wherein the capturing, by the electronic device, the images by using the fourth camera based on the third zoom ratio and the second lightness comprises:
obtaining, by the electronic device, a fourth image by using the fourth camera, wherein the fourth image comprises a plurality of frames and the third zoom ratio falls within a fourth zoom ratio range.

15. The method according to claim 14, wherein the method further comprises:
a first series of steps, including:
detecting, by the electronic device, a thirteenth operation on the second widget;
responding, by the electronic device, to the thirteenth operation, wherein the second widget indicates a video mode, a night mode, or an HDR mode;
detecting, by the electronic device, a fourteenth operation on the first screen;
capturing, by the electronic device in response to the fourteenth operation, images by using the first camera based on the first zoom ratio, wherein the first camera captures two or more frames of images;
processing, by the electronic device, the two or more frames of images captured by the first camera to obtain a further shot image; and
saving, by the electronic device, the further shot image;
or
a second series of steps, including:
detecting, by the electronic device, a fifteenth operation on the first screen;
capturing, by the electronic device in response to the fifteenth operation, images by using the third camera based on the second zoom ratio, wherein the third camera captures two or more frames of images;
processing, by the electronic device, the two or more frames of images captured by the third camera to obtain a further shot image; and
saving, by the electronic device, the further shot image;
or
a third series of steps, including:
detecting, by the electronic device, a sixteenth operation on the first screen;
capturing, by the electronic device in response to the sixteenth operation, images by using the fourth camera based on the third zoom ratio, wherein the fourth camera captures two or more frames of images;
processing, by the electronic device, the two or more frames of images captured by the fourth camera to obtain a further shot image; and
saving, by the electronic device, the further shot image.

16. The method according to claim 15,
wherein the capturing, by the electronic device, the images by using the first camera based on the first zoom ratio comprises:
obtaining, by the electronic device, the second image by using the first camera, wherein the second image comprises a plurality of frames and the first zoom ratio falls within the second zoom ratio range or the third zoom ratio range;
wherein the capturing, by the electronic device, the images by using the third camera based on the second zoom ratio comprises:
obtaining, by the electronic device, the first image by using the third camera, wherein the first image comprises a plurality of frames and the second zoom ratio falls within the first zoom ratio range; and
wherein the capturing, by the electronic device, the images by using the fourth camera based on the third zoom ratio comprises:
obtaining, by the electronic device, the fourth image by using the fourth camera, wherein the fourth image comprises a plurality of frames and the third zoom ratio falls within the fourth zoom ratio range.

17. An electronic device, comprising:
a plurality of cameras configured to obtain raw images, wherein the plurality of cameras comprises a first camera, a second camera, and a third camera;
a processor; and
a memory, wherein the memory is configured to store a computer program capable of running on the processor;
wherein the processor is configured to execute the computer program to cause the electronic device to:

display a first screen, wherein the first screen comprises a preview image, a first widget, and a second widget, and wherein the second widget indicates a photo mode;
detect a first operation on the first widget;
determine a first zoom ratio in response to the first operation, wherein the preview image is an image captured by the first camera in real time;
detect a second operation on the first screen;
capture, in response to the second operation, images by using the first camera and the second camera based on the first zoom ratio and a first lightness, wherein the second camera is an auxiliary camera, and wherein the first camera captures one or more frames of images and the second camera captures one or more frames of images;
process the one or more frames of images captured by the first camera and the one or more frames of images captured by the second camera to obtain a shot image through fusion;
save the shot image, wherein the first lightness is a lightness value determined by the electronic device based on the preview image;
detect a third operation on the first widget;
determine a second zoom ratio in response to the third operation, and adjust the preview image to be an image captured by the third camera in real time;
detect a fourth operation on the first screen;
capture, in response to the fourth operation, images by using the first camera and the third camera based on the second zoom ratio and the first lightness, wherein the first camera is an auxiliary camera, the third camera is different from the second camera, and the third camera captures one or more frames of images;
process the one or more frames of images captured by the first camera and the one or more frames of images captured by the third camera to obtain a second shot image through fusion; and
save the second shot image.

18. The electronic device according to claim 17, wherein:
the plurality of cameras comprises a wide-angle camera, a main camera, a black and white camera, and a long-focus camera;
the plurality of cameras are configured to shoot a same to-be-shot scene;
the wide-angle camera is configured to obtain a first image after the processor obtains a photographing instruction;
the main camera is configured to obtain a second image after the processor obtains the photographing instruction;
the black and white camera is configured to obtain a third image after the processor obtains the photographing instruction; and
the long-focus camera is configured to obtain a fourth image after the processor obtains the photographing instruction.

19. A non-transitory computer-readable storage medium, wherein the computer-readable storage medium stores a computer program, the computer program comprises program instructions, and in response to the program instructions being executed by a processor included in an electronic device that also includes a first camera, a second camera, and a third camera, the electronic device is configured to perform the following:
displaying a first screen, wherein the first screen comprises a preview image, a first widget, and a second widget, and wherein the second widget indicates a photo mode;
detecting a first operation on the first widget;
determining a first zoom ratio in response to the first operation, wherein the preview image is an image captured by the first camera in real time;
detecting a second operation on the first screen;
capturing, in response to the second operation, images by using the first camera and the second camera based on the first zoom ratio and a first lightness, wherein the second camera is an auxiliary camera, and wherein the first camera captures one or more frames of images and the second camera captures one or more frames of images;
processing the one or more frames of images captured by the first camera and the one or more frames of images captured by the second camera to obtain a shot image through fusion;
saving the shot image, wherein the first lightness is a lightness value determined by the electronic device based on the preview image;
detecting a third operation on the first widget;
determining a second zoom ratio in response to the third operation, and adjusting the preview image to be an image captured by the third camera in real time;
detecting a fourth operation on the first screen;
capturing, in response to the fourth operation, images by using the first camera and the third camera based on the second zoom ratio and the first lightness, wherein the first camera is an auxiliary camera, the third camera is different from the second camera, and the third camera captures one or more frames of images;
processing the one or more frames of images captured by the first camera and the one or more frames of images captured by the third camera to obtain a second shot image through fusion; and
saving the second shot image.

* * * * *